United States Patent
Tracz et al.

(10) Patent No.: US 12,473,988 B2
(45) Date of Patent: Nov. 18, 2025

(54) EXCESS FLOW VALVE AND SYSTEM

(71) Applicant: RELIANCE WORLDWIDE CORPORATION, Atlanta, GA (US)

(72) Inventors: Michael Christopher Tracz, Brecksville, OH (US); Joseph Jerome Spalding, Elyria, OH (US); Jason Thomas Kocher, Chardon, OH (US)

(73) Assignee: Reliance Worldwide Corporation, Atlanta, GA (US)

( * ) Notice: Subject to any disclaimer, the term of this patent is extended or adjusted under 35 U.S.C. 154(b) by 14 days.

(21) Appl. No.: 18/546,870

(22) PCT Filed: Feb. 18, 2022

(86) PCT No.: PCT/US2022/017076
§ 371 (c)(1),
(2) Date: Aug. 17, 2023

(87) PCT Pub. No.: WO2022/178308
PCT Pub. Date: Aug. 25, 2022

(65) Prior Publication Data
US 2024/0133475 A1    Apr. 25, 2024
US 2024/0229952 A9    Jul. 11, 2024

Related U.S. Application Data

(60) Provisional application No. 63/151,586, filed on Feb. 19, 2021.

(51) Int. Cl.
*F16K 17/34* (2006.01)
*F16K 17/38* (2006.01)

(52) U.S. Cl.
CPC .............. *F16K 17/34* (2013.01); *F16K 17/38* (2013.01)

(58) Field of Classification Search
CPC .......... F16K 17/34; F16K 17/38; F16K 17/30; Y10T 137/1797; Y10T 137/1804;
(Continued)

(56) References Cited

U.S. PATENT DOCUMENTS 3,872,884 A * 3/1975 Busdiecker ............. F16K 17/30
                                                    137/504
4,072,159 A * 2/1978 Kurosawa ................ A62C 2/04
                                                    166/57

(Continued)

FOREIGN PATENT DOCUMENTS

CA    3020550 A1    4/2019
DE    10113371 A1 * 10/2002 ............. A62C 2/065
(Continued)

OTHER PUBLICATIONS

PCT International Search Report and Written Opinion completed by the ISA/KR on May 31, 2022 and issued in connection with PCT/US2022/017076.
(Continued)

*Primary Examiner* — Jessica Cahill
(74) *Attorney, Agent, or Firm* — Barnes & Thornburg LLP

(57) ABSTRACT

An excess flow valve (EFV) is disclosed that has an efficient and durable construction. The EFV is efficient in terms of both size and cost. It is durable partly due to a design with few parts and also because of optional all metal construction. In some embodiments, an intumescent material is included that expands to close off the valve by pressing the valve plug into sealing engagement with the valve seat and permanently stopping the flow of gas when a pressure differential or flow velocity threshold is exceeded.

24 Claims, 35 Drawing Sheets

(58) Field of Classification Search
CPC ......... Y10T 137/1812; Y10T 137/1819; Y10T 137/1827
See application file for complete search history.

(56) References Cited

U.S. PATENT DOCUMENTS

| | | | | |
|---|---|---|---|---|
| 4,267,853 | A * | 5/1981 | Yamaguchi | F16K 17/383 |
| | | | | 524/496 |
| 5,211,372 | A * | 5/1993 | Smith, Jr. | F01L 35/00 |
| | | | | 251/75 |
| 6,820,633 | B2 * | 11/2004 | Liu | G01K 11/06 |
| | | | | 137/460 |
| 9,486,884 | B2 * | 11/2016 | Dominguez | F16K 17/205 |
| 11,628,269 | B2 * | 4/2023 | Prabhudesai | A61M 16/208 |
| | | | | 128/205.24 |
| 2004/0221893 | A1 * | 11/2004 | Johnson | F16K 17/34 |
| | | | | 137/498 |
| 2010/0150715 | A1 | 6/2010 | Howard et al. | |
| 2013/0025724 | A1 * | 1/2013 | Grebinoski | F16K 17/28 |
| | | | | 137/455 |
| 2015/0219232 | A1 * | 8/2015 | Dominguez | F16K 17/28 |
| | | | | 137/498 |
| 2018/0002902 | A1 | 1/2018 | Mandal | |
| 2019/0129454 | A1 * | 5/2019 | Hodges | G05D 23/022 |

FOREIGN PATENT DOCUMENTS

| | | | |
|---|---|---|---|
| EP | 3644402 A1 | 4/2020 | |
| FR | 2941013 A1 * | 7/2010 | ............ F02B 37/00 |
| KR | 20200002187 | * 10/2020 | |
| WO | 2008151382 A1 | 12/2008 | |

OTHER PUBLICATIONS

EP—Extended European Search Report; European Patent Application No. 22757033.0; Feb. 10, 2025.

* cited by examiner

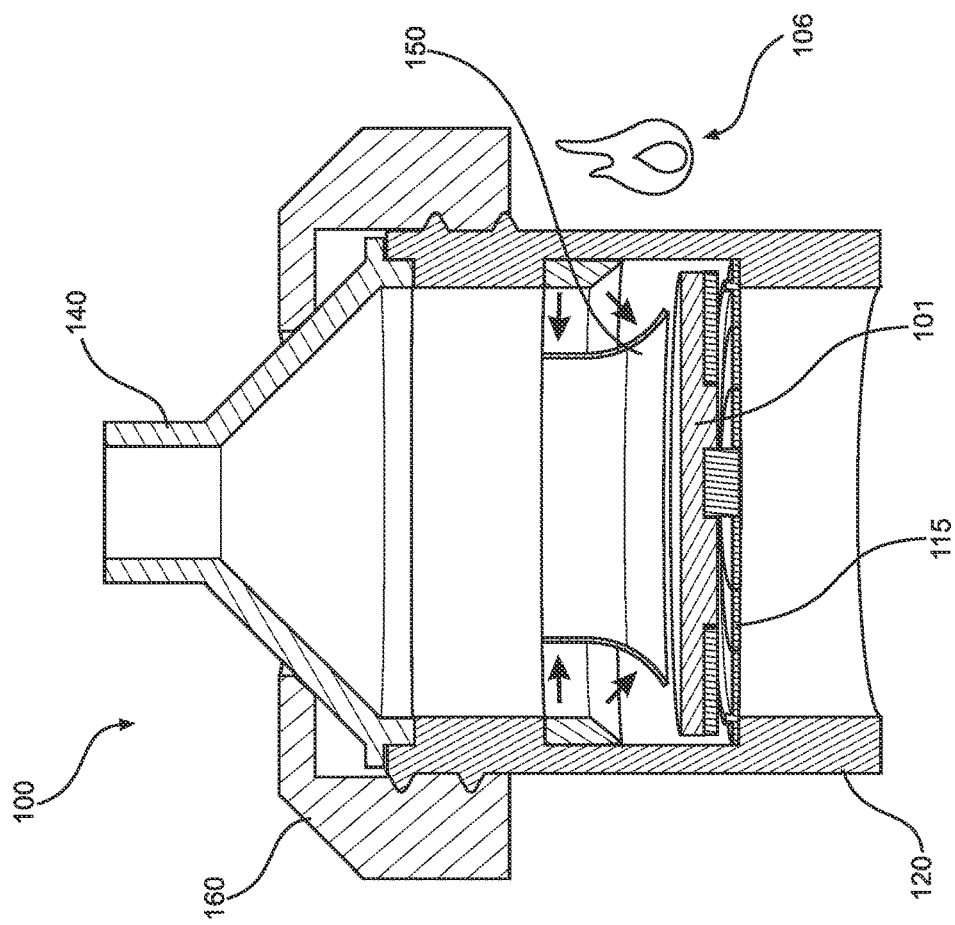
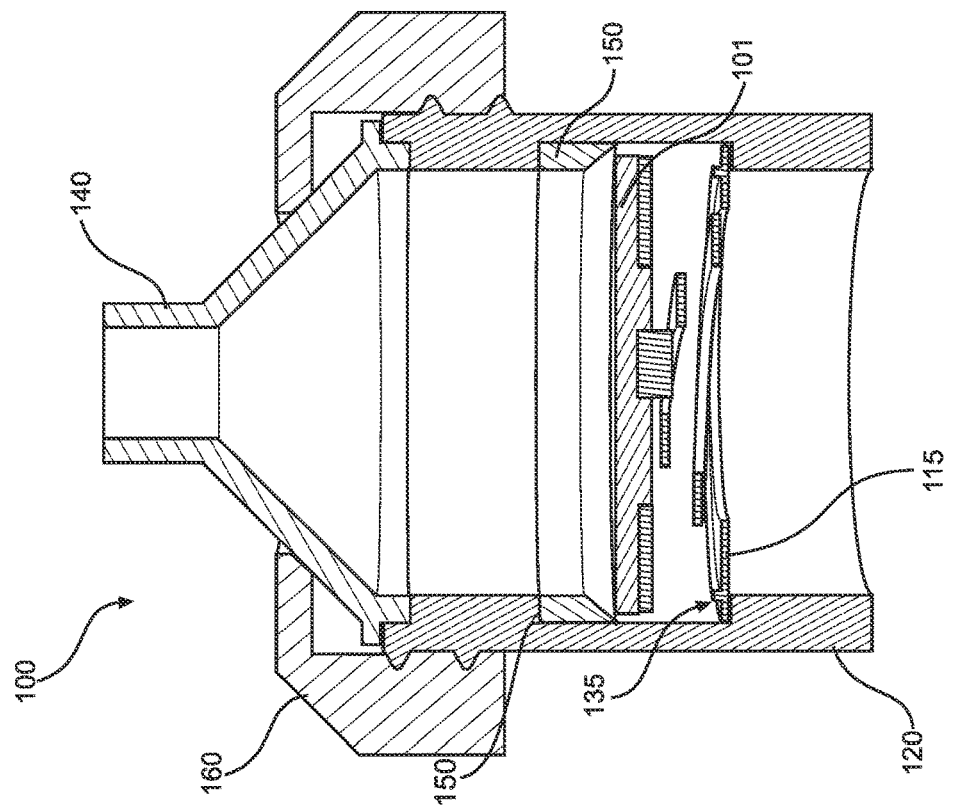

EXCESS FLOW VALVE AND SYSTEM

CROSS-REFERENCE TO RELATED APPLICATIONS

This application is a U.S. National Phase of International Patent Application No. PCT/US2022/017076, filed Feb. 18, 2022, which claims the benefit of and priority to U.S. Provisional Application No. 63/151,586, filed 19 Feb. 2021.

INCORPORATION BY REFERENCE

The contents of International Patent Application No. PCT/US2022/017076, filed Feb. 18, 2022, and U.S. Provisional Patent Application No. 63/151,586, filed 19 Feb. 2021, are incorporated herein by reference as if set forth in their entireties.

FIELD

This disclosure relates to fluid, such as liquids or gases, control devices, and more specifically, excess flow valves for gas fueled devices.

BACKGROUND

Excess Flow Valves (EFVs) are safety devices typically installed on a gas service line to an appliance. An EFV is designed to stop the flow of gas in a private residence when it exceeds predetermined limits. Typically, the predetermined limits are based on flow rates that exceed what would be expected in the system that the EFV is installed in. This protects against the danger of gas leaks, or an abnormal situation caused by an appliance malfunction or surge in up-stream pressure.

Some EFVs operate through a mechanical restriction of flow when the flow exceeds a limit. Some reset when the pressure or limit subsides. Some embodiments include rubber and plastic stoppers with metal coil springs to restrict flow and return back to original flow state. Some EFVs operate with magnetic biasing mechanisms that will restrict flow if the flow limit is reached. Many of these employ ball-shaped means to stop the flow.

Other embodiments are designed to restrict flow when predetermined temperature is reached. These may use intumescent materials that expand to close the valve by taking up the full diameter of the valve. These restrict flow when temperature exceeds a defined maximum guarding from fire or explosion in the line to the appliance, or from a source outside the line.

SUMMARY

The following is a brief summary of subject matter that is described in greater detail herein. This summary is not intended to be limiting as to the scope of the claims.

Disclosed herein are excess flow valves (EFVs) that have an efficient and durable construction. The EFVs are efficient in terms of both size and cost. The EFVs are also durable partly due to a design with few parts and component material. In an embodiment, each component of the EFV is formed from metal. In another embodiment, the components of the EFV are formed from metal or plastic. The valve can be closed by pressing the valve plug into sealing engagement with the valve seat and substantially reducing or stopping the flow of gas when a flow rate or pressure differential threshold is exceeded. In some embodiments, an intumescent material is included that expands to close off the EFV. In an embodiment, the intumescent material expands within the EFV when a temperature threshold is exceeded to permanently reduce or stop the flow of gas. In another embodiment, the intumescent material is configured to close the valve by pressing the valve plug into sealing engagement with the valve seat and permanently reducing or stopping the flow of gas when a temperature threshold is exceeded.

In an aspect, the technology relates to an excess flow valve including: a valve body having an inlet and an opposite outlet defining a flow path to receive a flow of gas, the inlet and the outlet also defining a central axis of the valve body, wherein the valve body defines a first chamber and a second chamber in flow communication, the first chamber upstream from the second chamber and the first chamber radially larger relative to the second chamber; intumescent material disposed within the first chamber, wherein the intumescent material is configured to radially expand to substantially restrict the flow of gas through the valve body upon reaching a threshold temperature; and a valve assembly disposed at least partially within the second chamber and downstream from the intumescent material, the valve assembly including: a biasing member including: an outer rim having an upstream surface; and a spiral arm disposed at least partially within the outer rim and extending therefrom; and a sealing disk coupled to a free end of the spiral arm and biased relative to the outer rim along the central axis via the spiral arm, the sealing disk having a downstream sealing surface, wherein the valve assembly is configured to move between at least two configurations based on the flow of gas, in a first configuration, the biasing member supports the sealing disk such that the downstream sealing surface is axially spaced from the upstream surface of the outer rim and the flow of gas is allowed to pass through the valve assembly, and in a second configuration, a biasing force of the biasing member is overcome such that the downstream sealing surface engages with the upstream surface to substantially restrict the flow of gas through the valve assembly.

In an example, the sealing disk includes a stem extending from the downstream sealing surface, the stem eccentric to the central axis of the valve body when the valve assembly is in the first configuration.

In another example, the stem is co-axial with the central axis of the valve body when the valve assembly is in the second configuration.

In yet another example, the valve body includes an inlet housing defining the inlet and an outlet housing defining the outlet, and at least a portion of the biasing member is pinched between the inlet housing and the outlet housing to secure the valve assembly at least partially within the second chamber.

In still another example, the outlet housing defines a third chamber downstream of the second chamber and in fluid communication with the second chamber, the third chamber having a frustoconical shape configured to at least partially receive the valve assembly in the second configuration, and the valve assembly does not contact an interior surface of the third chamber when in the second configuration.

In an example, the outer rim has a width that is greater than a width of the spiral arm.

In another example, the free end of the spiral arm includes a disk support, the disk support eccentrically positioned within the outer rim when in the first configuration.

In another aspect, the technology relates to a method of manufacturing an excess flow valve, the method including: providing a valve body having an inlet and an opposite outlet defining a flow path to receive a flow of gas, the inlet and the outlet also defining a central axis of the valve body, wherein the valve body defines a first chamber and a second chamber in flow communication, the first chamber upstream from the second chamber and the first chamber radially larger relative to the second chamber; securing intumescent material within the first chamber; and coupling a valve assembly at least partially within the second chamber and downstream from the intumescent material, wherein the valve assembly is positioned within the valve body such that a sealing disk is biasly positioned eccentric relative to the central axis, and the sealing disk is biased along the central axis by a biasing member having an outer rim and a spiral arm extending therefrom, a free end of the spiral arm is coupled to the sealing disk so that a downstream sealing surface of the sealing disk is configured to selectively engage with an upstream surface of the outer rim and substantially restrict the flow of gas through the valve assembly.

In an example, the method further includes assembling the valve assembly including: forming the biasing member, the spiral arm and the outer rim integral with one another at a single connection location; molding the sealing disk, the sealing disk having a stem extending from the downstream sealing surface; and coupling the stem to the free end of the arm prior to positioning within the valve assembly.

In another example, the valve body includes an inlet housing defining the inlet and an outlet housing defining the outlet, and the step of coupling the valve assembly at least partially within the second chamber includes securing the outer rim of the biasing member between the inlet housing and the outlet housing such that it is pinched therebetween.

In another aspect, the technology relates to an excess flow valve for operation with a gas flowing downstream, including: a valve body with an axial channel; a sealing disk retained within the valve body, the sealing disk coupled to a flexible member, and coupled to or including a sail facing upstream and a sealing plug facing downstream, wherein the flexible member is configured to axially move the sealing plug of the sealing disk into engagement with a sealing surface when downstream gas flow exceeds a threshold pressure differential; and an intumescent material retained in the valve body upstream of the sealing disk.

In an example, the intumescent material is configured to axially move the sealing plug of the sealing disk into engagement with the sealing surface when expanded, the intumescent material, when expanded, does not fully expand into an entire inner diameter of the axial channel of the valve body, and the intumescent material is coupled to the sail and includes channels for gas flow.

In another example, the flexible member includes a spiral arm member, and a spiral arm of the spiral arm member is attached to a central downstream facing area of the sealing disk and an outer rim of the spiral arm member, the spiral arm is attached at only one location to the outer rim of the spiral arm member, and the sealing disk has a smaller diameter than the flexible member.

In yet another example, the spiral arm is substantially planar when the threshold pressure differential is not reached, and is tilted downstream when the threshold pressure differential is exceeded.

In still another example, the spiral arm is substantially planar when the threshold pressure differential is exceeded, and is tilted downstream when the threshold pressure differential is not exceeded.

In an example, each component of the excess flow valve includes metal.

In another example, the flexible member includes an elastomeric material and the elastomeric material includes passageways for gas flow, the flexible member has a rigid rim, the rim of the flexible member is coupled to the intumescent material, and a central area of the flexible member includes an axially extended insert, a bypass channel extending axially through the insert.

In yet another example, the valve body has a circumferential channel with an upstream-facing opening that is downstream of the passageways for gas flow, and the sealing surface is on the valve body.

In still another example, the flexible member is a spring and the sealing disk includes a plurality of legs with protrusions thereon, and the excess flow valve further includes a collar disposed in the axial channel; the collar including a central opening encircling the plurality of legs.

In an example, the sealing disk has an axially elongated portion with a bypass channel in a central area, and a plurality of gas flow passageways around an outer rim of the sealing disk.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 10 is another cross-sectional elevation view of the EFV shown in FIG. 1 and in the normal flow configuration.

FIG. 11 is a cross-sectional elevation view of the EFV shown in FIG. 1 and in an excess temperature configuration.

DETAILED DESCRIPTION

Figure 1:
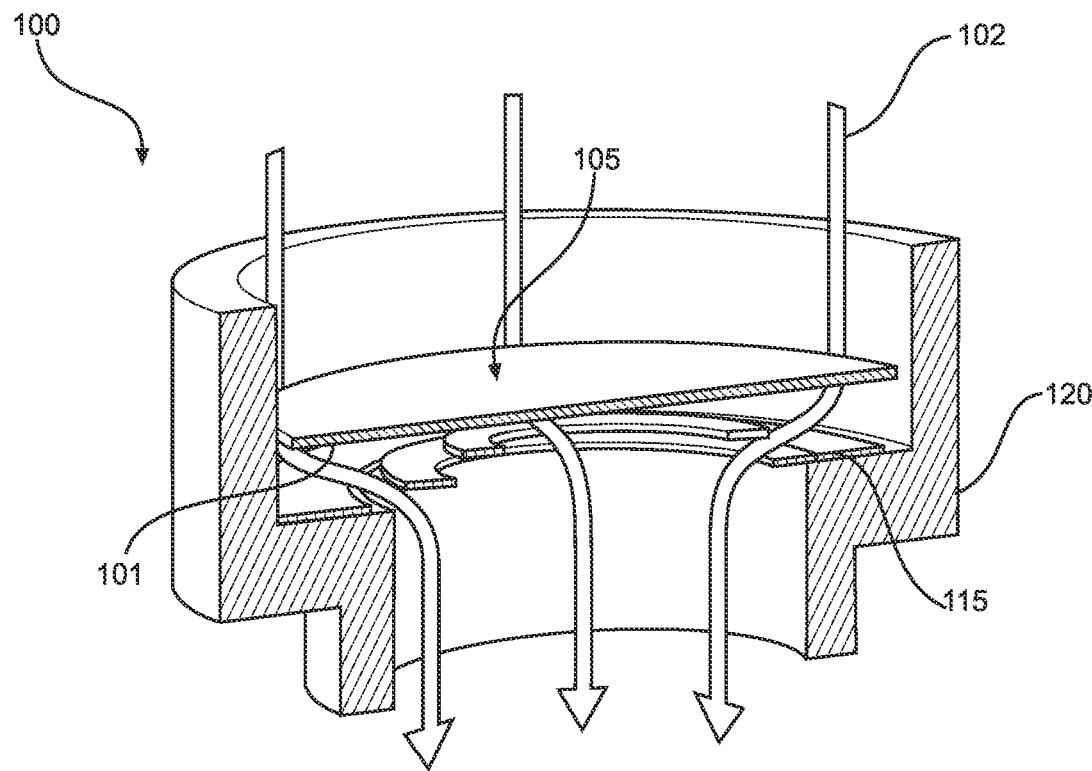
FIG. 1 is a partial cross-sectional perspective view of an exemplary excess flow valve (EFV) in a normal flow configuration and in accordance with principles of the present disclosure.
Figure 2:
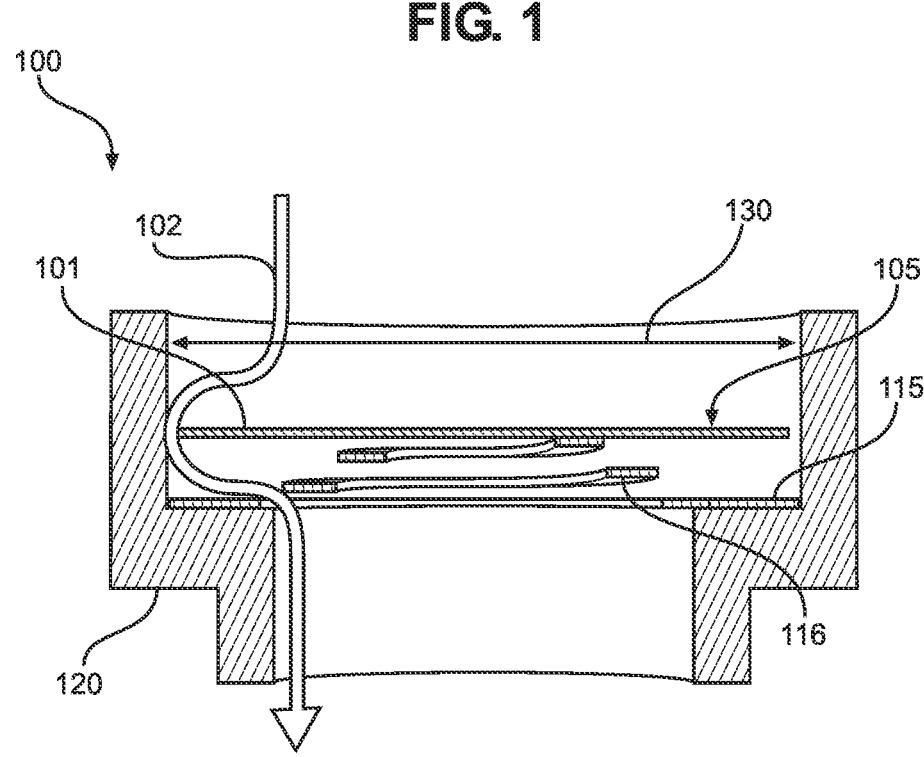
FIG. 2 is a cross-sectional elevation view of the EFV shown in FIG. 1 and in the normal flow configuration.
Figure 3:
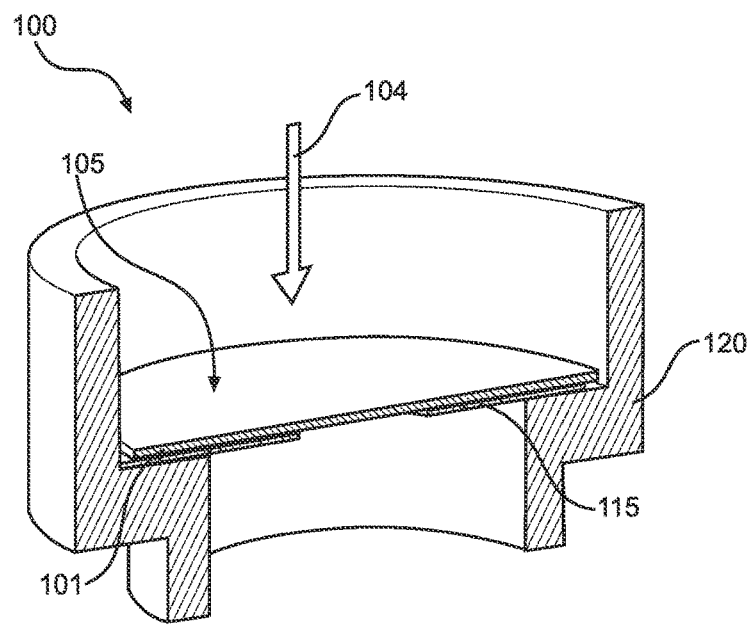
FIG. 3 is a partial cross-sectional perspective view of the EFV shown in FIG. 1 and in an excess flow configuration.

Various technologies pertaining to excess flow valves (EFVs) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. Further, it is to be understood that functionality that is described as being carried out by certain system components may be performed by multiple components. Similarly, for instance, a component may be configured to perform functionality that is described as being carried out by multiple components.

The EFVs described below are devices that can be installed in a gas piping system or other fluid (including liquids or gases) systems to automatically trip when the rate of passage of fuel gas or other gas or liquid through the device exceeds a predetermined level (e.g., trip flow). In examples, the EFVs may or may not incorporate bypass flow, whereby an internal rate of passage of fuel gas through a bypass excess flow valve after trip of the bypass excess flow valve is allowed such that upstream and downstream pressure can equalize across the device to automatically reset the open position. It is appreciated, that in the EFV examples that incorporate bypass flow (e.g., an EFVB), the valve limits the flow of fuel gas after trip of the excess flow valve to a predetermined level and resets automatically after the pressure is equalized across the valve.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, one having skill in the art will understand the degree to which terms such as "about," "approximately," or "substantially" convey in light of the measurements techniques utilized herein. To the extent such terms may not be clearly defined or understood by one having skill in the art, the term "about," "approximately," or "substantially" shall mean plus or minus ten percent.

Many components of the EFV may be referred to as having generally cylindrically, circular, annular, or conical features, and as having cylindrical or circular holes, cavities, and openings. Such features may be referred to, or defined by, a circumference, radius, external surface, internal surface, and/or other terms appropriate for defining such features. It should be noted that such features may alternatively be elliptical, polygonal, and the like. As used herein, the terms "axial" and "longitudinal" refer to directions and orientations, which extend substantially parallel to a centerline of the EFV. Moreover, the terms "radial" and "radially" refer to directions and orientations, which extend substantially perpendicular to the centerline of the EFV. In addition, as used herein, the terms "circumferential" and "circumferentially" refer to directions and orientations, which extend arcuately about the centerline of the EFV.

FIGS. 1-34 disclose spiral-arm EFV embodiments that can be entirely or substantially all-metal, or consist essentially of metal. These embodiments in particular have few components and are highly durable and efficient in size, cost, and manufacturability. In the example shown in FIGS. 1-11, the EFV 100 has a downstream valve body 120 and an upstream valve body 140, both of which make up the EFV valve body. The valve body includes an axial channel. A cap 160 may also be used to cover the upstream valve body 140 and secure it to the downstream valve body 120. The EFV valve body has within it a spiral arm member 115 and a sealing disk 101. The spiral arm member 115 includes a spiral arm 116 and an outer rim 139. An upstream facing part of the outer rim 139 provides the sealing surface 135. A downstream facing surface of the sealing disk 101 provides the sealing plug 110.

In the embodiment of the figures, the sealing disk 101, is substantially cylindrical. The sealing disk 101 includes a sail 105 on the top side (upstream) that is substantially planar. The term sail is used to mean a configuration that is resistant to air flow. The sail 105 functions to capture fluid flow resistance and exert downstream pressure. A bottom side of the sealing disk is a sealing plug 110, that goes around the circumference of the downstream side of the sealing disk 101. The sealing plug 110 is configured to come into sealing engagement with a sealing surface 135 on an outer rim 139 of the spiral arm member 115. In an embodiment, the sealing disk has a smaller diameter than the spiral arm member 115, or more generally, smaller than the flexible member.

Figure 4:
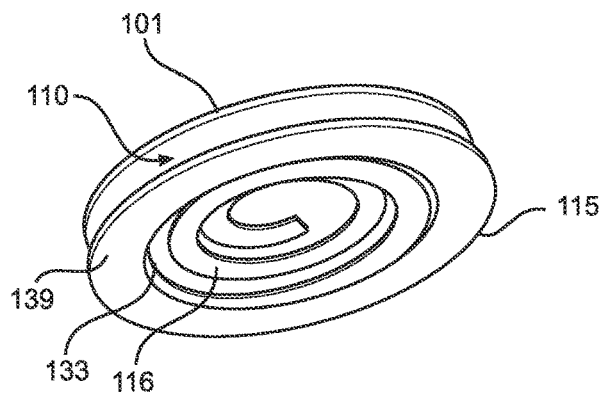
FIG. 4 is a perspective view of a spiral arm member and a sealing disk of the EFV shown in FIG. 1.
Figure 5:
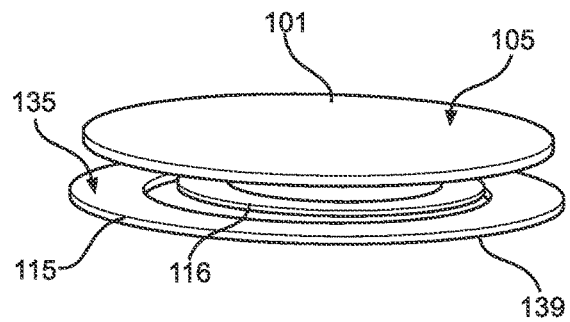
FIG. 5 is another perspective view of the spiral arm member and the sealing disk shown in FIG. 4.
Figure 7:
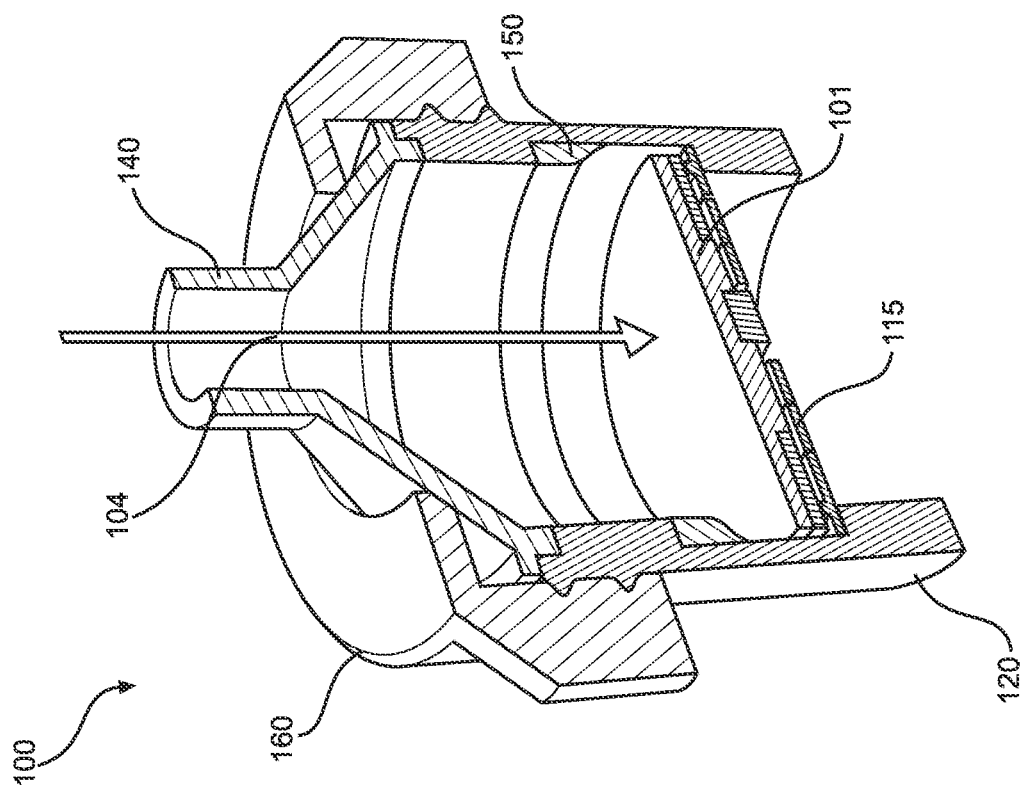
FIG. 7 is a cross-sectional perspective view of the EFV shown in FIG. 1 and in the excess flow configuration.
Figure 6:
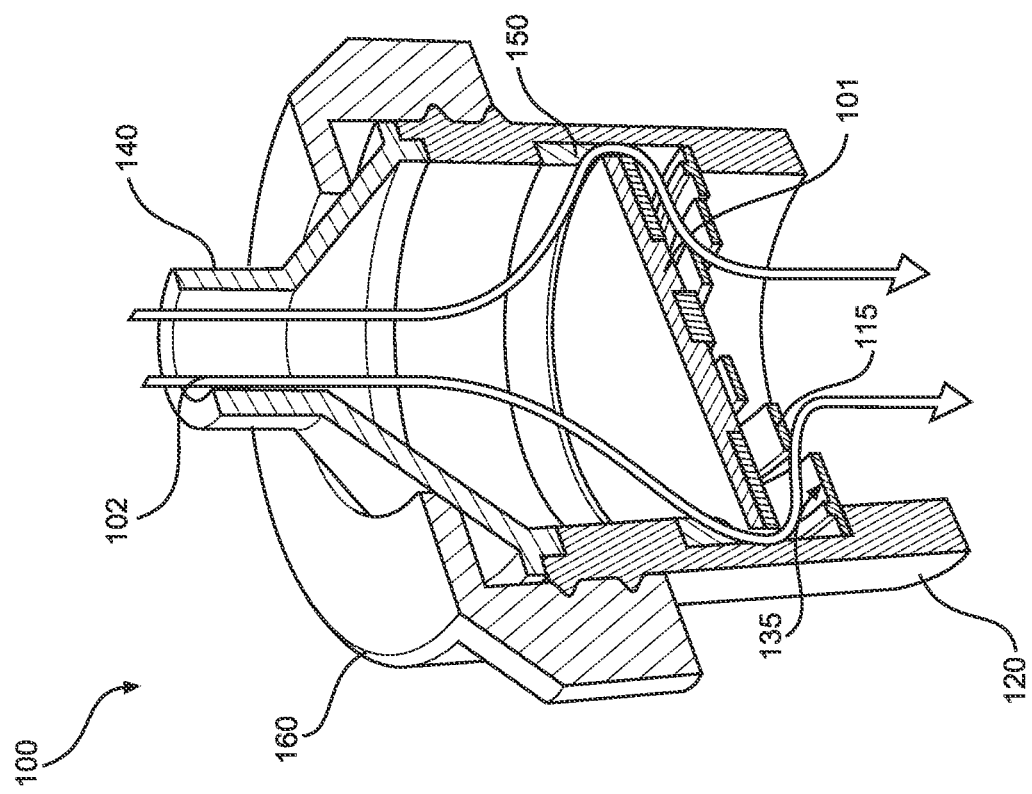
FIG. 6 is a cross-sectional perspective view of the EFV shown in FIG. 1 and in the normal flow configuration.
Figure 9:
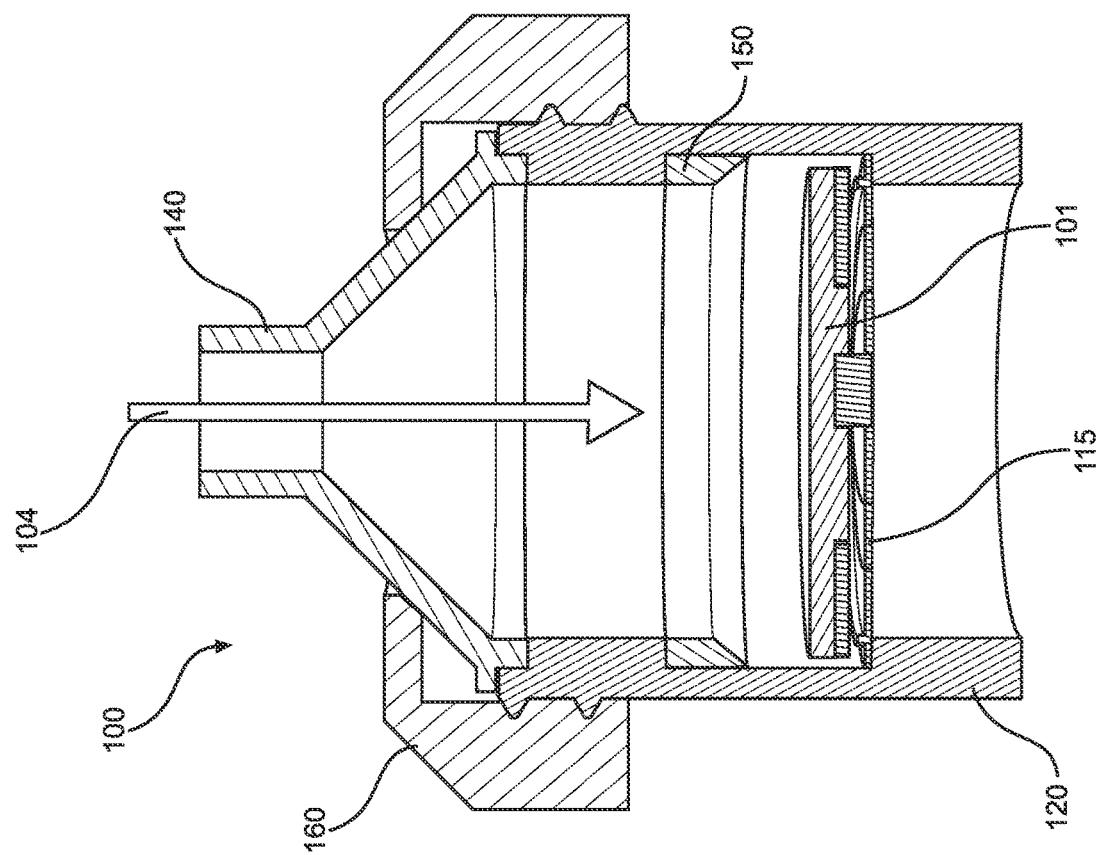
FIG. 9 is a cross-sectional elevation view of the EFV shown in FIG. 1 and in the excess flow configuration.
Figure 8:
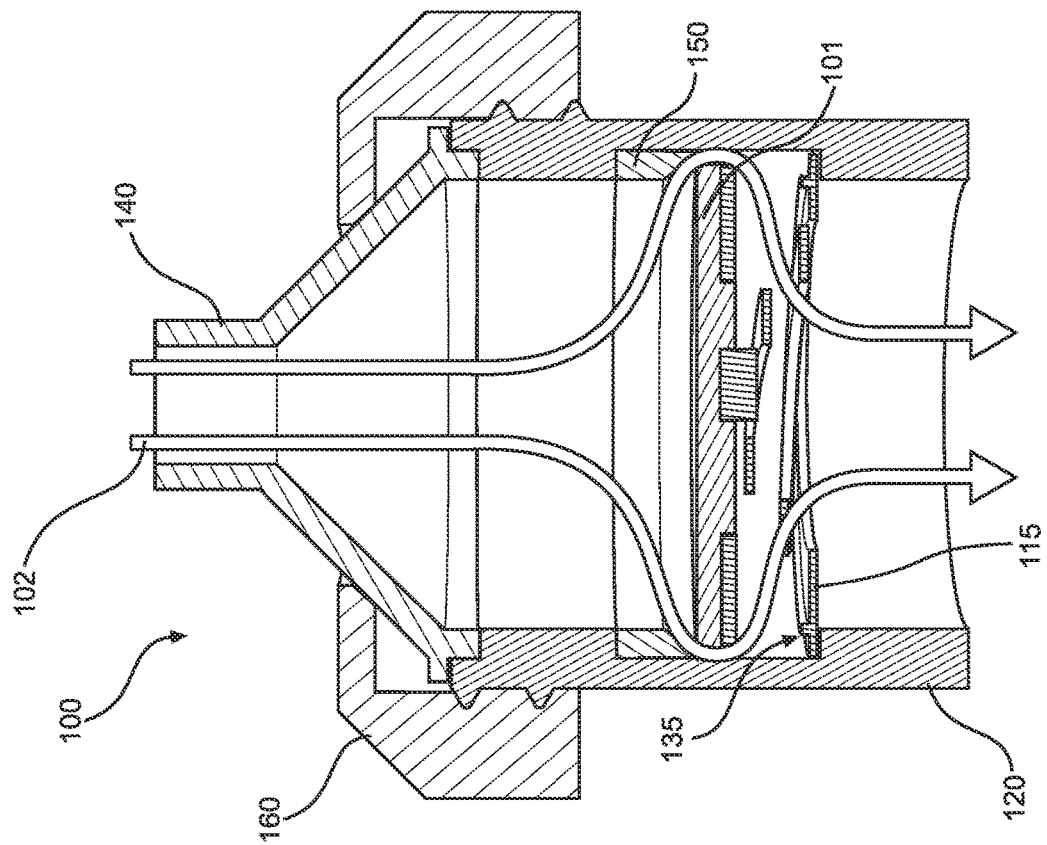
FIG. 8 is a cross-sectional elevation view of the EFV shown in FIG. 1 and in the normal flow configuration.
Figure 13:
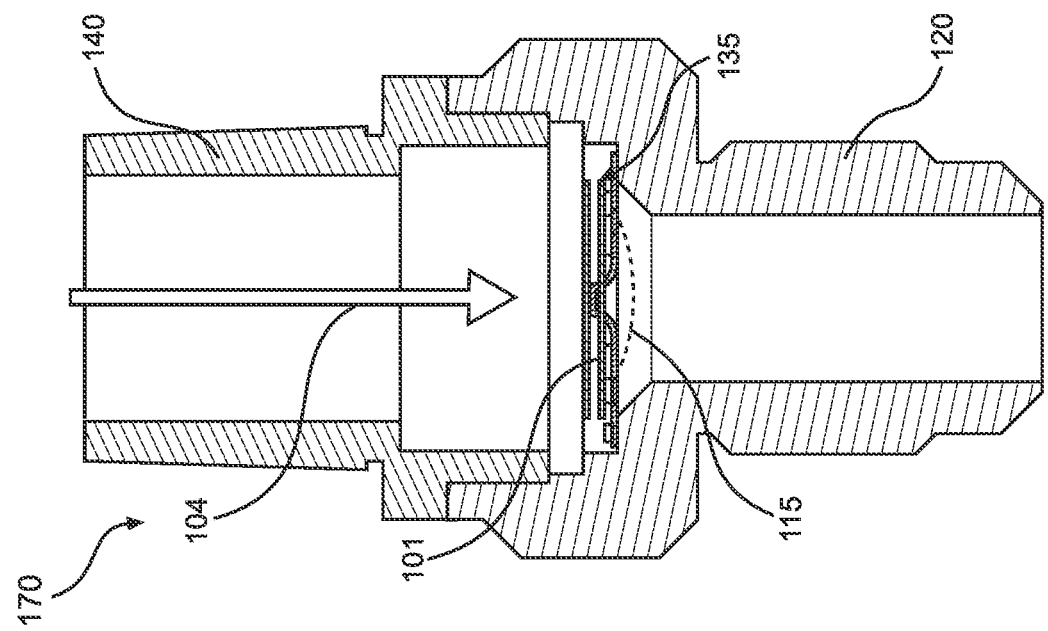
FIG. 13 is a cross-sectional elevation view of the EFV shown in FIG. 12 and in an excess flow configuration.
Figure 12:
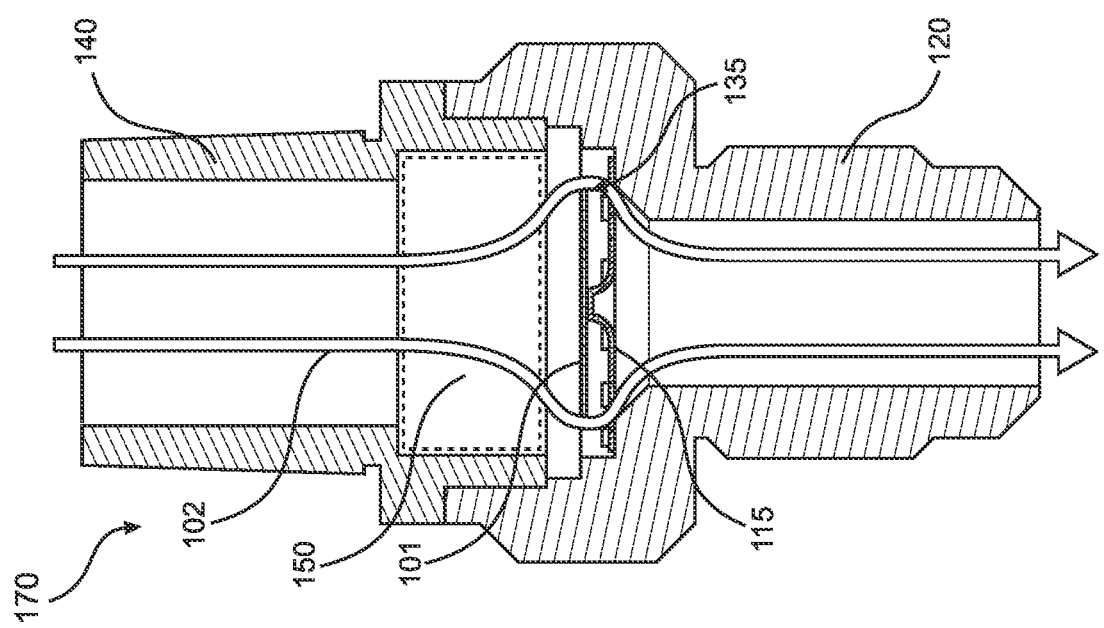
FIG. 12 is a cross-sectional elevation view of another EFV in a normal flow configuration and in accordance with principles of the present disclosure.
Figure 15:
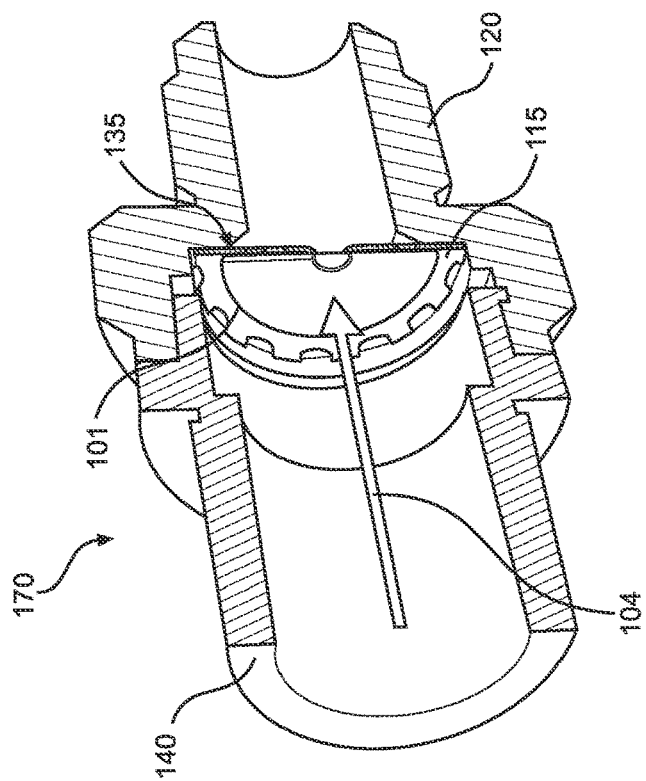
FIG. 15 is a cross-sectional perspective view of the EFV shown in FIG. 12 and in the excess flow configuration.
Figure 14:
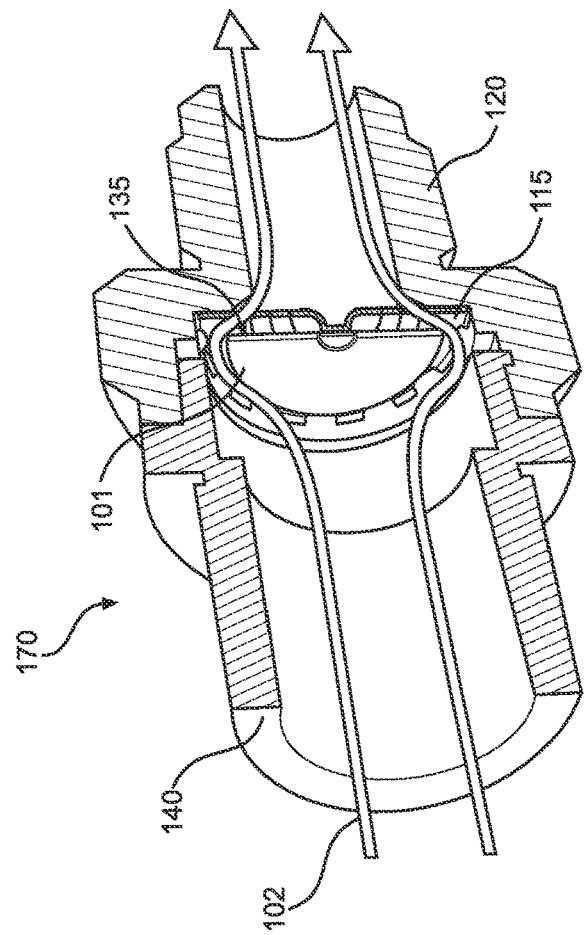
FIG. 14 is a cross-sectional perspective view of the EFV shown in FIG. 12 and in the normal flow configuration.
Figure 16:
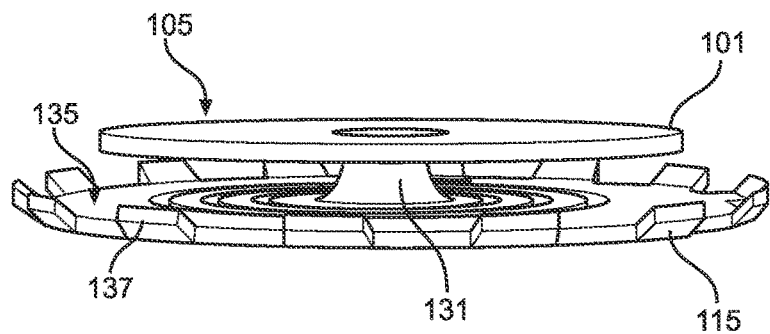
FIG. 16 is a perspective view of a spiral arm member and a sealing disk of the EFV shown in FIG. 12.
Figure 17:
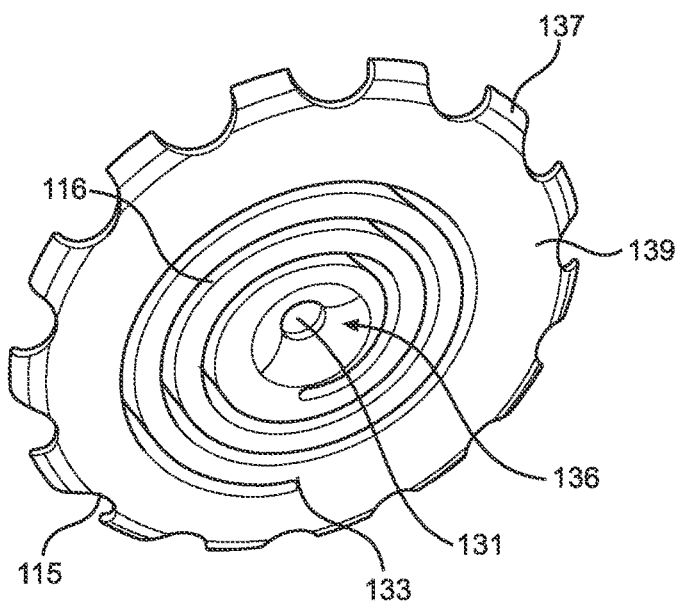
FIG. 17 is another perspective view of the spiral arm member and the sealing disk shown in FIG. 16.
Figure 18:
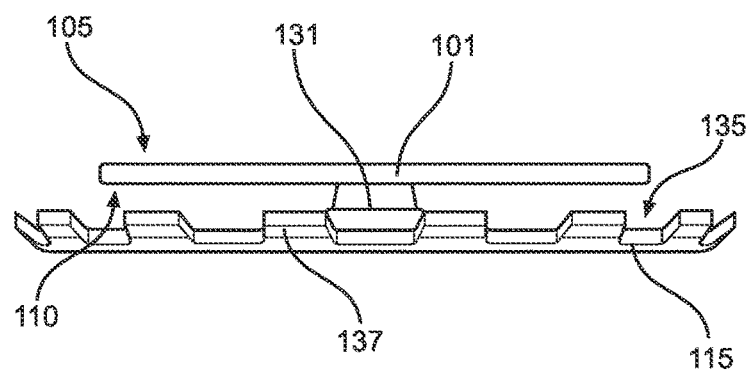
FIG. 18 is a side elevation view of the spiral arm member and the sealing disk shown in FIG. 16.
Figure 19:
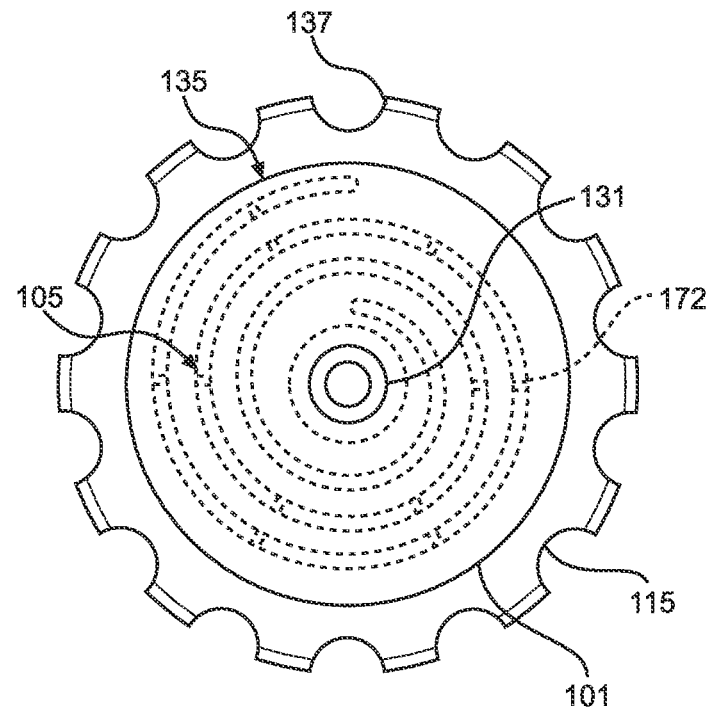
FIG. 19 is a top view of the spiral arm member and the sealing disk shown in FIG. 16.
Figure 20:
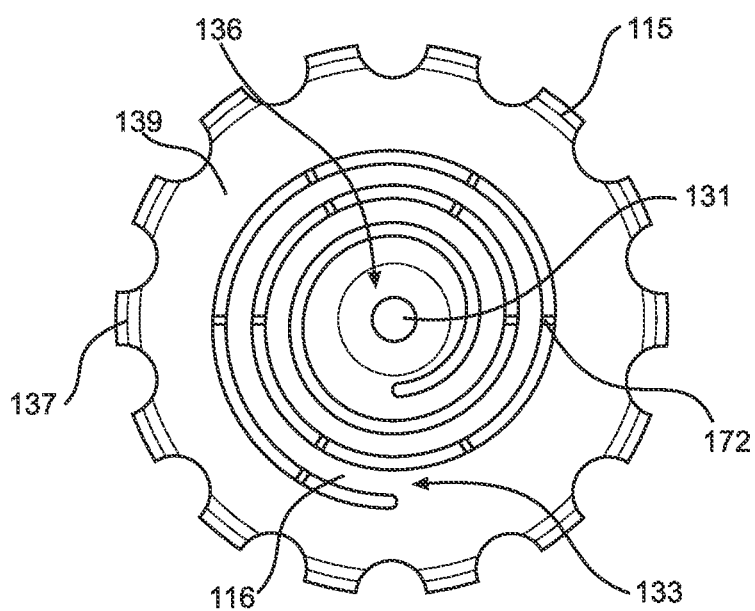
FIG. 20 is a bottom view of the spiral arm member and the sealing disk shown in FIG. 16.

In an embodiment shown in the figures, the spiral arm member 115 is made of metal and has a single connection 133 to its outer rim 139. As shown in FIG. 4, the single connection 133 is illustrated schematically, and the single connection 133 may be formed having any shape, size, and/or location that enables the spiral arm member 115 to function as described herein. Other embodiments may include additional connections, such as 2 to 5, or 3 or 4. There are at least two full 360 degree turns in the embodiment shown in FIGS. 3-4, 16-20, and 23-25. This may vary, for example, by a factor of 0.5× to 10×, such as 0.75× to 5×, or 1× to 2×.

There are two embodiments of the spiral arm member 115 disclosed in the FIGS. 1-20. In FIGS. 1-11, the spiral arm member 115 has a ramp configuration, rising (upstream) toward the sealing disk 101 to create initial separation from the sealing plug 110 and sealing surface 135 during normal flow 102 operation. During an excess flow 104 event, the spiral arm member 115 is pushed down and becomes substantially planar when the sealing plug 110 and sealing surface 135 are in sealing engagement.

In the embodiment shown in FIGS. 12-20, an EFV 170 includes, at the approximate center of the spiral arm member 115, a central area 136 that has a portion that is raised 131. The raised portion 131 can be formed by a punch press operations, hydroforming, or metal spinning. This raised portion 131 is used to attach to the sealing disk 101 and create the initial separation from the spiral arm member 115 that exists during normal operation. In this embodiment, the spiral arm 116 is substantially planar during normal operating conditions. During an excess flow event, the spiral arm 116 is pushed down (downstream) and becomes tilted downstream like a spiral ramp (overall resembling a cone shape) as the sealing plug 110 and sealing surface 135 are pushed into sealing engagement. Upon relaxing, when upstream excess pressure is removed, the cone shape pushes back with a spring force tending toward the original planar shape.

In another embodiment shown in FIGS. 21-25, an EFV 180 include a spiral arm member 115 and the approximate center of the spiral arm member 115 is flat and the sealing disk 101 includes a protrusion 132 (or dimple) creating separation from the spiral arm member 115. The protrusion 132 is attached to the center of the spiral arm member 115. (See FIGS. 23-25) This can be done by spot welding or adhesive. The protrusion 132 or raised portion 131 creates the offset "X" in the spring equation F=−kX, − where F=Force, X is displacement, and k is the spring constant. The spring constant, k, can be adjusted by changing the included angle of the spiral cut and the thickness of the spiral arm material. This embodiment is easier to manufacture. The protrusion 132 can be formed by a series of forming operations on a punch press, or by a single hydroforming operation on a hydraulic press, or other means such as metal spinning.

The sealing surface 135 of the spiral arm member 115 may be a raised ring to improve sealing engagement with the sealing plug 110. Alternatively, it may be flat and flush with an outer rim 139 of the spiral arm member 115. In an embodiment, the sealing plug 110 may have a matching raised ring. In another example, the sealing plug 110 may include one or more radially extending bypass channels 172 (shown in FIGS. 16-20).

In an embodiment, the outer rim 139 of the spiral arm member 115 includes barbs 137 that can aid in securing the spiral arm member 115 to the inner diameter of the valve body.

Notably, the embodiment of FIGS. 21-25 does not have the barbs 137. There are other ways of securing the outer edge of the spiral arm member 115 to the valve body. For example, in the embodiment of FIGS. 21-25, a retainer ring 179 is included that is installed immediately above the spiral arm member 115, which is large enough in diameter to allow clearance around the sail 105. It has approximately the same outer diameter as the spiral arm member 115 and is captured between inner diameter of the upstream (inlet) 140 and downstream (outlet) 120 housings. This retains the spiral arm member 115 and sealing disk 101 sub-assembly in a locked in position in the valve 180.

Figure 21:
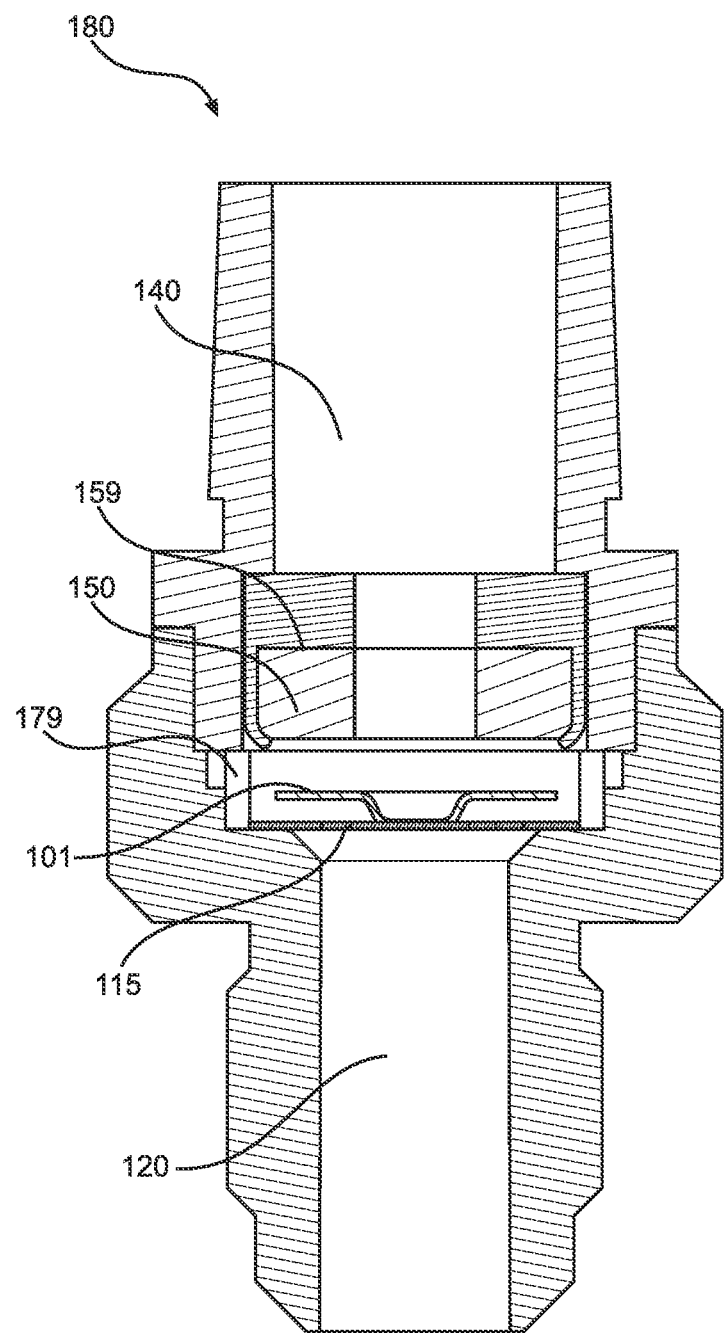
FIG. 21 is a cross-sectional elevation view of another EFV in a normal flow configuration and in accordance with principles of the present disclosure.
Figure 22:
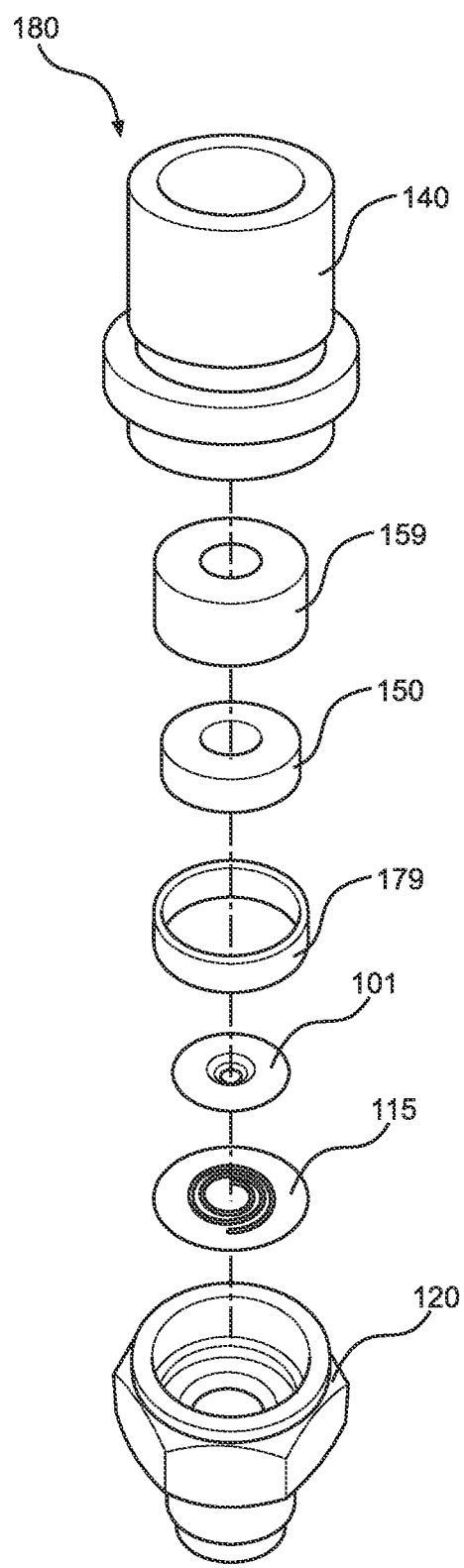
FIG. 22 is an exploded perspective view of the EFV shown in FIG. 21.
Figure 23:
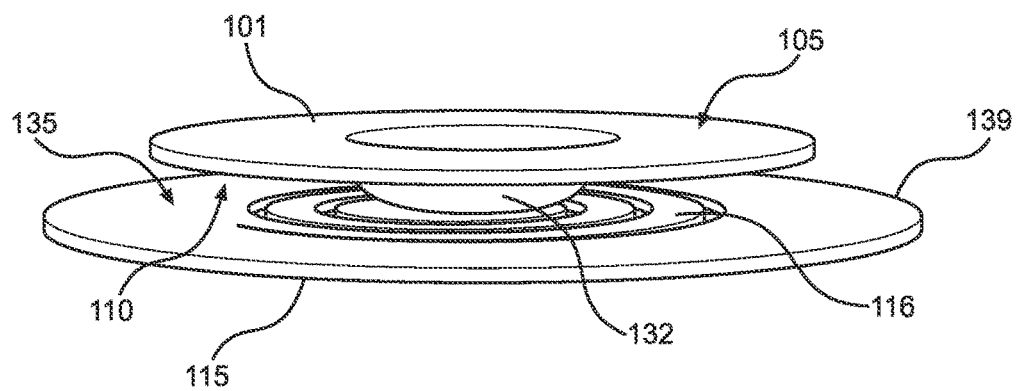
FIG. 23 is a perspective view of a spiral arm member and a sealing disk of the EFV shown in FIG. 21.
Figure 24:
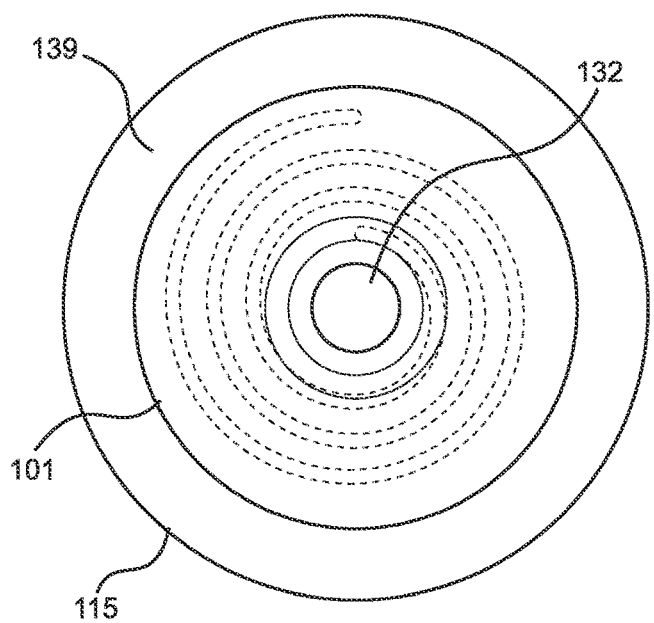
FIG. 24 is a top view of the spiral arm member and the sealing disk shown in FIG. 23.
Figure 25:
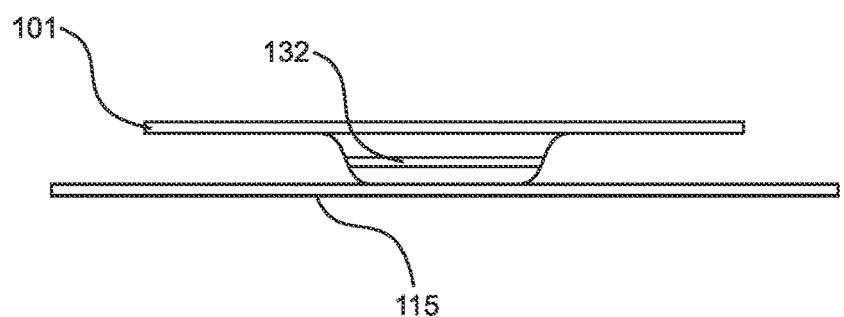
FIG. 25 is a side elevation view of the spiral arm member and the sealing disk shown in FIG. 23.

Also, in the embodiment shown in FIGS. 21 and 22, the intumescent material 150 is retained in a housing 159 that covers the top (upstream) portion and the outer circumference of the intumescent material 150. It also includes a retaining lip around the bottom circumference of the intumescent housing 159. A central axial hollow is open to allow gas flow. This housing 159 sits on top of the retainer and ring 179 directs the expansion of the intumescent material 150 downstream onto the sealing disk 101. In an aspect, the housing 159 may not be used with the EFV 180 as required or desired.

Figure 26:
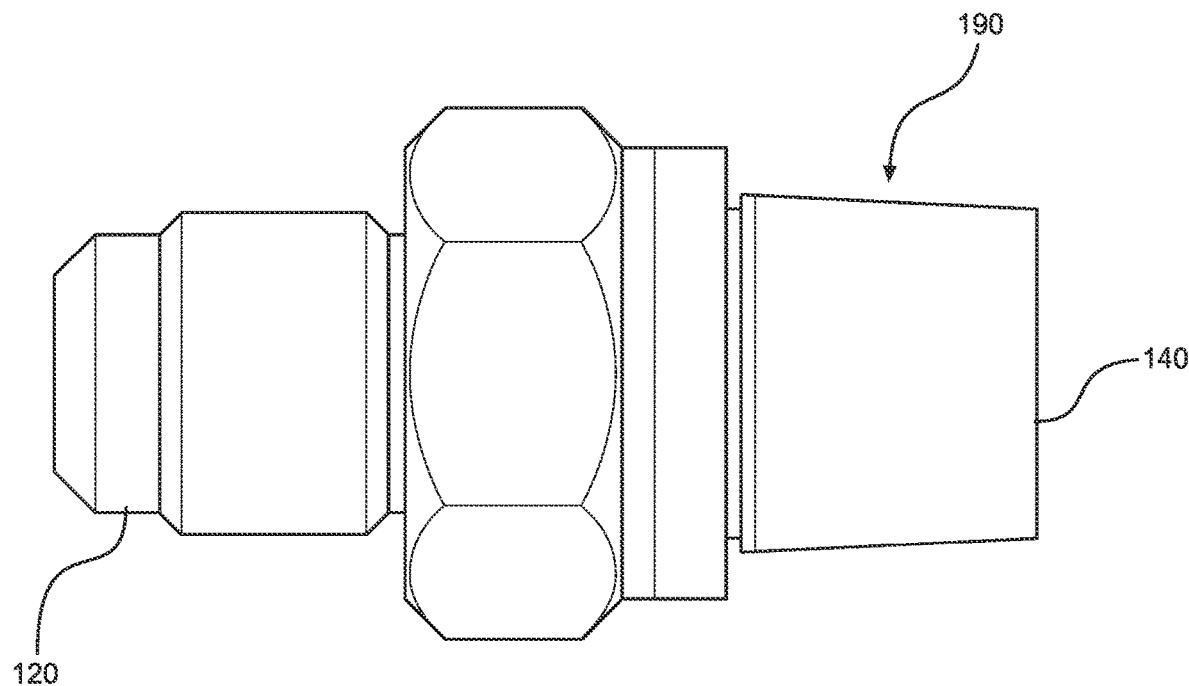
FIG. 26 is a side elevation view of an exterior of an EFV and in accordance with principles of the present disclosure.
Figure 27:
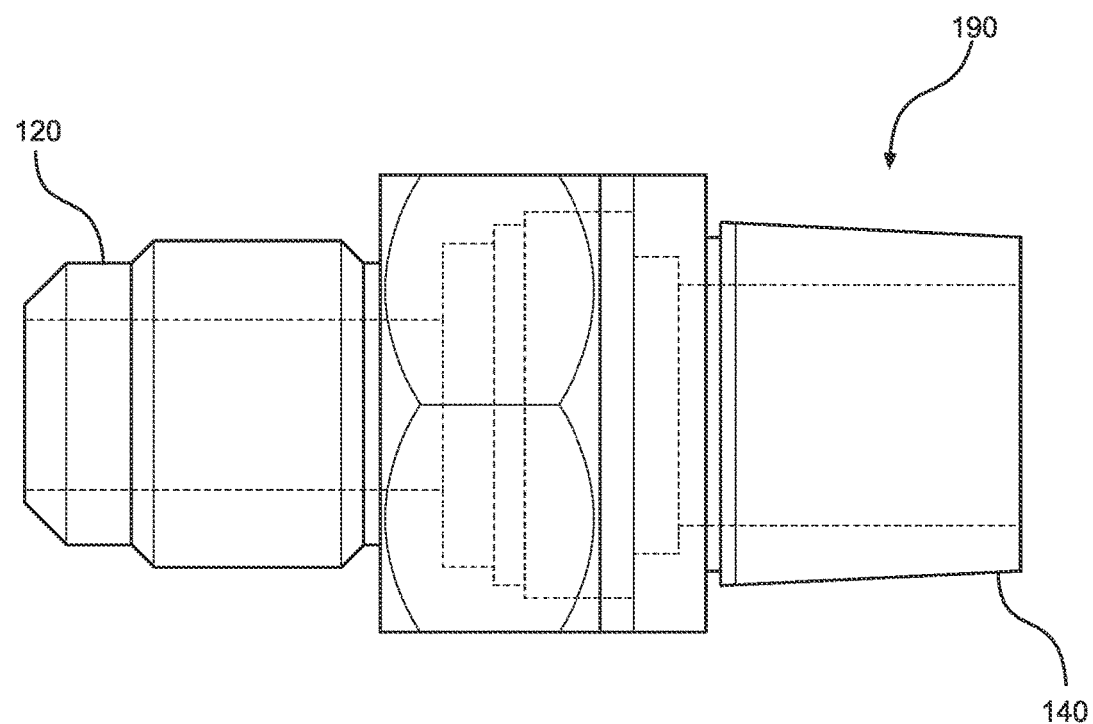
FIG. 27 is another side elevation view of the exterior of the EFV shown in FIG. 26.

FIGS. 26 and 27 shows the exterior of an embodiment of an EFV 190. The spiral arm design allows for a very compact valve assembly. Because of the design of the device, the dimensions of the EFV 190 should be scalable either up or down.

FIGS. 10 and 11 show normal flow conditions (FIG. 10) and excess temperature conditions (FIG. 11) where the intumescent material 150 is activated. The intumescent material is made of a conglomeration of low and high temperature materials that expand many times when heated 106 past a temperature limit. As such, when the intumescent material 150 is heated 106 (e.g., via an external heat source), the intumescent material expands forcing the sealing disk 101 towards a closed flow position. In an embodiment, it is composed of one or more materials that have an activation temperature of expansion of 200° F. to 500° F., such as 250° F. to 400° F., or 275° F. to 350° F. This could be selected to be higher for specialty applications where high temperature are not expected. In an embodiment, the material TENMAT FIREFLY 107is used as the intumescent. In another embodiment, the material includes Fire Barrier Wrap Strip FS-195+ as provided by 3M headquarter in St Paul, Minnesota, USA, though other firestopping or intumescent materials can be used without departing from the scope of the present disclosure.

Notably, the intumescent material is located upstream of the sealing disk 101, which allows it to close the valve by expanding onto and pushing downstream on the sealing disk 101; thereby in some embodiments, requiring less material for a more compact design while also sealing efficiently. In an example, the intumescent material 150 is in a shape of a ring. In an embodiment, the intumescent material is configured permanently seal the EFV. In an embodiment, the intumescent material is configured to seal off any designed leaks or bypasses in the EFV, while not necessarily filling the entire inner diameter or any radial cross-section of the inner axial channel of the valve body.

In an embodiment the EFV is assembled by molding or casting the upstream valve body 140 and the downstream valve body 120. With reference to FIGS. 1-25, the spiral arm member 115 can be laser etched or stamped from a disk of metal. The metal may be, for example, stainless steel, other steels, brass, aluminum, titanium, or beryllium copper may also be used. Beryllium copper (BeCu) may be preferable in some embodiments due to its non-sparking characteristics. An advantage to an all-metal valve is to prevent a charge that could cause sparking. Furthermore, the thin sheet metal of the spiral arm member 115 has such low mass that it should be difficult to create a spark under normal operating conditions. The stamping or laser etching provides a clearance gap for air to flow through and to provide the appropriate resistance to deformation. The thickness of the metal and planar geometry of the spiral arm (clearance gaps, number of turns, number of connections 133 to the outer rim 139, and thickness of the arm) should be adjusted to provide the desired air flow and resistance to deformation to sufficiently restrain the sealing disk 101 from being pushed down and into sealing engagement with the sealing surface 135.

The sealing disk 101 and spiral arm member 115 sub-assembly can be joined by spot welding. In an embodiment they could be adhered together. In another embodiment, the sub-assembly could be molded, cast or three-dimensional printed as a single piece, but likely this would require use of a thermoplastic material instead of metal.

The spiral arm member 115 and sealing disk 101 sub-assembly is dropped into the downstream valve body 120. In an embodiment, the intumescent material 150 (see FIGS. 6-11) is also dropped on top of the spiral arm member 115 and sealing disk 101 sub-assembly. (Optionally, the upstream valve body 140 could retain the sub-assembly instead.) The valve body of the EFV has a ledge that is configured to abut the top (upstream) side of the intumescent material 150 to keep it in place. Other embodiments include a staking feature, lip, or other structure to keep the intumescent material 150 separate from the sealing disk 101. This prevents inadvertently displacing the intumescent material 150 during shipping or jarring and closing the valve.

The other half of the valve body (i.e., the upstream valve body 140) captures and locates the internal components and can be threaded into the downstream valve body 120 or whichever portion has the sub-assembly dropped into it. In an embodiment, (see FIGS. 6-11), a cap 160 is placed on top of the upstream valve body 140 and threaded onto an exterior of the valve body to secure the two pieces of the valve body together. In other example, the cap 160 need not be utilized, and the two pieces of the valve body may couple directly together as described herein.

When combining the upstream and downstream valve bodies 140, 120, a flow gap should be present between the outer edge of the sealing disk 101 and the interior diameter 130 of the downstream valve body 120.

The assembled valve body (as best shown in FIGS. 12-15) may have threads on either end, and be configured to screw into a common size gas pipe, such as, for example, ½ to 2 inches, such as ¾ to 1.5 inches, or 1 to 1.25 inches. Thereby being incorporated into a system with a gas flow source on the upstream end and a gas-powered appliance on the downstream end.

The operation of the EFV will differ according to two sets of conditions: (1) from no flow to normal flow and (2) excess flow conditions. These flow conditions and their effect on the operation of the EFV are illustrated with arrows 102, 104 in FIGS. 1-3, 6-9, and 12-15. Excess flow is determined by meeting or exceeding a threshold pressure differential or flow velocity. Pressure differential would be determined by pressure differences on the downstream and upstream sides of the sealing disk 101. For example, the threshold may be 25,000 BTU/h to 200,000 BTU/h, such as 48,000 BTU/h to 195,000 BTU/h, or 100,000 BTU/h to 150,000 BTU/h.

In no flow or normal conditions, the EFV will be in the positions shown in FIGS. 1, 2, 6, 8, 12, and 14. In these conditions, gas is permitted to flow from the upstream inlet, into a gap between the valve body inner diameter 130 and the sealing disk 101, continuing downstream and toward the center of the valve body past the sealing surface 135 on the edge of the spiral arm member 115, and through the open channels in the spiral arm member 115. The gas will continue to flow through to downstream outlet and to the appliance.

In an embodiment the spiral arm is configured to improve laminar flow conditions through the EFV and into the downstream outlet.

In excess flow conditions, the EFV will be in the positions shown in FIGS. 3, 7, 9, 13, and 15. In excess flow conditions, such as if the pressure spikes or increases due to an abnormal pressure at the source or a leak downstream, the sail 105 will catch enough gas to force it and the spiral arm downstream with the flow of gas and cause the sealing plug 110 to come into sealing engagement with the sealing surface 135, stopping the flow of gas until the pressure or flow subsides to a safe flow. In an embodiment, the sail 105, sealing surface 135, sealing plug 110, and spiral arm member 115 allow for a small amount of leak, or bypass, to allow the valve to reset once an acceptable pressure, or flow, is maintained.

In an embodiment, an additional and unexpected feature of the EFV is that the free-floating sealing disk 101 suspended on the spiral arm member 115 when it begins to activate, makes an audible vibration noise. In some situations, this "early-warning" noise may alert the user to a problem before it becomes serious enough to trigger the full shut-off of the gas supply.

Figure 28:
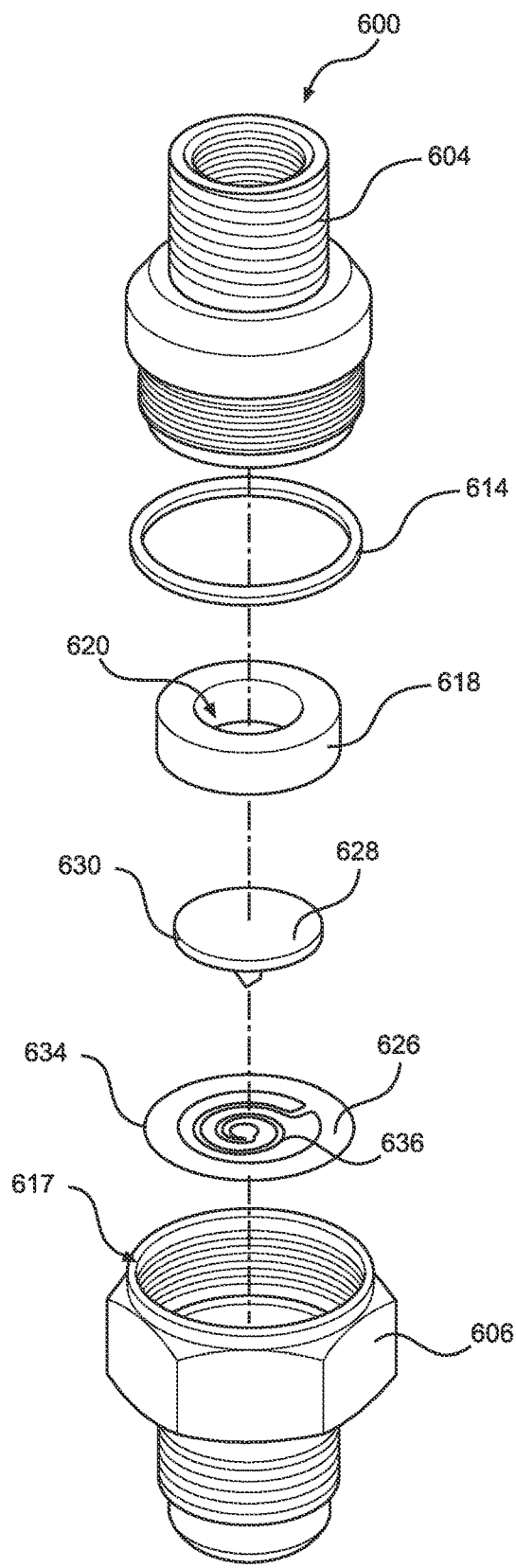
FIG. 28 is an exploded perspective view of another EFV and in accordance with principles of the present disclosure.
Figure 29:
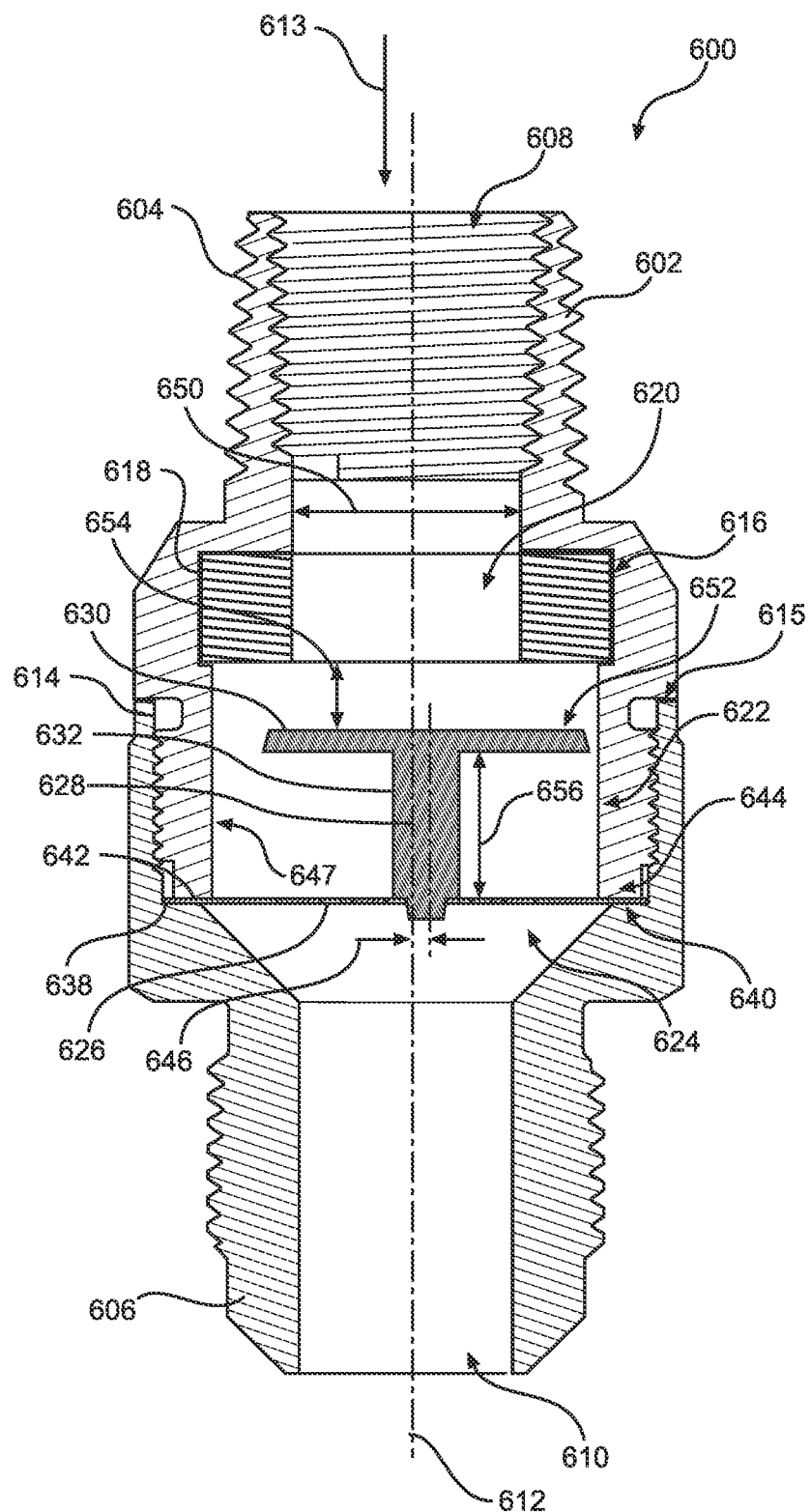
FIG. 29 is a cross-sectional elevation view of the EFV shown in FIG. 28 and in a normal flow configuration.

FIG. 28 is an exploded perspective view of another EFV 600 according to embodiments of the present disclosure. FIG. 29 provides a cross-sectional elevation view of the EFV 600 and in a normal flow configuration. Referring concurrently to FIGS. 28 and 29, the EFV includes a valve body 602 with an inlet housing 604 and an outlet housing 606. The inlet housing 604 defines an inlet opening 608 and the outlet housing 606 defines an opposite outlet opening 610. The inlet opening 608 and the outlet opening 610 define a central axis 612 and forms a flow path to receive a flow of fluid 613 (e.g., gas) through the valve body 602 as described herein. In the example, the flow of fluid 613 enters the valve body 602 at the inlet opening 608 and is configured to exit the valve body 602 at the outlet opening 608, unless substantially restricted as described herein (e.g., via the valve assembly and/or intumescent material). The terms upstream and downstream are used herein with reference to the direction of the flow of fluid 613 such that components and/or surfaces that are facing the direction of the flow of fluid 613 are upstream components and/or surfaces, while components and/or surfaces that are facing away from the direction of the flow of fluid 613 are downstream components and/or surfaces.

As indicated in FIG. 29, the inlet housing 604 and the outlet housing 606 are configured to couple together (e.g., via a threaded connection). The EFV 600 can include an O-ring seal 614 positioned between the inlet housing 604 and the outlet housing 606 for providing a substantially fluid tight seal therebetween. In certain examples, the O-ring seal 614 is received within a chamber or cavity 615 defined in the inlet housing 604 and is configured to engage an inner surface 617 of the outlet housing 606 adjacent or proximate to the connection (e.g., the threaded connection between the housings).

A first chamber 616 is defined within the valve body 602 adjacent and in flow communication with the inlet opening 608. The first chamber 616 is shaped and sized to receive intumescent material 618. In the example, the intumescent material 618 has a generally hollow cylindrical shape or ring-like shape such that in a normal or open flow configuration (e.g., as shown in FIG. 29) fluid can flow through a center aperture 620 therein. The intumescent material 618 is configured to configured to radially expand to substantially restrict, inhibit, or prevent the flow of gas through the valve body 602 upon reaching a threshold temperature. The functionality of the intumescent material 618 is described further below in reference to FIG. 31. A second chamber 622 is also defined within the valve body 602. The second chamber 622 is downstream and in flow communication with the first chamber 616. In an aspect, the first chamber 616 is directly adjacent to the second chamber 622 axially along the central axis 612.

The EFV 600 also includes a valve assembly 624 that is disposed at least partially within the second chamber 622. The valve assembly 624 is configured to selectively allow the flow of fluid through the valve body 602 and upon predetermined conditions (e.g., excess flow) close and substantially reduce, inhibit, or prevent flow through the valve body 602. In the example, the valve assembly 624 is positioned downstream of the intumescent material 618. The valve assembly 624 includes a biasing member 626 and a sealing disk 628. In some aspects, the sealing disk 628 may be referred to as a poppet. The poppet 628 includes a disc 630 and a stem or stem portion 632 extending from one side of the disc 630. The stem 632 generally includes an elongated body that is configured to be coupled to the biasing member 626 such that the poppet 628 is positioned at least partially within the second chamber 622. In certain examples, the biasing member 626 is formed from a metallic material, such as a metal plate, while the poppet 628 is formed from a plastic or other polymeric material and can include a molded plastic component. In an aspect, the poppet 628 may be coupled to the biasing member 626 by a press fit, a friction fit, a heat stake, or other similar connection type. It is appreciated that the biasing member 626 and the poppet 628 may be formed from any material that enables the function of the valve assembly 624 as described herein. The biasing member 626 and the poppet 628 generally are formed using different materials, but can be formed using the same material without departing from the scope of the present disclosure.

The biasing member 626 may be similar to the spiral arm member 115 described above and be a metal plate that includes an outer rim 634 and a spiral arm 636 that is disposed at least partially within the outer rim 634. The biasing member 626 is described further below in reference to FIG. 33. In order to secure the valve assembly 624 within the valve body 602, the outlet housing 606 includes an annular shoulder 638 that at least partially defines the second chamber 622. A downstream surface 640 of the outer rim 634 is configured to be positioned directly against the shoulder 638 and an end face 642 of the inlet housing 604 is used to hold down an upstream surface 644 of the outer rim 634 so that the biasing member 626 is secured within the valve body 602. In an aspect, the inlet housing 604 and the outlet housing 606 may compress or pinch the outer rim 634 so as to secure placement of the biasing member 626 within the valve body 602 when the inlet housing 604 and the outlet housing 606 are coupled together.

As illustrated in FIG. 29, the valve assembly 624 is shown in a normal or open flow configuration, whereby fluid (e.g., gas) is configured to flow through the valve body 602 and out of the outlet opening 610. As such, the biasing member 626 has a biased position that is substantially orthogonal to the central axis 612 and the spiral arm 636 is substantially disposed within a plane defined by the outer rim 634. The biasing member 626 in the normal flow configuration is substantially parallel to the inlet opening 608, the outlet opening 610, and the disc 630. The biasing member 626 supports the poppet 628 such that the stem 632 extends axially within the valve body 602 and is substantially parallel to the central axis 612. In the normal flow configuration, the disc 630 is in its closest position to the intumescent material 618 within the valve body 602.

In the example, as indicated in FIG. 29, the stem 632 has a longitudinal axis that is offset 646 from or eccentric in relation to the central axis 612 of the valve body 602. The stem 632, however, is centered with respect to the disc 630. As such, the disc 630 is also offset relative to the central axis 612 of the valve body 602. In an aspect, the poppet 628 is eccentrically positioned within the valve body 602 and within the second chamber 622 in the normal flow configuration. The outer perimeter of the disc 630, however, is still spaced from an inner surface 647 of the second chamber 622 so that gas can flow through the valve assembly 624 when in the normal flow configuration. However, one side of the outer perimeter of the disc 630 is positioned closer to the inner surface 647 of the second chamber 622 than an opposite side of the outer perimeter of the disc 630 as illustrated in FIG. 29. The disc 630 has a diameter 648 (shown in FIG. 32) that is greater than a diameter 650 of the inlet opening 608. The outer rim 634 of the biasing member 626, however, is centered with respect to the central axis 612 so that the valve assembly 624 can be secured within the valve body 602. The diameter 650 of the inlet opening 608 is substantially equal to the diameter of the center aperture 620 of the intumescent material 618 so as to not restrict fluid flow during normal operation. In another aspect, the diameter 650 of the inlet opening 608 is smaller than the diameter of the center aperture 620 of the intumescent material 618 so that the intumescent material 618 further reduces impact on the fluid flow through the first chamber 616. In an example, the downstream inner edge of the center aperture 620 (e.g., the side adjacent the second chamber 622) may be chamfered.

FIG. 29 further indicates that an upstream sail surface 652 of the disc 630 is downstream of the intumescent material 618 and spaced apart therefrom. In an aspect, the poppet 628 is not in direct contact with the intumescent material 618. In an example, the size of the second chamber 622 is such that a gap 654 between the upstream sail surface 652 of the disc 630 and the intumescent material 618 is between 15%-50% of a height 656 of the stem 632. The gap 654 enables the intumescent material 618 to be activated via heat (e.g., expand and substantially close off the first chamber 616 to substantially reduce, inhibit, or prevent flow of fluid through the valve body 602) without substantially engaging the valve assembly 624. As such, in an aspect, the intumescent material 618 is configured to substantially restrict gas flow through the valve body 602 when activated and without use of the poppet 628. In aspects, the height 656 of the stem 632 may be adjusted so as to change the trip flow rating of the EFV 600. Further, by not positioning the intumescent material 618 within the second chamber 622, the second chamber 622 can be sized and shaped to reduce turbulent or other unwanted flow conditions around the valve assembly 624 and increase performance of the EFV 600. That is, the size and shape of the second chamber 622 can increases laminar flow around the poppet 628 so as to reduce or eliminate undesirable oscillation of the poppet 628. Restricting oscillation of the poppet 628 also reduces wear on the valve assembly 624 and audible noise, thereby increasing performance of the EFV 600.

In operation of the EFV 600 in the normal or open flow configuration, the biasing member 626 supports the poppet 628 such that a downstream sealing surface 658 (shown in FIG. 32) is axially spaced from the upstream surface 644 of the outer rim 634 and so that the flow of gas is allowed to pass through the valve assembly 624. Based on the flow of gas through the valve body 602, the EFV 600 may move towards an excess or closed flow configuration whereby the valve assembly 624 closes based on the excess flow of the gas and substantially reduces, inhibits, or prevents the flow of gas through the valve body 602. In examples, normal flow conditions include an EFV with a flow capacity between 61,000 Btu/h-290,000 Btu/h at a 5 inch water column. For example, a ⅜ inch valve has a normal flow condition of around 66,800 Btu/h, a ½ inch valve around 111,000 Btu/h, ⅝ inch valve around 122,500 Btu/h, and a 1 inch valve around 159,000 Btu/h. The excess flow configuration is described below in reference to FIG. 30.

Figure 30:
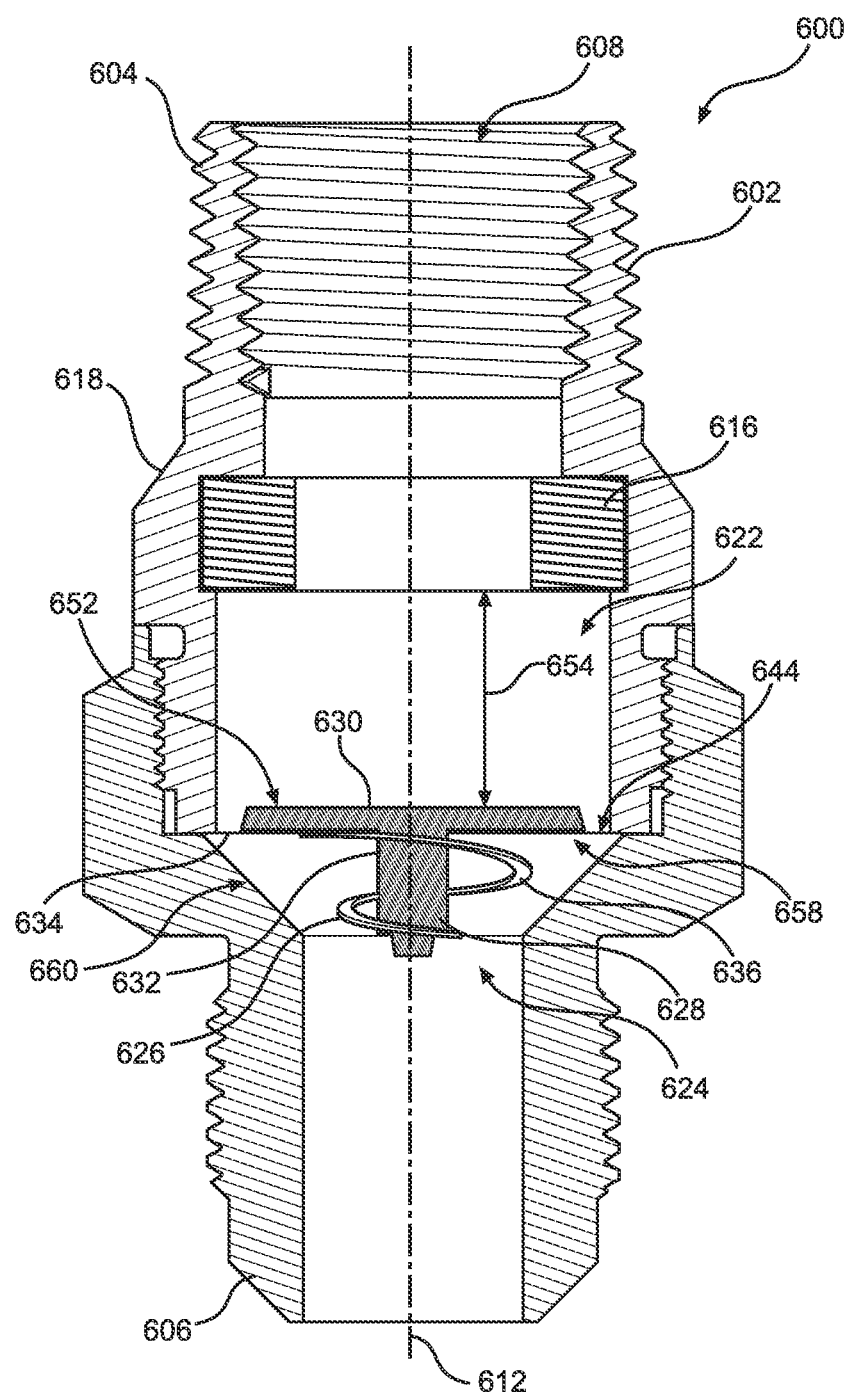
FIG. 30 is a cross-sectional elevation view of the EFV shown in FIG. 28 and in an excess flow configuration.

FIG. 30 is a cross-sectional elevation view of the EFV 600 in an excess or closed flow configuration. Certain components are described above and not necessarily described further. In the excess flow configuration, excess gas flow acts on the upstream sail surface 652 of the poppet 628 and overcomes the biasing force of the biasing member 626 such that the poppet 628 moves within the valve body 602 and seals against the outer rim 634 of the biasing member 626 while the spiral arm 636 elongates in a downstream direction and away from the disc 630. In the example, the downstream sealing surface 658 of the disc 630 engages with the upstream surface 644 of the outer rim 634 to form the seal of the valve assembly 624 and to substantially reduce, inhibit, or prevent flow through the valve assembly 624. In the example, the poppet 628 does not directly engage with the valve body 602 in either the normal flow configuration (FIG. 29) nor the excess flow configuration (FIG. 30). Rather, the sealing of the valve assembly 624 occurs directly between the biasing member 626 and the poppet 628.

The movement of the poppet 628 between the normal flow configuration and the excess flow configuration includes both an axial direction component and a radial direction component. That is, while the poppet 628 is eccentric relative to the central axis 612 in the normal flow configuration (shown in FIG. 29), the poppet 628 is axially aligned with the central axis 612 in the excess flow configuration. As such, the longitudinal axis of the stem 632 is co-axially aligned with the central axis 612 in the excess flow configuration and the disc 630 is also centered with respect to the central axis 612. In an aspect, the outer perimeter of the disc 630 may be substantially equally spaced from the inner surface of the second chamber 622. This movement of the poppet 628 is enabled by the stem 632 being coupled to the free end (e.g., disk support 172 shown in FIG. 33) of the spiral arm 636 and the size and shape of the spiral arm 636. In an aspect, the extension of the spiral arm 636 at least partially captures the stem 632 therein while in the excess flow configuration.

The valve body 602 also defines a third chamber 660 that is downstream and in in flow communication with the second chamber 622. In an example, the first chamber 616 and the second chamber 622 may be formed in the inlet housing 604, while the third chamber 660 is formed in the outlet housing 606. The third chamber 660 has a frustoconical shape and is configured to at least partially receive the valve assembly 624 in the excess flow configuration. The third chamber 660 also enables the poppet 628 to move into positions that are between the illustrated normal flow configuration (shown in FIG. 29) and the excess flow configuration (FIG. 30) while not being completely closed to fluid flow. In the example, the disc 630 of the poppet 628 may be disposed within the second chamber 622, while the stem 632 and the spiral arm 636 may be disposed within the third chamber 660. The outer rim 634 may be positioned between the second chamber 622 and the third chamber 660.

The shape and size of the third chamber 660 allows the valve assembly 624 to move within the valve body 602 without contacting the inner surface of the valve body 602. That is, the sealing functionality of the valve assembly 624 is independent from the valve body 602. This configuration increases performance of the EFV 600. For example, the valve seal of the valve assembly 624 is formed on the biasing member 626 and is substantially orthogonal to the central axis 612. As such, during movement of the poppet 628 during excess flow conditions, the poppet 628 is reduced or prevented from getting stuck or catching on other component surfaces during movement for opening or closing of the valve assembly 624. Further, because the poppet 628 does not substantially slide relative to its sealing surface (the poppet 628 substantially axially contacts the biasing member), the valve assembly 624, and thus, the EFV valve 600, has increased reliability so that the valve assembly 624 does not close inadvertently and interrupt normal operations.

When the EFV 600 is in the excess flow configuration, the upstream sail surface 652 of the disc 630 is still downstream of the intumescent material 618 and spaced apart therefrom. In an aspect, the poppet 628 is not in direct contact with the intumescent material 618 in either the normal flow configuration nor the excess flow configuration. In an example, the size of the second chamber 622 is such that the gap 654 between the upstream sail surface 652 of the disc 630 and the intumescent material 618 is the majority of the second chamber 622. The gap decreases turbulent flow at the valve assembly 624 so as to increase performance of the valve assembly 624 and decrease inadvertent closure during normal operations. In some aspects, the gap 654 is more than the height 656 of the stem 632 (shown in FIG. 29). Additionally, if an excess flow configuration occurs with an excess temperature configuration, the gap 654 enables the intumescent material 618 to be activated without substantially disturbing the valve assembly 624.

In operation of the EFV 600 in the excess flow configuration, the excess flow force overcomes the biasing force of the biasing member 626 such that the downstream sealing surface 658 engages with the upstream surface 644 of the outer rim 634 to substantially restrict, inhibit, or prevent the flow of gas through the valve assembly 624. When excess flow is removed from the EFV 600, the valve assembly 624 may automatically return to the normal flow configuration. The excess flow configuration of the EFV 600 may be at least partially based on a predetermined threshold value for fluid flow. As described further below, the shape and size of the valve assembly 624 may be based as at least partially on this predetermined threshold value. In examples, excess flow conditions include an EFV with a rated trip flow between 80,000 Btu/h-325,000 Btu/h at a 5 inch water column. For example, a ⅜ inch valve has a rated trip flow condition of around 101,000 Btu/h, a ½ inch valve around 223,000 Btu/h, ⅝ inch valve around 217,000 Btu/h, and a 1 inch valve around 290,000 Btu/h. The rated trip flow may even have greater flow limits as required or desired, for example, between 141,100 Btu/h-406,000 Btu/h.

Figure 31:
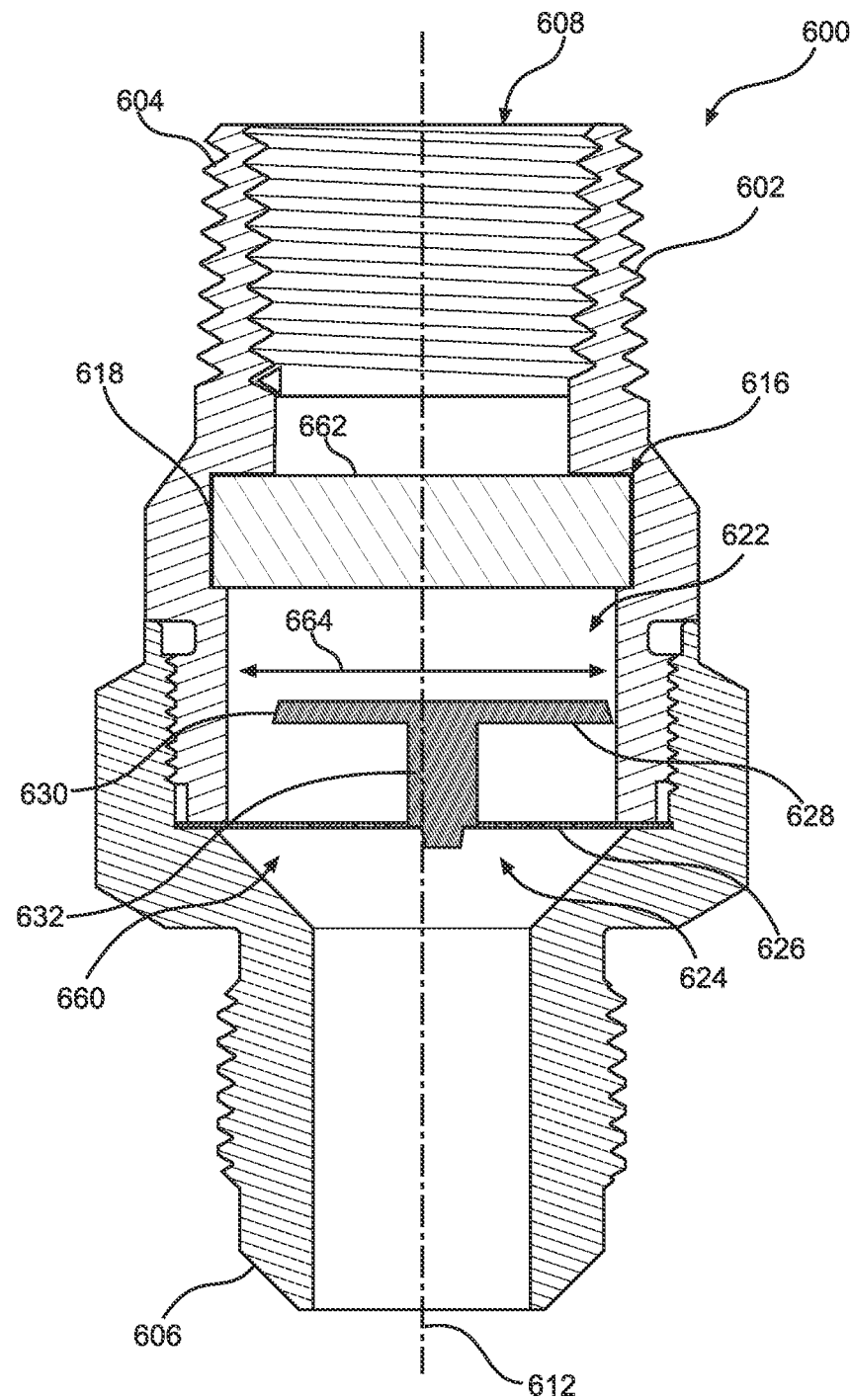
FIG. 31 is a cross-sectional elevation view of the EFV shown in FIG. 28 and in an excess temperature configuration.

FIG. 31 is a cross-sectional elevation view of the EFV 600 and in an excess temperature configuration. Certain components are described above and not necessarily described further. As described herein, the intumescent material 618 is heat activated so as to substantially reduce, inhibit, or prevent flow through the valve body 602 and close the first chamber 616. In the example, the intumescent material 618 is substantially independent from the valve assembly 624, and thus, closing off flow through the valve body 602 due to heat occurs without actuation of the valve assembly 624. In an example, the intumescent material 618 is configured to extend radially inwards towards the central axis 612 and enclose the center aperture 620 (shown in FIG. 29) to substantially restrict, inhibit, or prevent gas flow when activated. When the intumescent material 618 is activated, the intumescent material 618 substantially closes off the inlet opening 608 of the valve body 602. In an aspect, the intumescent material 618 is configured to expand more in a radial direction than an axial direction when activated and independently restricts, inhibits, or prevents flow through the valve body 602 with respect to the valve assembly 624. It is appreciated that inconsequential contact between the intumescent material 618 and the valve assembly 624 may occur when the intumescent material 618 is activated. The intumescent material 618, however, unlike the valve assembly 624, once activated will not return to an operational configuration.

The intumescent material 618 is configured to close the first chamber 616 and the flow of fluid through the valve body 602 when a threshold temperature is experienced by the EFV 600. As such, when the EFV 600 is subjected to increased temperature, fluid flow is substantially restricted, inhibited, or prevented, thereby reducing the risk of catastrophic events such as a fire and/or an explosion. In aspects, the activation temperature of the intumescent material 618 is between 200° F. and 500° F.

In the example, the intumescent material 618 is disposed within the first chamber 616. The first chamber 616 has a diameter 662 that is radially greater than a diameter 664 of the second chamber 622. As such, the first chamber 616 is discrete from the second chamber 622, although the both are in flow communication. The diameter 662 of the first chamber 616 and the diameter 664 of the second chamber 622 are also both greater than the diameter 650 of the inlet opening 608 (shown in FIG. 29). The intumescent material 618 may be secured within the first chamber 616 via adhesive, friction fit, press fit, or any other securement type. By placing the intumescent material 618 upstream of the valve assembly 624, the intumescent material 618 reduces its influence on the flow of fluid through the valve body 602 and generating turbulent or other unwanted flow condition for the valve assembly 624. In an example, the intumescent material 618 is configured to begin expansion sequence around 300° F., while significant expansion occurs around 350° F. In an aspect, expansion of the intumescent material 618 increases the size of the intumescent material 618 by a factor of around 4-12. In an example, the size of the intumescent material 618 increases by a factor of about 8. The thermal conductivity of the intumescent material 618 may be around 2.4 BTU-in/hr/ft$^2$/° F.

Figure 32:
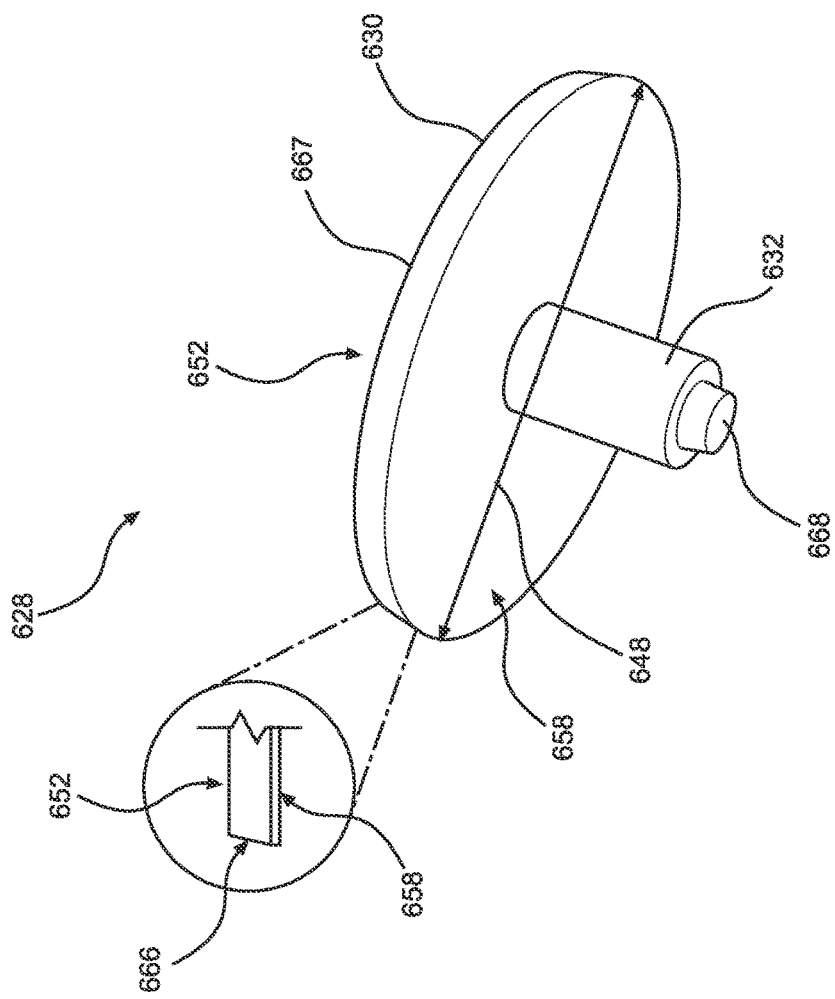
FIG. 32 is a perspective view of a sealing disk of the EFV shown in FIG. 28.

FIG. 32 is a perspective view of the sealing disk 628. The sealing disk 628, also known as the poppet 628, includes the disc 630 with the upstream sail surface 652 and the downstream sealing surface 658. The upstream sail surface 652 is shaped and sized to receive the flow of fluid through the valve body 602 (shown in FIG. 28). The downstream sealing surface 658 is configured to selectively engage with the biasing member 626 (shown in FIG. 33) and substantially reduce or prevent flow in excess flow configuration. In an aspect, the size (e.g., diameter) of the upstream sail surface 652 is slightly smaller than the size (e.g., diameter 648) of the downstream sealing surface 658). As such, an outer circumferential surface 666 that forms the outer perimeter of the disc 630 flares radially outward. This flare or chamfer 667 increases fluid flow around the disc 630 and decreases turbulence during operation of the EFV. The stem 632 extends from the downstream sealing surface 658 and is centered thereon. A distal end of the stem 632 includes a post 668 for coupling to the biasing member 626 as described herein.

Figure 33:
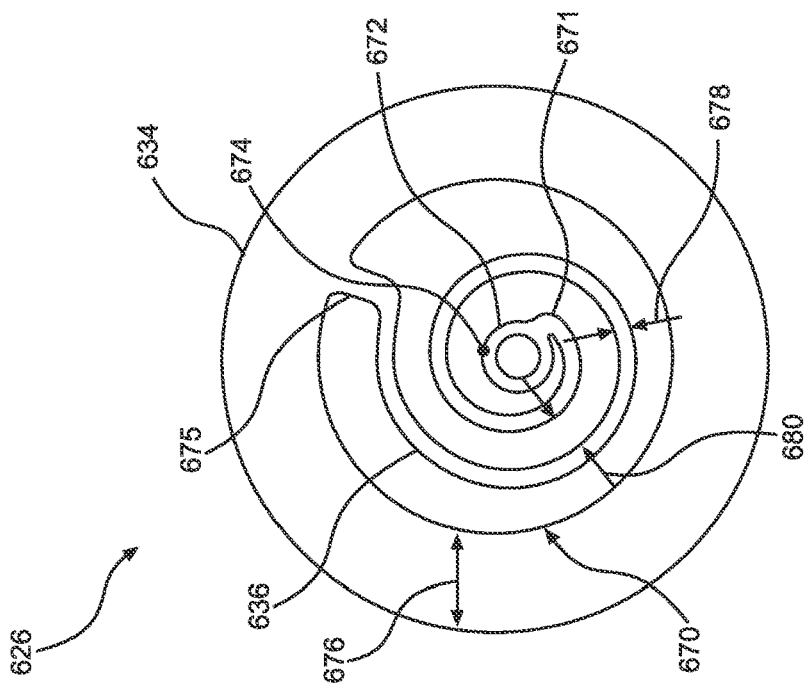
FIG. 33 is a plan view of a biasing member of the EFV shown in FIG. 28.

FIG. 33 is a plan view of the biasing member 626. The biasing member 626 includes the outer rim 634 and the spiral arm 636. The spiral arm 636 extends within a center opening 670 of the outer rim 634. A free end 671 of the spiral arm 636 includes a disk support 672, the disk support 672 being eccentrically positioned within the outer rim 634 when in the biased configuration as illustrated. That is, the disk support 672 is offset from a center point 674 of the center opening 670 and the biasing member 626 is a flat, planar component in the biased, normal flow configuration. In the example, the spiral arm 636 extends from the outer rim 634 at a single connection point. This single connection point may include a substantially radially extending portion 675. As described above, in the excess flow condition, the eccentricity of the sealing disk 628 relative to the biasing member 626 goes away when the valve assembly moves toward the closed position.

The outer rim 634 has a width 676 that is greater than a width 678 of the spiral arm 636. This configuration enables the outer rim 634 to maintain a stiffness for creating a sealing surface with the poppet 628 (shown in FIG. 32), while also enabling the spiral arm 636 to generate a biasing force. The outer rim 634 and the spiral arm 636 are integral with one another and formed from the same material. In aspects, the biasing member 626 may be stamped, laser cut, additively manufactured, or formed any other way that enables the biasing member 626 to function as described herein.

The shape and size of the spiral arm 636 (e.g., material thickness, width, and length) is designed to generated the biasing force for the poppet 628 as described herein. The biasing force of the biasing member 626 is configured to reduce oscillation of the poppet 628 in operation of the EFV so as to increase performance. Additionally, the shape and size of the spiral arm 636 along with the height 656 of the stem 632 of the poppet 628 (shown in FIG. 29) can at least partially determine the trip flow rating of the EFV. In an aspect, the width 678 may be substantially consistent through the length of the spiral arm 636. The number of helical turns and spacing of helical turns may be at least partially based on the biasing force required or desired by the biasing member 626. The number and spacing of helical turns may also at least partially determine the position of the disk support 672. In an aspect, the number of helical turns may be at least one 360° turn around the disk support 672. In another aspect, the number of helical turns may be at least 540° around the disk support 672. The configuration of the biasing member 626 increases performance of the valve assembly 624. For example, the spiral arm 636 opens (e.g., the spiral arm 636 spacing increases) when moving towards the excess flow configuration to provide increased passage area for fluid flow and reduces inadvertent closing during normal flow operation. In an aspect, the spiral arm 636 has a spacing 680 while in the biased configuration as illustrated in FIG. 33. This spacing 680 increases in length between the edges of the spiral arm 636 as the poppet 628 moves towards the closed position so as to provide for increased passage area for fluid flow and reducing inadvertent closing during normal flow operation.

Because the biasing member 626 is a flat, planar component, the geometry of the spiral arm 636 is such that its spring functionality works in both axial directions relative to the outer rim 634. As such, the biasing member 626 can be placed in either planar eccentric orientation within the EFV and enable operation of the valve as described herein.

Figure 34:
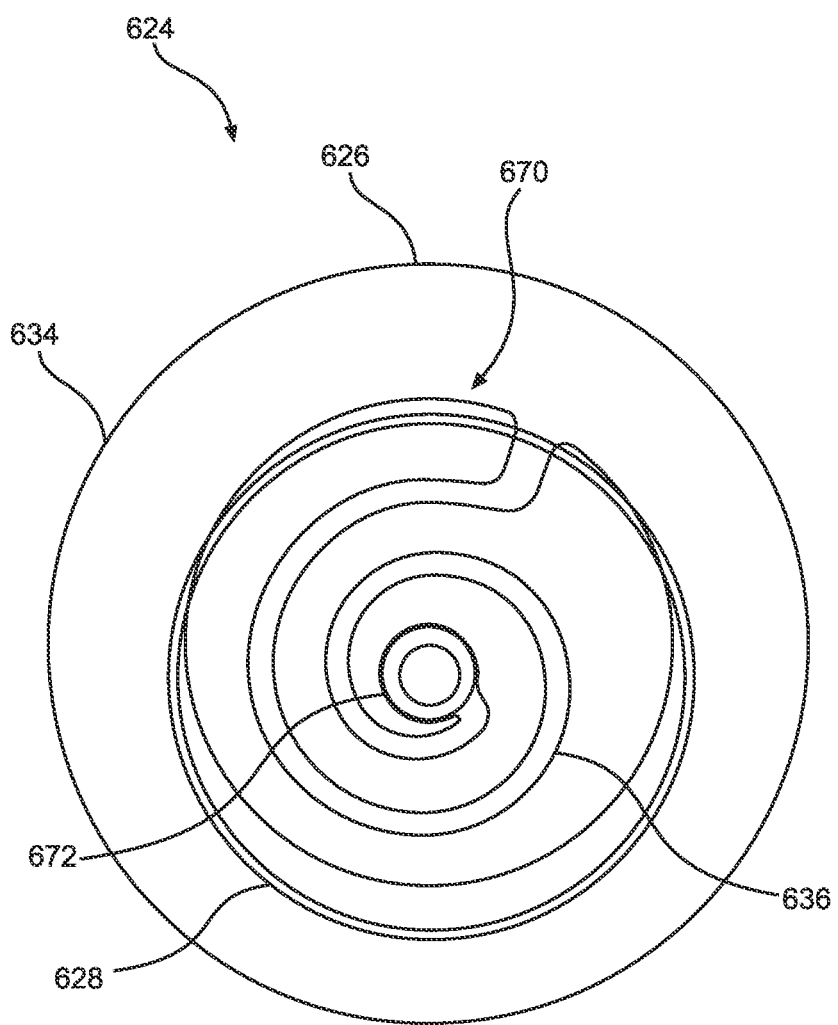
FIG. 34 is a top plan view of the sealing disk and the biasing member shown in FIGS. 32-33.

FIG. 34 is a top plan view of the sealing disk 628 and the biasing member 626, with the sealing disk 628 illustrated as transparent so as to view the portion of the biasing member 626 underneath. The valve assembly 624 is in the normal flow configuration, and thus, the sealing disk 628 is eccentric to and offset relative to biasing member 626. As such, a portion of the center opening 670 of the outer rim 634 is not axially covered by the sealing disk/poppet 628. The eccentricity of the poppet 628 in relation to the outer rim 634 facilitates full closure of the valve assembly 624 during excess flow conditions. As such, the poppet 628 is enabled to engage the outer rim 634 to seal the valve assembly 624. In operation, the poppet 628 is offset or eccentric in the initial, released position and is in line with or concentric with the center axis in the closed, sealed position. This further allows for there to be one attachment point between the spiral arm 636 (e.g., the spring arm that is resilient and the coiled portion of the biasing member) and the outer rim 634 (e.g., spring body/base), while allowing the lower, sealing surface of the poppet 628 to align with the upper, sealing surface of the outer rim 634. Additionally, the valve assembly 624 may also enable some bypass flow through the valve assembly 624 even in the closed position so that when the excess flow configuration is removed, the valve assembly 624 can automatically release and equalize pressure, and without manual repositioning. To enable bypass flow, a channel in the valve body may be utilized as described herein in other examples (e.g., bypass channels 172, 307, 507).

Figure 38:
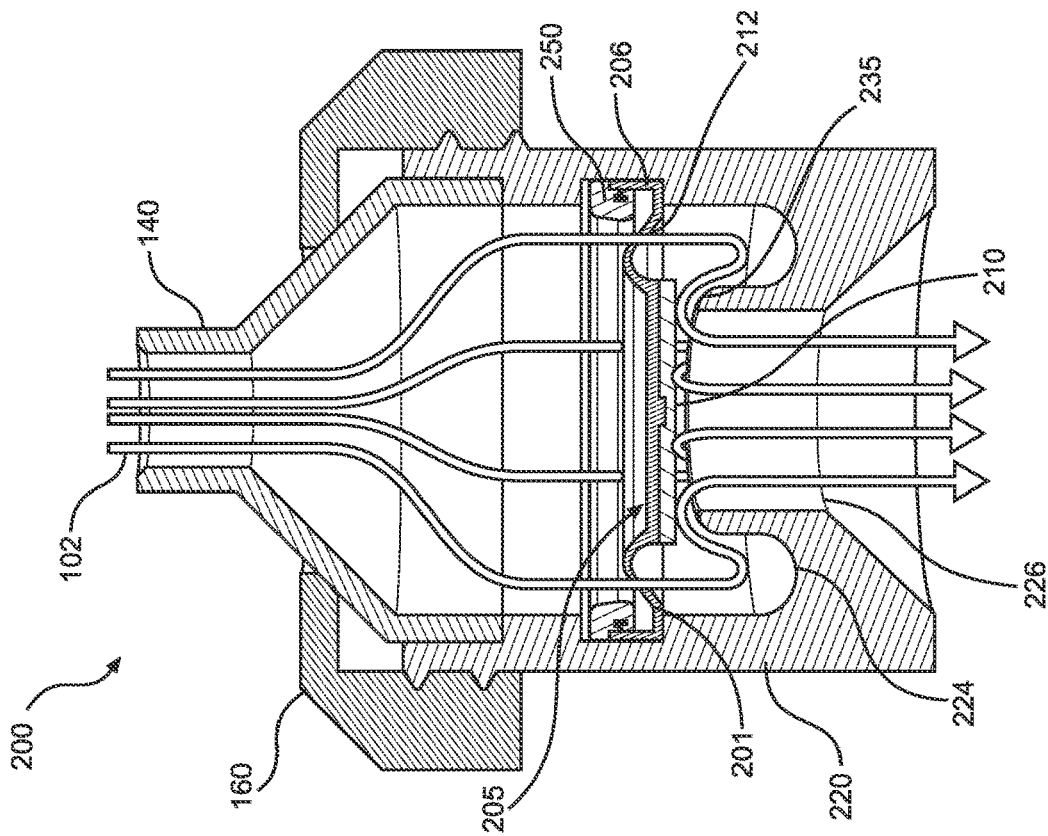
FIG. 38 is a cross-sectional elevation view of the EFV shown in FIG. 35 and in the excess flow configuration.
Figure 39:
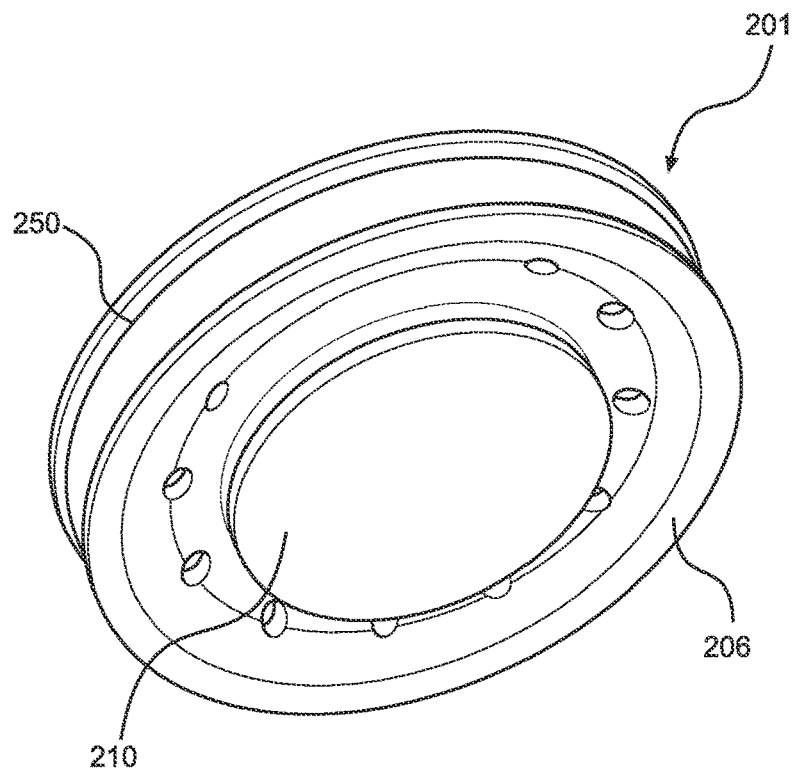
FIG. 39 is a perspective view of a flexible membrane of the EFV shown in FIG. 35.
Figure 40:
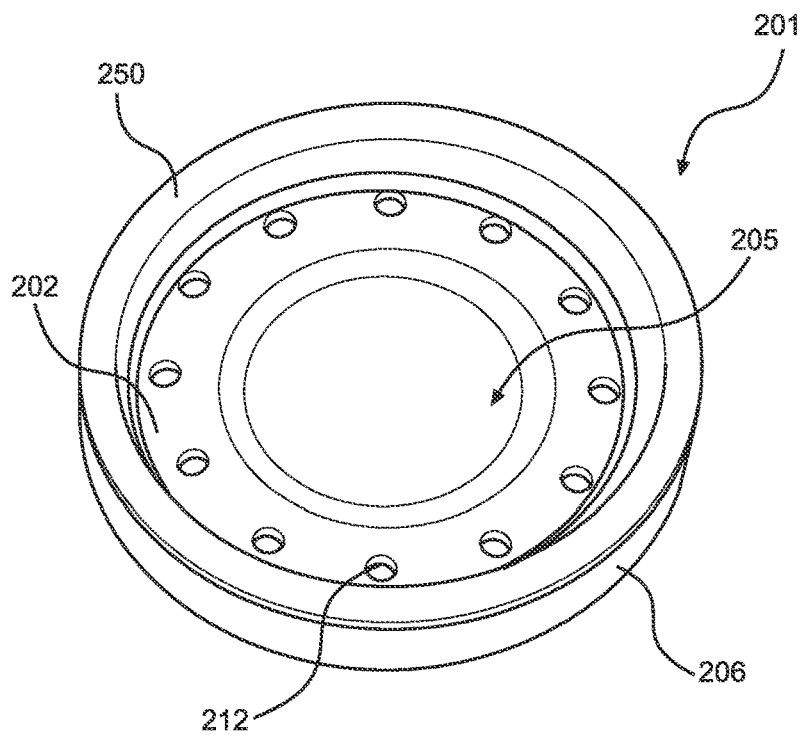
FIG. 40 is another perspective view of the flexible membrane shown in FIG. 39.

FIGS. 35-42 disclose another embodiment of an EFV 200 that uses a flexible membrane 201 instead of the spiral arm member 115 and sealing disk 101 described above. The flexible membrane 201 includes a sail 205 on a central area on its upstream side and a sealing plug 210 in a central area on the downstream side. The sail 205 and sealing plug 210 function in a similar matter as disclosed above for the similar components in FIGS. 1-34. Around the outer ring 202 of the flexible membrane are several passageways 212, as shown, there are twelve passageways 212, but this number could vary (e.g. 3 to 48, such as 6 to 24, or 10 to 16). These are best seen in FIGS. 39 and 40. These passageways are of sufficient number and diameter to permit normal flow of gas to the appliance, but not so large as to prevent the sail 205 from pushing down onto the sealing surface 235 and closing the valve in excess flow conditions. Notably, the outer ring of the flexible membrane 201 has a domed ring geometry allowing for travel of the central area in the upstream and downstream directions. This domed geometry exerts more of influence to resist upstream travel under normal flow conditions and less bias towards downstream movement under normal conditions.

The downstream valve body 220 has a circumferential channel 224 with an upstream-facing opening (as shown, the channel has a rounded bottom and is semi-toroidal) that surrounds a central flow tube 226. The channel 224 provides clearance and aids in the flow of air through the device.

Figure 41:
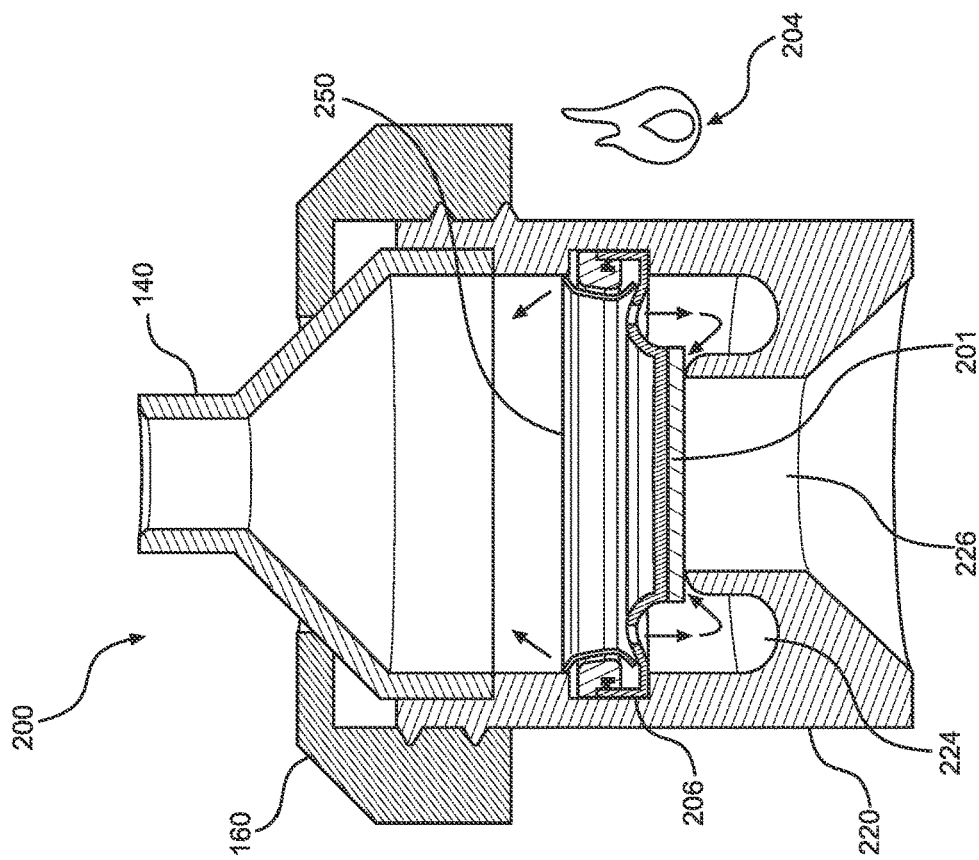
FIG. 41 is another cross-sectional elevation view of the EFV shown in FIG. 35 and in the normal flow configuration.
Figure 42:
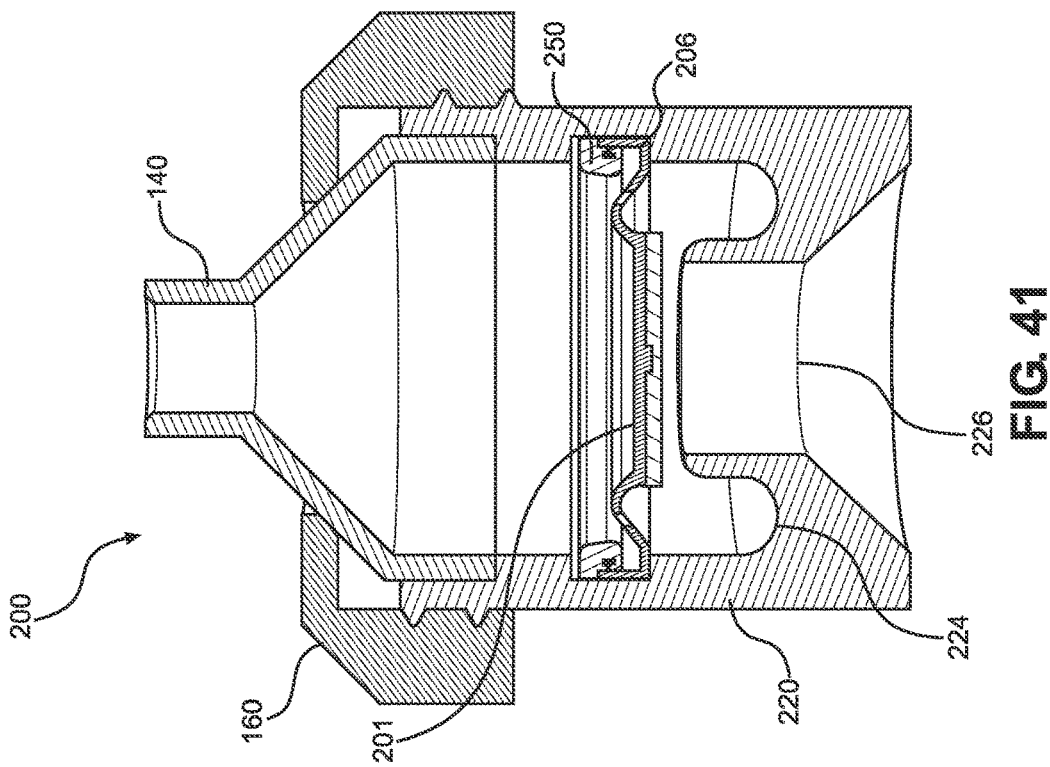
FIG. 42 is a cross-sectional elevation view of the EFV shown in FIG. 35 and in an excess temperature configuration.
Figure 44:
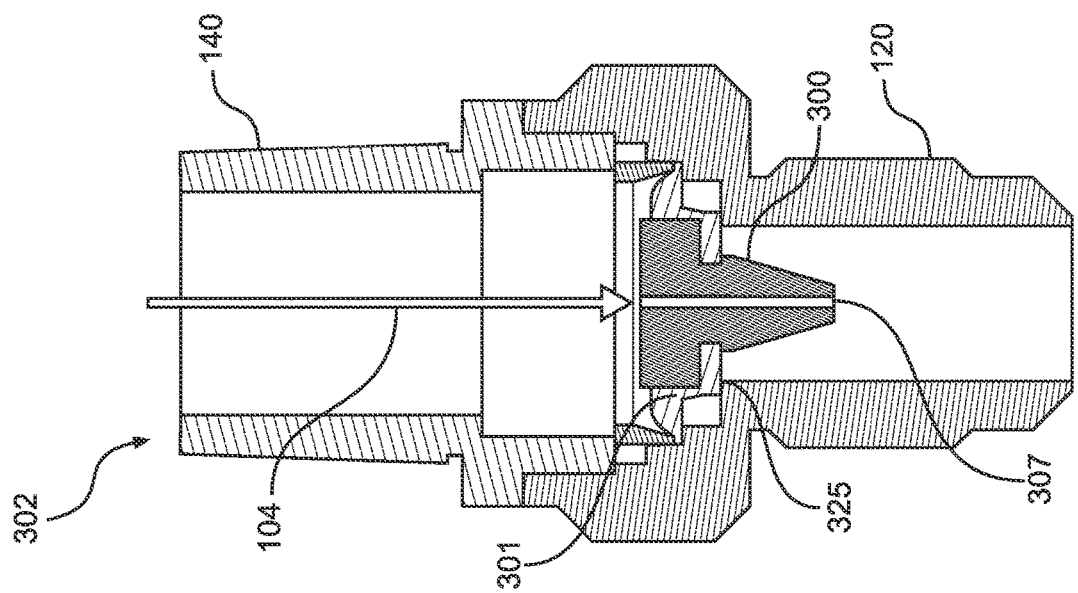
FIG. 44 is a cross-sectional elevation view of the EFV shown in FIG. 43 and in an excess flow configuration.

In this embodiment, the intumescent material 250 has a recess that is configured to receive a protruding ring 206 on the flexible membrane 201. This aids in retaining the flexible membrane 201 in place. FIGS. 41 and 42 illustrate the operation of the intumescent material 250 in normal (FIG.

41) and excess temperature conditions (FIG. 42). As shown the intumescent material 250 is configured to expand inwardly and downstream to exert pressure on the flexible membrane 201 to push the sealing plug 210 into permanent sealing engagement with the sealing surface 235 when an external heat source 204 is applied to the intumescent material. Again, in this embodiment the amount and configuration of the intumescent material is sufficient to close the valve without expanding into the entire inner diameter of the valve body.

The rest of the components of the embodiment of FIGS. 35-42 are the same as or similar to the embodiments of FIGS. 1-34 described above. The method of operation of the embodiment of FIGS. 35-42 is similar as disclosed for FIGS. 1-34.

Figure 36:
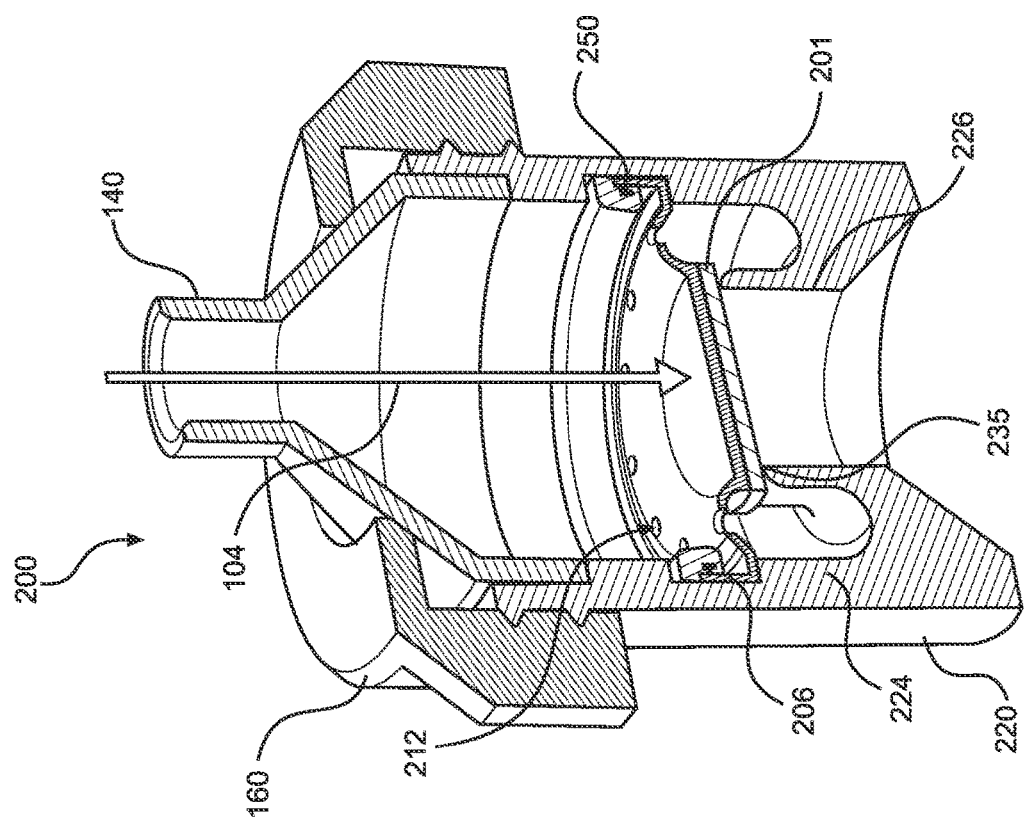
FIG. 36 is a cross-sectional perspective view of the EFV shown in FIG. 35 and in an excess flow configuration.
Figure 35:
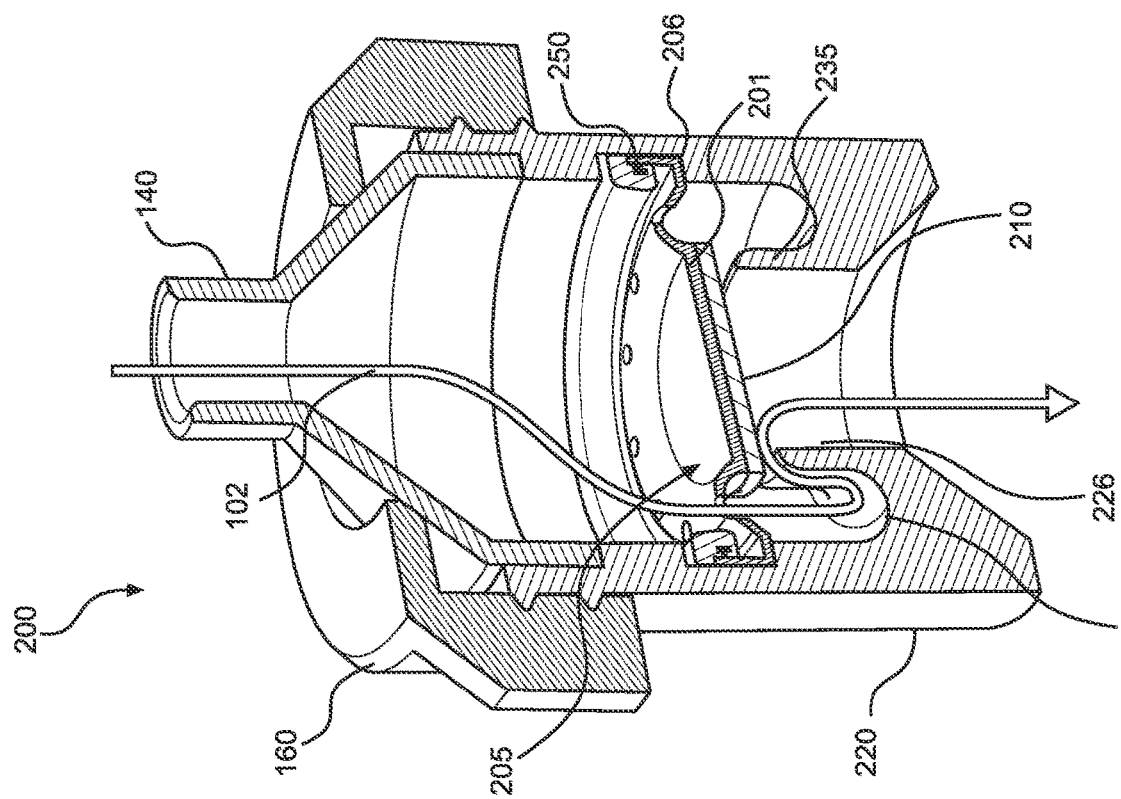
FIG. 35 is a cross-sectional perspective view of another EFV in a normal flow configuration and in accordance with principles of the present disclosure.
Figure 37:
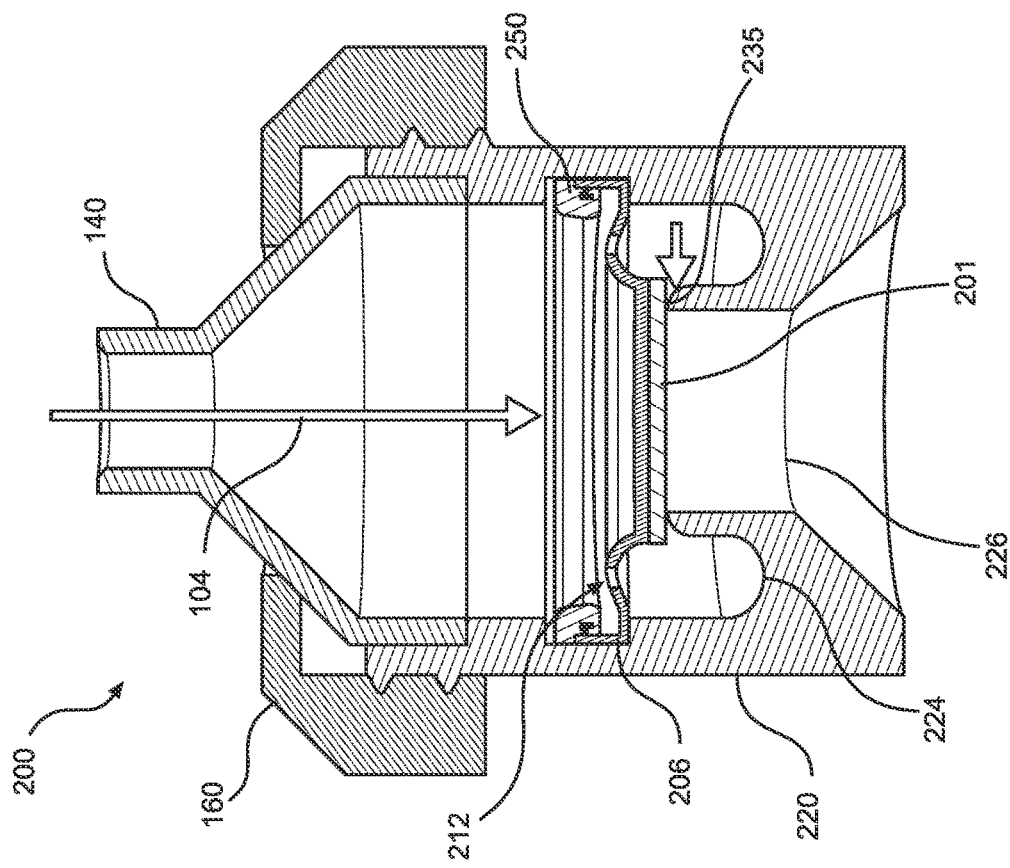
FIG. 37 is a cross-sectional elevation view of the EFV shown in FIG. 35 and in the normal flow configuration.

The operation of the EFV 200 will differ according to two sets of conditions: (1) from no flow to normal flow (FIGS. 35 and 37) and (2) excess flow conditions (FIGS. 36 and 38). The flexible membrane 201 is designed to flex in a manner similar to a speaker. Instead of gas flowing through a gap around the sail, in the embodiment of FIGS. 35-42, gas flows through the passageways 212 to get from the source to the inlet and to the outlet and to the appliance. Valve shut-off is triggered excess flow that is sufficient push the sail 205 down, forcing the sealing plug 210 onto the sealing surface 235.

The flexible membrane is formed of a semi-rigid material, such as a thermoplastic or thermoset material. The sealing plug 210 may be formed of a more elastomeric deformable material allowing for a better seal under pressure. The sealing plug 210 may be joined to the reminder of the flexible membrane with an adhesive or a mechanical fit. An outer edge of the flexible membrane can be formed of or reinforced by a rigid material (e.g. hard plastic or metal) to support the intumescent material 250 and overall stability of the cartridge in the valve body, otherwise it can be formed of the intumescent material itself, such as in FIGS. 39 and 40. An adhesive or a mechanical fit may be used to join them.

The flexible membrane 201 along with the intumescent material 250 can be sub-assembled as a drop-in cartridge. An adhesive or a mechanical fit may be used to join them. The cartridge sub-assembly is dropped into the downstream valve body 220 similar to described above. The remainder of the assembly is as described above.

FIGS. 43-47 show an alternate embodiment of an EFV 302 with a flexible membrane that shares most characteristics with the embodiment of FIGS. 35-42. However, in this embodiment, an axially extending (meaning having length longer in the axial direction that the radial direction) semi-rigid insert 300 is provided that occupies a central portion of the flexible membrane 301 and includes a bypass central channel 307 extending axially through it. This insert 300 provides stability and additional weight to improve the sealing surface 325 of the seal when excess flow conditions trigger it. The bypass central channel 307 allows a small amount of flow even when the valve is shut, and helps equilibrate pressure to allow the valve to reopen when the excess flow condition is over. This embodiment also has an intumescent material 350 with a different geometry that extends further the down and acts as a rigid stabilizer around nearly the entire length of the rim of the sub-assembly of the flexible membrane 301 and intumescent material 350. The geometry of the insert 300 is such that it allows for a press-fit into a central area of the flexible membrane 301 and it is also configured to lock in place.

Another difference from the prior embodiment described in FIGS. 35-42, is that the channel 224 is not used. Instead a lip is used which terminates and provides a sealing surface further downstream.

Figure 43:
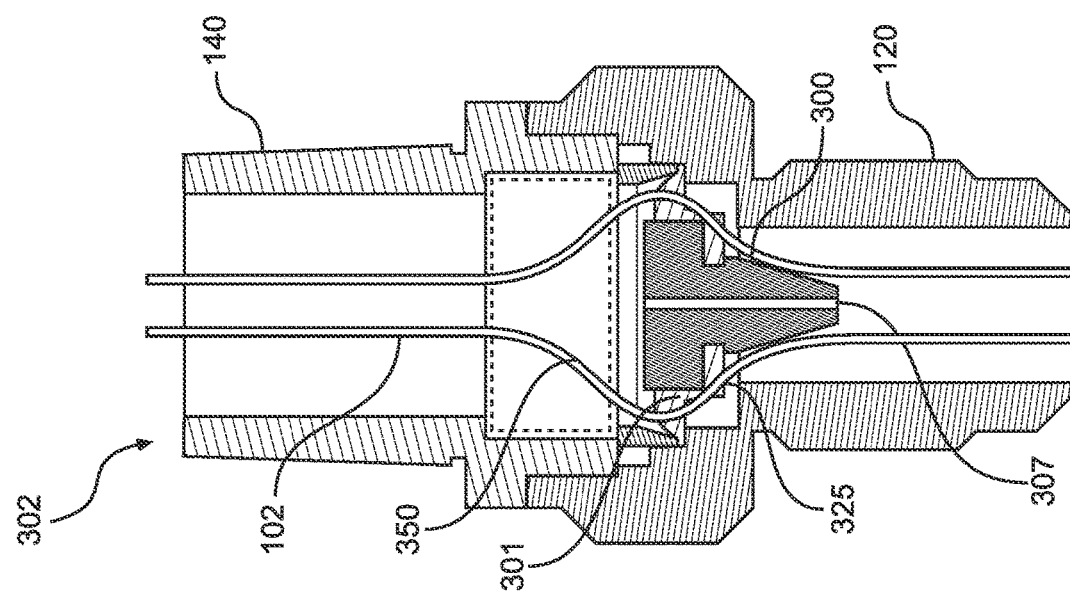
FIG. 43 is a cross-sectional elevation view of another EFV in a normal flow configuration and in accordance with principles of the present disclosure.

The rectangle on FIG. 43 is the location that the intumescent material 350 can be added. In other examples, the intumescent material 350 may be disposed further downstream in this embodiment of the device.

Figure 45:
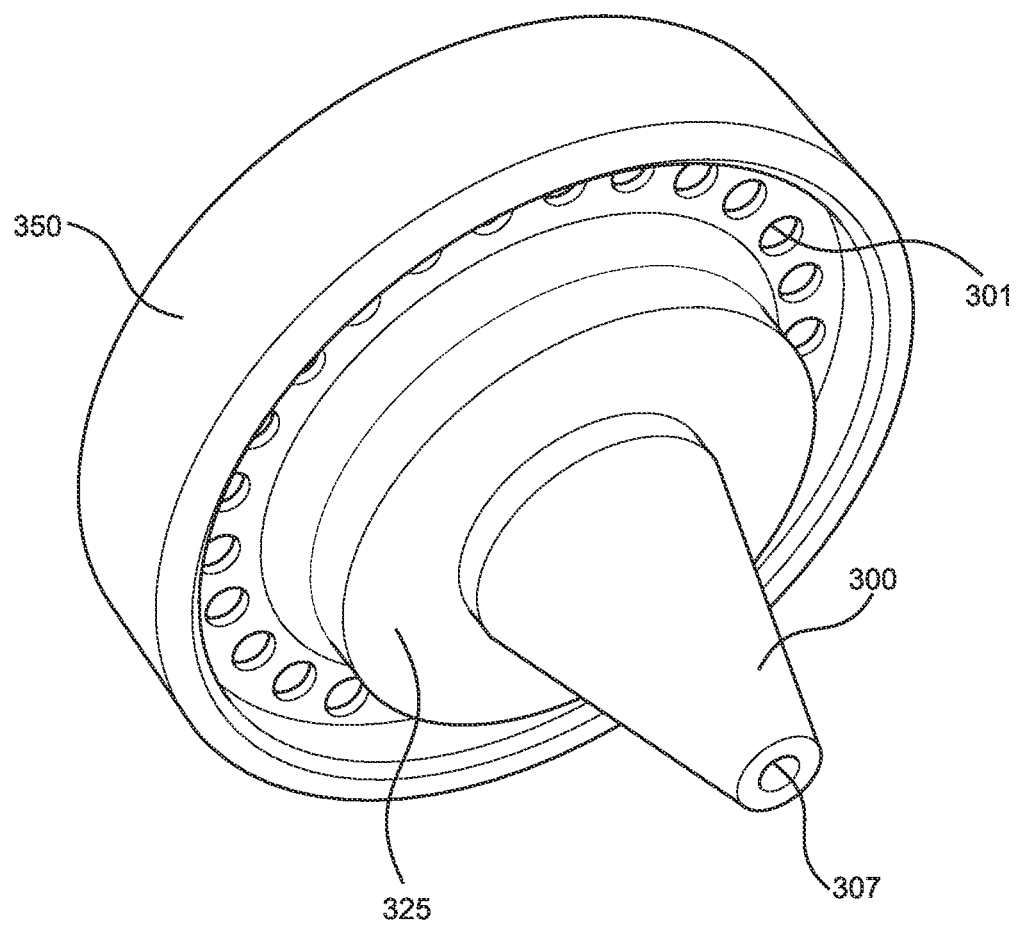
FIG. 45 is a perspective view of a flexible membrane and an intumescent material of the EFV shown in FIG. 43.

FIG. 45 shows an isolated perspective view of the flexible membrane 301 and intumescent material 350 sub-assembly.

Figure 47:
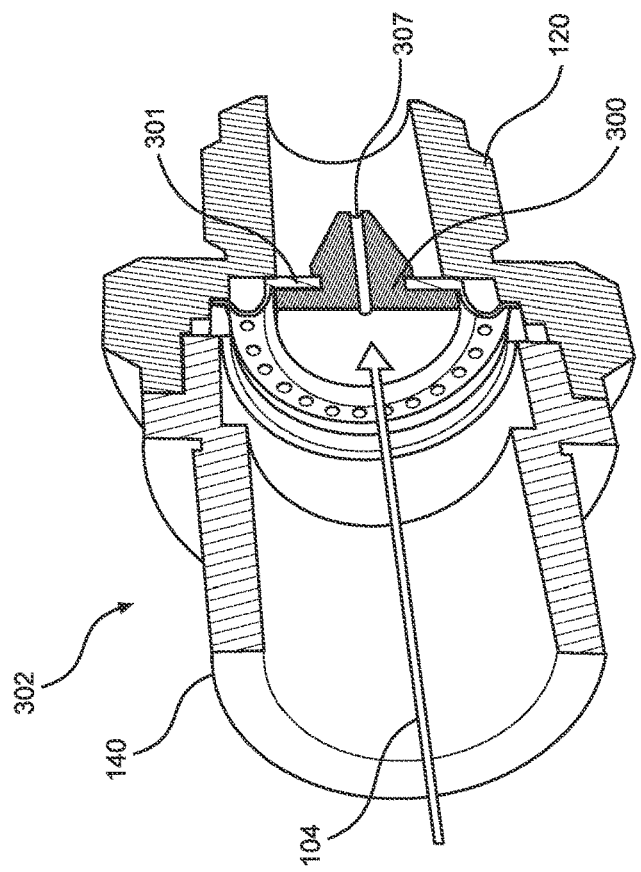
FIG. 47 is a cross-sectional perspective view of the EFV shown in FIG. 43 and in the excess flow configuration.
Figure 46:
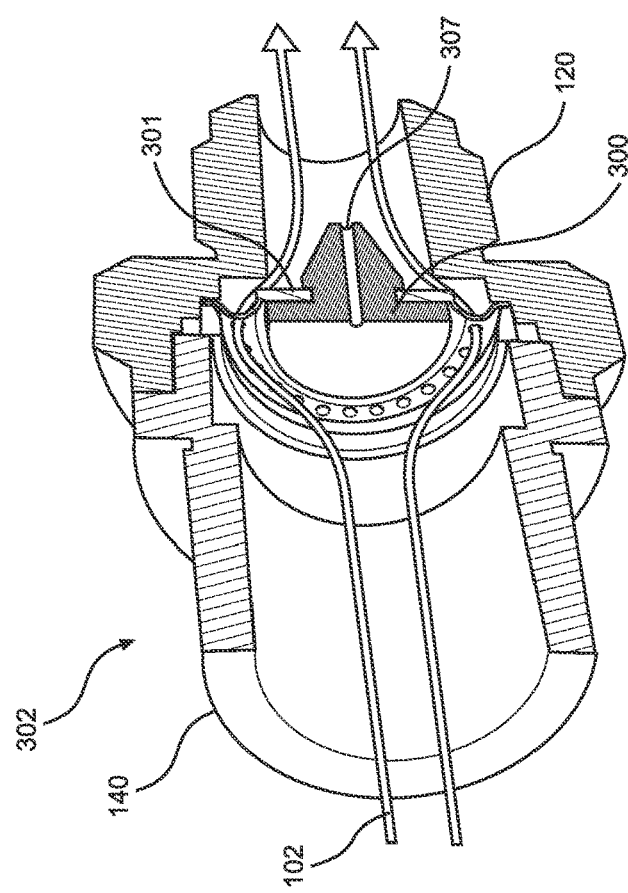
FIG. 46 is a cross-sectional perspective view of the EFV shown in FIG. 43 and in the normal flow configuration.
Figure 49:
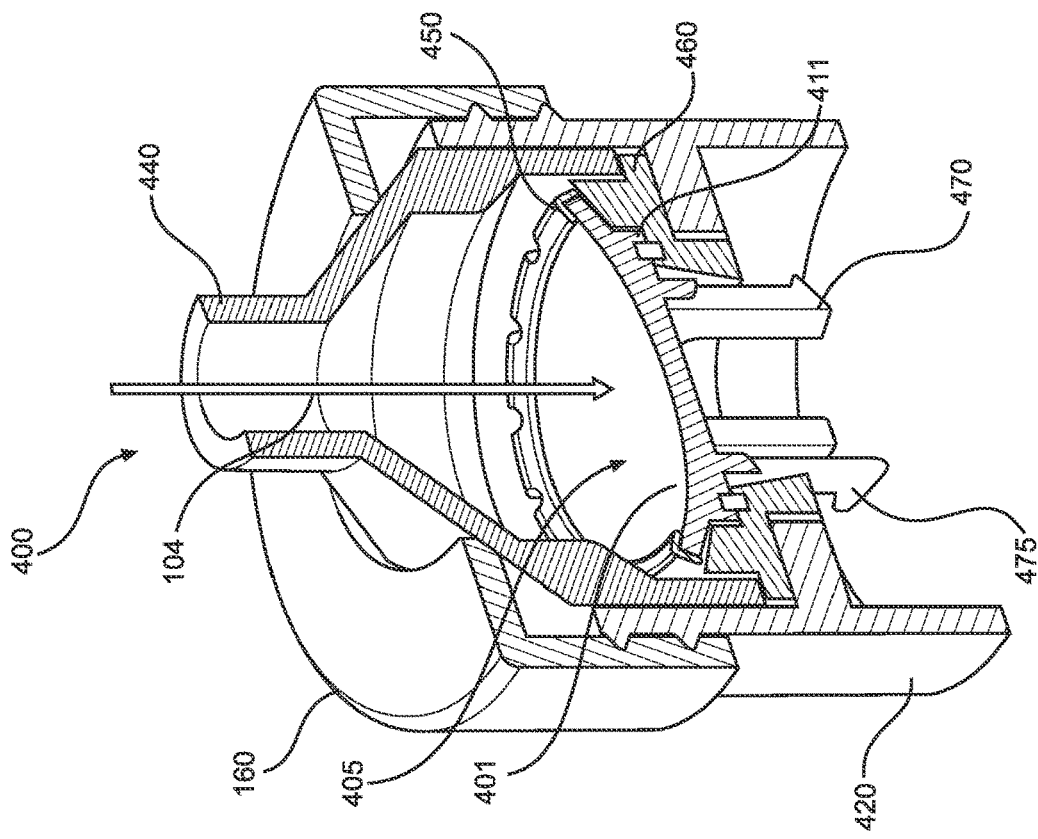
FIG. 49 is a cross-sectional perspective view of the EFV shown in FIG. 48 and in an excess flow configuration.
Figure 48:
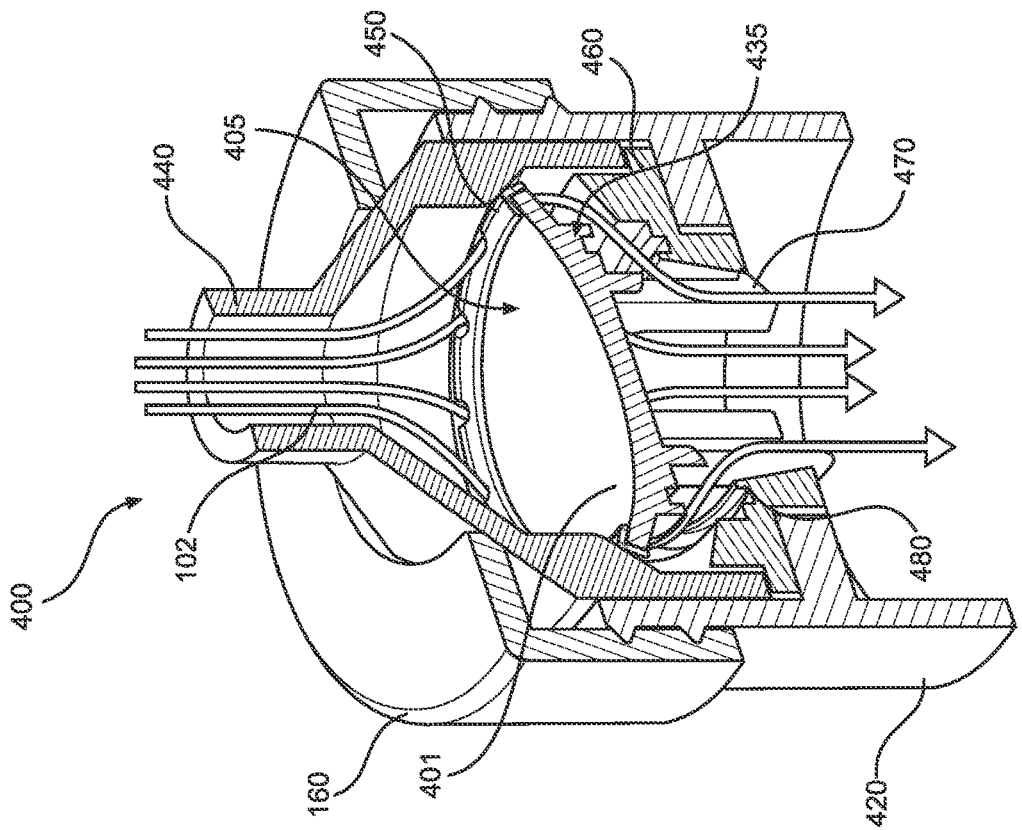
FIG. 48 is a cross-sectional perspective view of another EFV in a normal flow configuration and in accordance with principles of the present disclosure.
Figure 51:
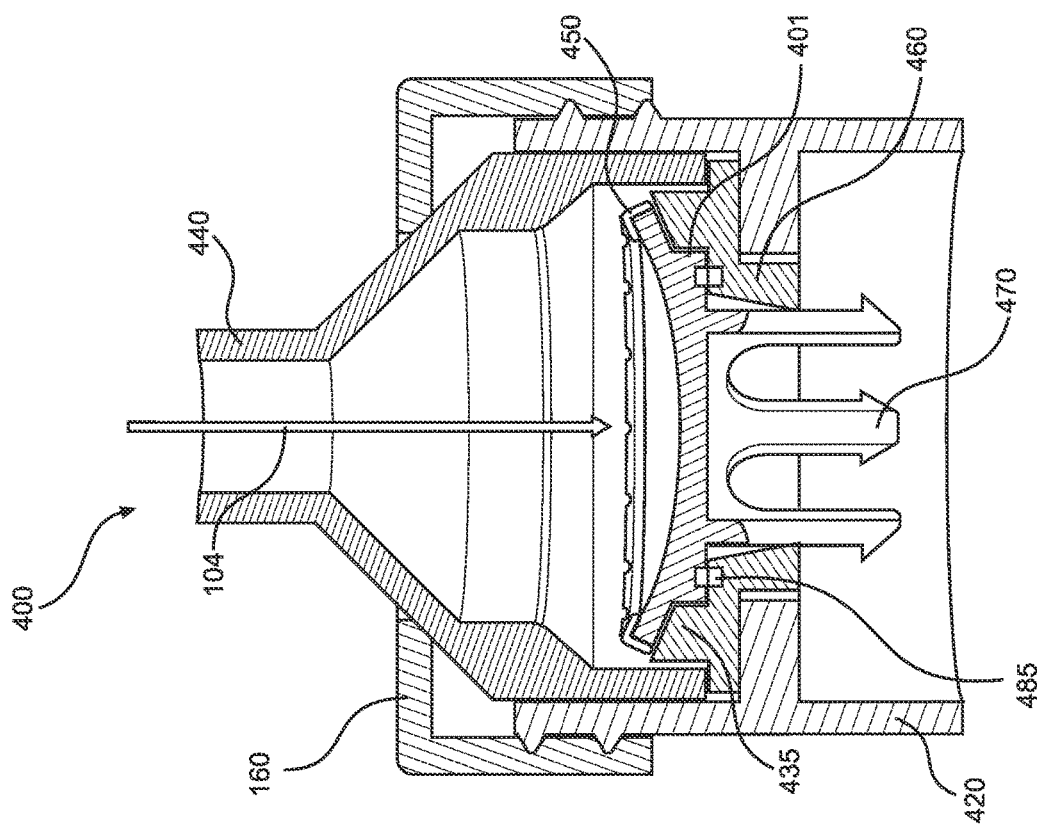
FIG. 51 is a cross-sectional elevation view of the EFV shown in FIG. 48 and in the excess flow configuration.
Figure 50:
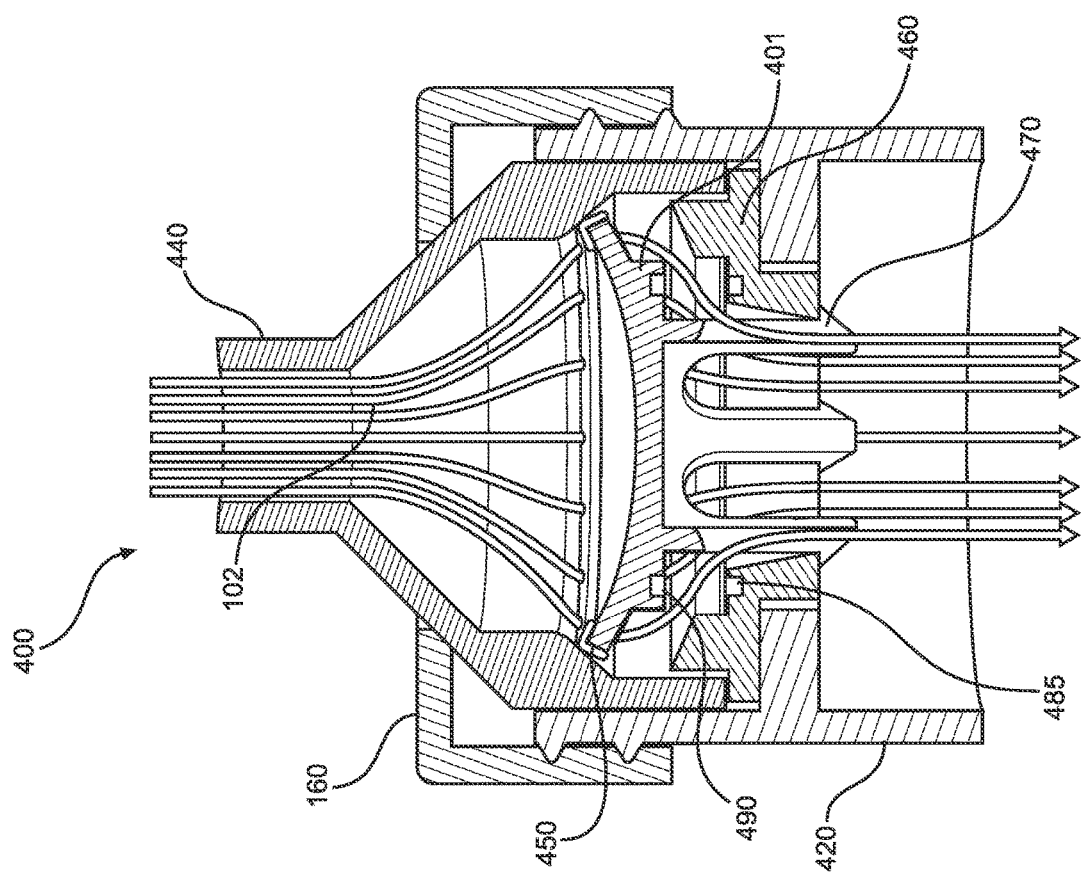
FIG. 50 is a cross-sectional elevation view of the EFV shown in FIG. 48 and in the normal flow configuration.

FIGS. 46 and 47 show air flow in normal conditions and excess flow conditions for the embodiment of the EFV 302. The operation is substantially similar operations already described.

The insert 300 can be made of a rigid or semi-rigid plastic or elastomer. It could even be made of metal if desired. Materials and size can provide an easy way to adjust the weight of the flexible membrane to adjust the sealing action for a desired fluid flow condition. As mentioned above, the geometry of the insert 300 allows it to be easily assembled in a press-fit into an opening in the central area of the flexible membrane 301 (which can be die cut) and it is also configured to lock in place after pressing it through the flexible membrane.

A fourth (e.g., EFV 400) and fifth (e.g., EFV 500) embodiment are disclosed in FIGS. 48-63. These are similar in that they use a rigid material with a spring to bias it against excess downstream flow. When an excess flow condition is reached, the spring is compressed sufficiently to force the seal plug down into sealing engagement with a sealing surface.

In the fourth embodiment of FIGS. 48-55, the EFV 400 includes not only an upstream and downstream valve body 440, 420, but also a collar 460, that is designed to retain the sealing disk 401. The collar 460 also interfaces with the upstream and downstream valve bodies 440, 420, fitting in a recess created by one or both of the upstream and downstream valve bodies 440, 420. The sealing disk 401 is retained by way of interaction with the downstream side of the collar 460 and a plurality of legs 470 (e.g. 2 to 10, such as 3 to 8, or 4 to 6), that have protrusions 475 extending radially to a further radial distance than a central opening of the collar 460. The sealing disk 401 includes a sail 405 on an upstream side and a sealing plug 411 on a bottom (downstream) side. The sealing plug 411 fits onto a sealing surface 435 on the collar 460. The sealing disk 401 in this embodiment, has a concave surface facing upstream.

At the downstream end of the spring 480, it fits into a spring channel 485 in the collar 460, and at the upstream end it fits into a spring channel 490 in the sealing disk 401. In an example, the spring 480 is separate from the legs 470. In an aspect, the spring 480 may be metal.

Figure 52:
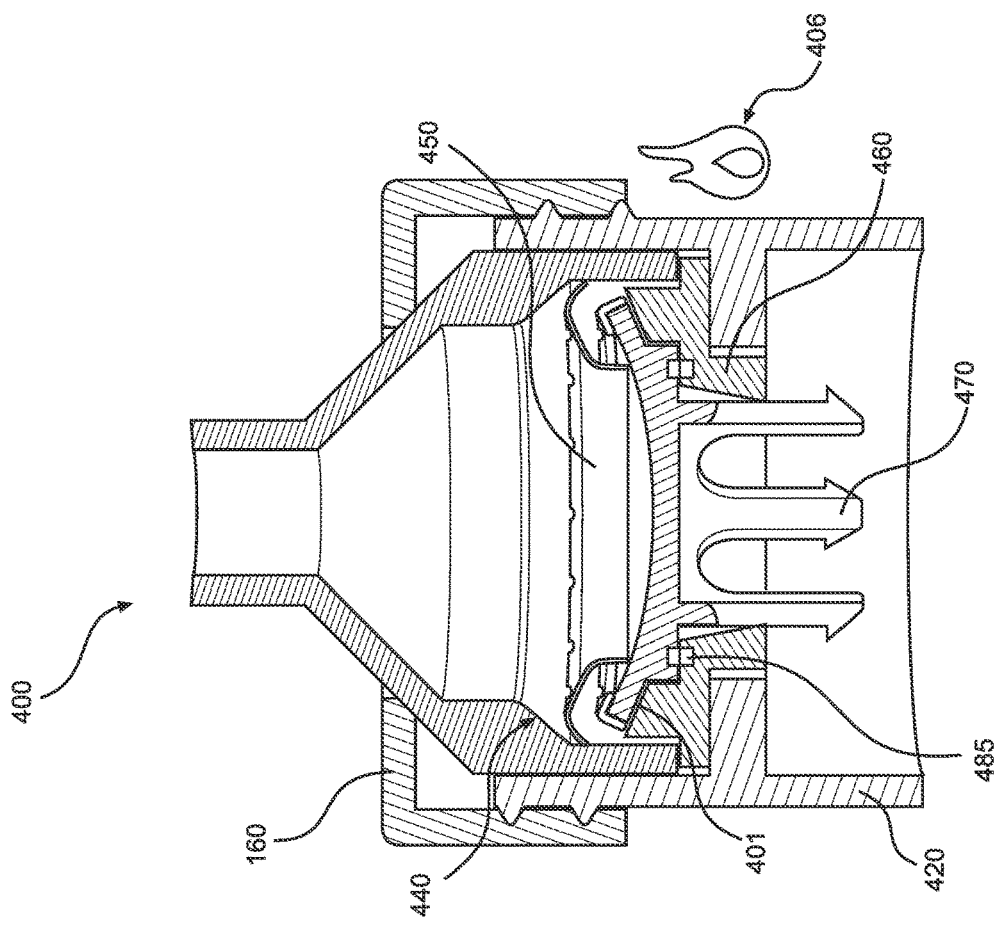
FIG. 52 is another cross-sectional elevation view of the EFV shown in FIG. 48 and in the normal flow configuration.
Figure 53:
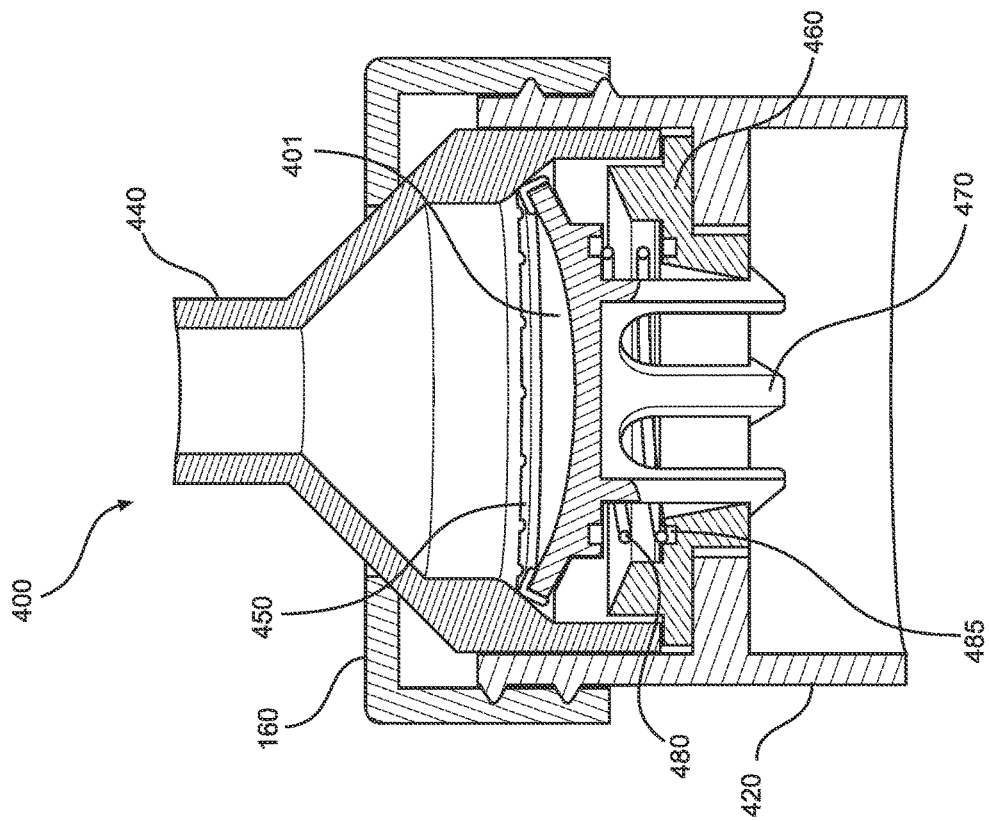
FIG. 53 is a cross-sectional elevation view of the EFV shown in FIG. 48 and in an excess temperature configuration.
Figure 54:
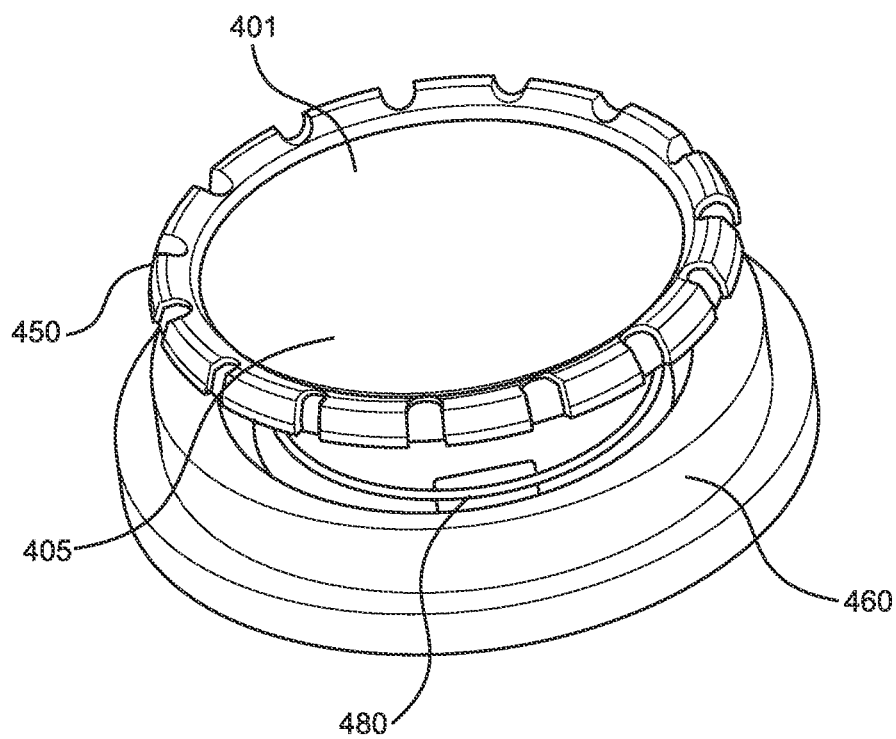
FIG. 54 is a perspective view of a sealing disk and an intumescent material of the EFV shown in FIG. 48.
Figure 55:
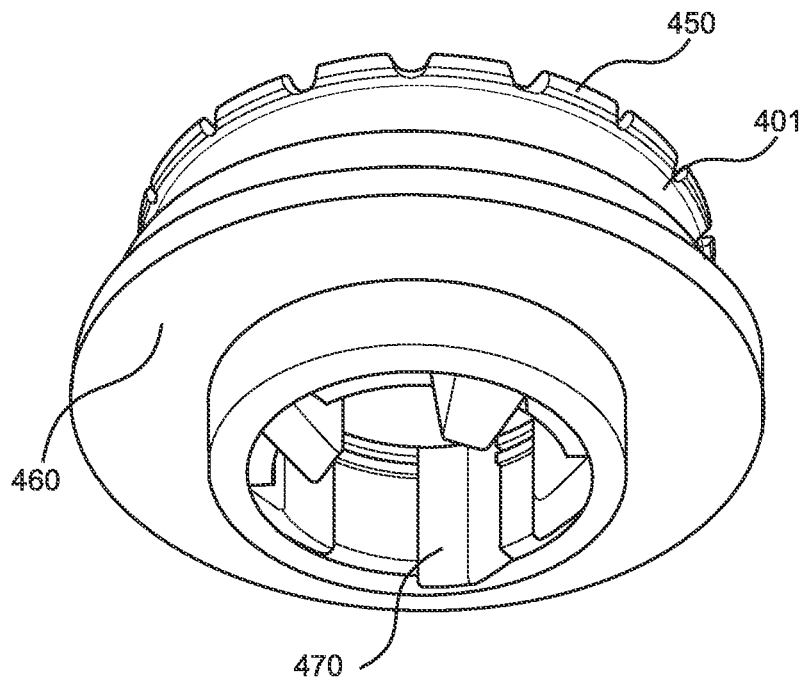
FIG. 55 is another perspective view of the sealing disk and the intumescent material shown in FIG. 54.
Figure 57:
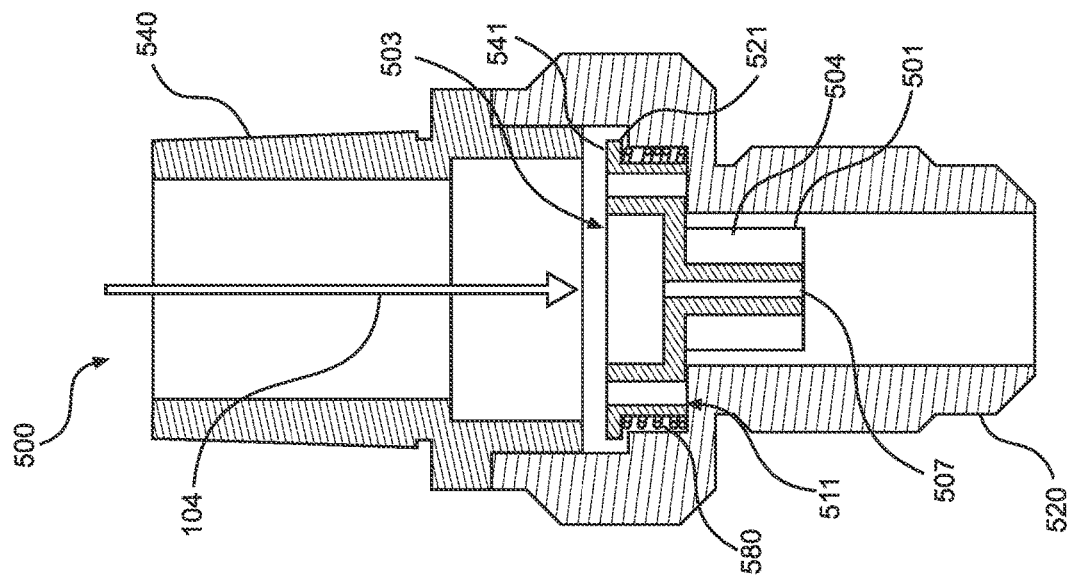
FIG. 57 is a cross-sectional elevation view of the EFV shown in FIG. 56 and in an excess flow configuration.
Figure 56:
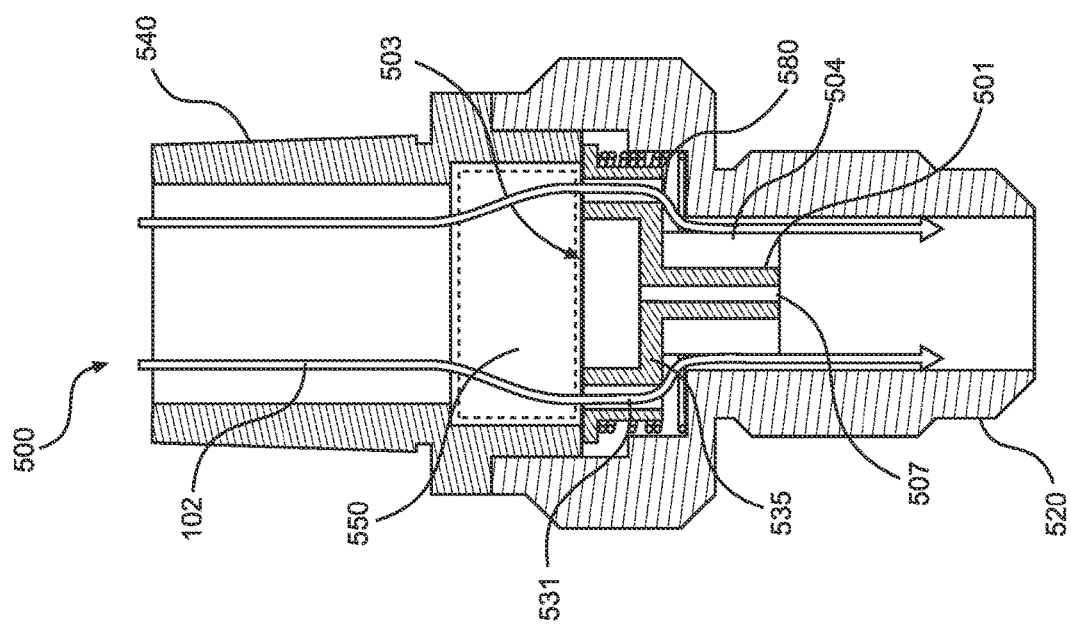
FIG. 56 is a cross-sectional elevation view of another EFV in a normal flow configuration and in accordance with principles of the present disclosure.
Figure 59:
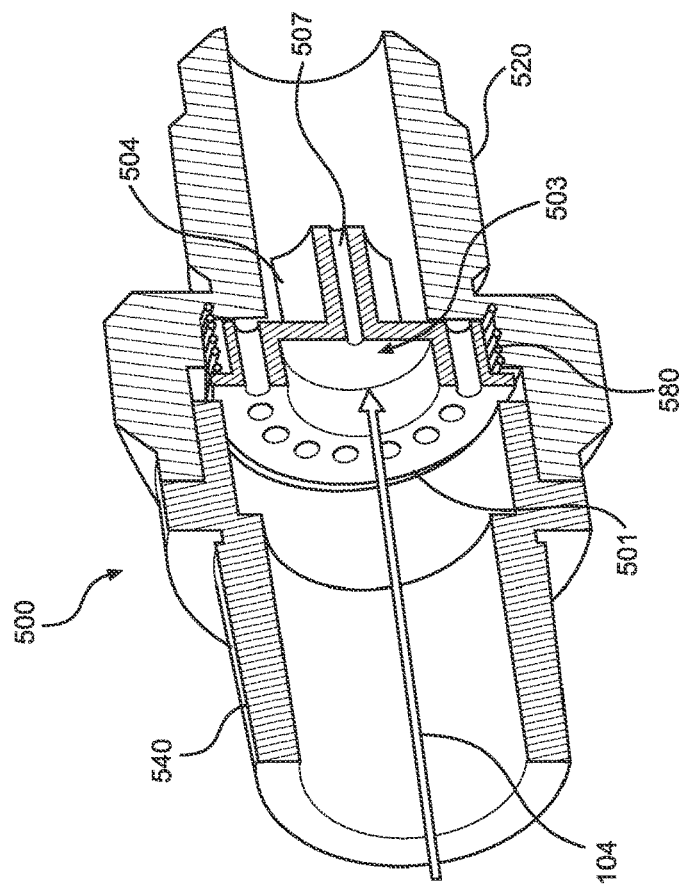
FIG. 59 is a cross-sectional perspective view of the EFV shown in FIG. 56 and in the excess flow configuration.
Figure 58:
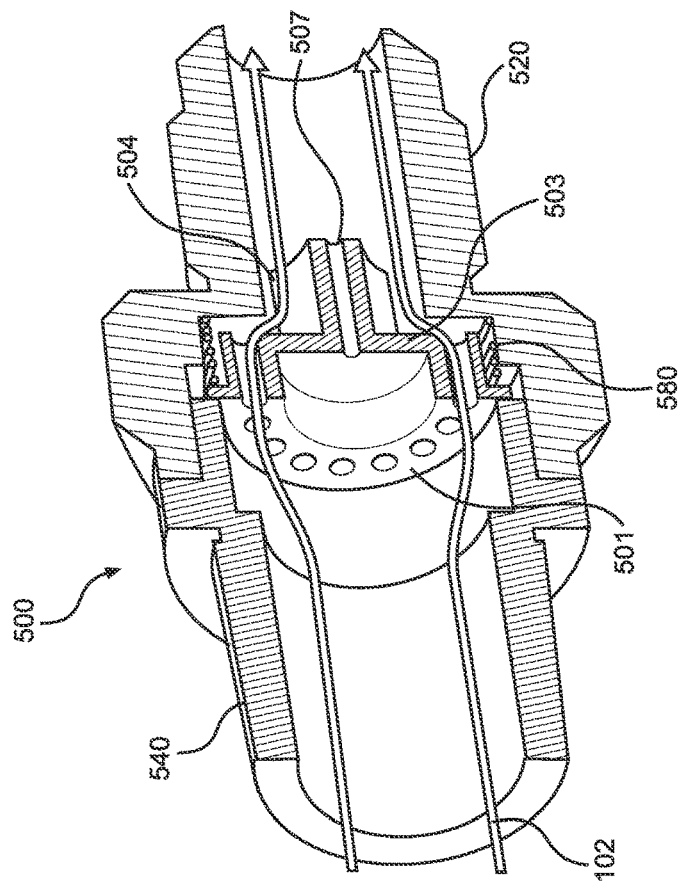
FIG. 58 is a cross-sectional perspective view of the EFV shown in FIG. 56 and in the normal flow configuration.
Figure 60:
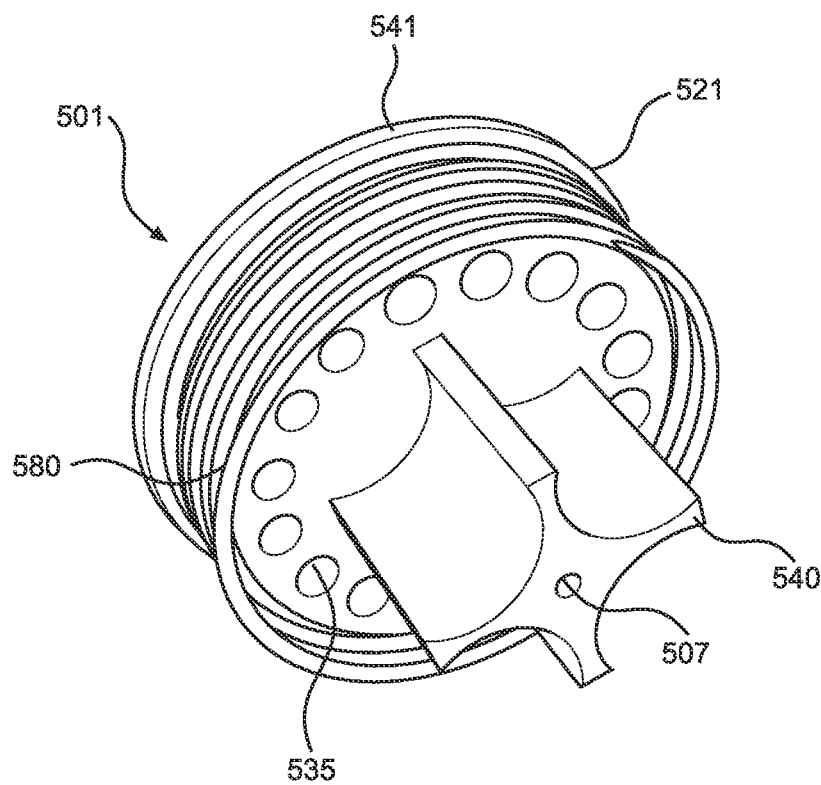
FIG. 60 is a perspective view of a sealing disk and a spring of the EFV shown in FIG. 56.
Figure 61:
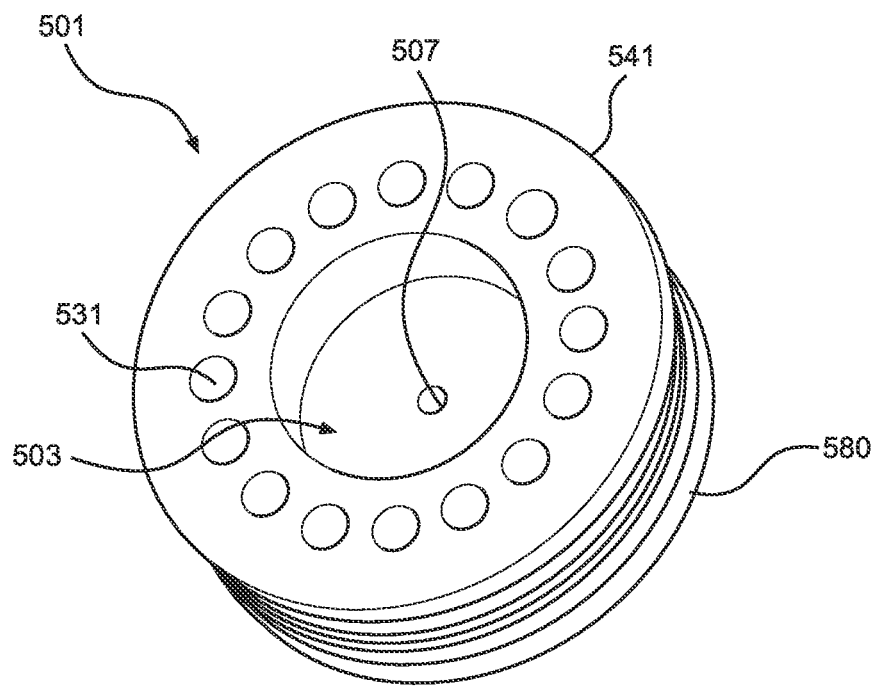
FIG. 61 is another perspective view of the sealing disk and the spring shown in FIG. 60.
Figure 62:
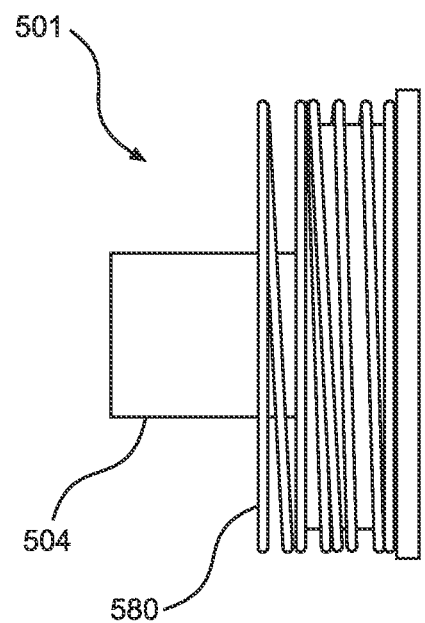
FIG. 62 is a side elevation view of the sealing disk and the spring shown in FIG. 60.
Figure 63:
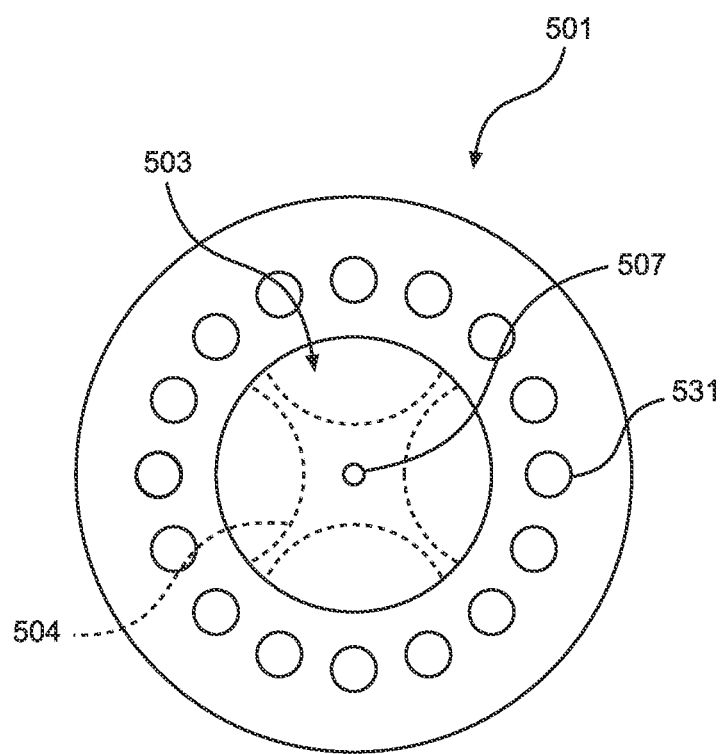
FIG. 63 is a top plan view of the sealing disk and the spring shown in FIG. 60.

The intumescent material 450 is disposed about top circumference of the sealing disk 401 and has channels to allow for improved gas flow. A spring 480 is disposed around the exterior of the plurality of legs 470. Air flow in normal and excess flow conditions is as shown. In normal conditions, air flows around the sealing disk 401, and intumescent material 450 (or through channels in the intumescent material 450) through the legs 470, and, in this case, the spring 480. Operation of the intumescent material is as shown in FIGS. 52 and 53, permanently closing the valve when activated by an external heat source 406.

Materials used for the components of this embodiment can be selected from any of those disclosed herein. The embodiment can be made similar to those described above, e.g., by assembling the sub-assembly of collar 460, sealing disk 401, and intumescent material 450, and spring 480, then dropping the sub-assembly into the downstream valve body 420 and attached the upstream valve body 440.

In the fifth embodiment of FIGS. 56-63, the EFV 500 includes an upstream and downstream valve body 540, 520, and a sealing disk 501. A middle part of the sealing disk 501 is surrounded by a spring 580 and the sealing disk and spring are retained and limited in their range of motion by the inner diameter of the upstream and downstream valve body 540, 520. A lip 541, 521 on the upstream and downstream valve body 540, 520, allows for a defined range of travel in the upstream and downstream directions.

A depressed top central area 503 of the sealing disk 501 acts as a sail and is depressed in the downstream direction. A central bypass channel 507 runs through the sealing disk 501 at or near the axis. Passageways 531 are provided around the outer circumference of the sealing disk 501. This allows for normal air flow. The sealing disk 501 in this embodiment includes an axially elongated portion 504. When excess flow conditions are present the spring 580 is compressed and the sealing plug 511 fits onto a sealing surface 535

The intumescent material 550 is disposed upstream of the sealing disk 501 and around the circumference of the upstream valve body 520. Fluid flow in normal and excess flow conditions is as shown. In normal conditions, air flows through the passageways 531 and around the elongated portion 504, then to the outlet and the appliance. Operation of the intumescent material 550 (shown only as a rectangle in FIG. 56) would be similar to other embodiments, permanently closing the valve when activated.

Materials used for the components of the fifth embodiment can be selected from any of those disclosed herein. The embodiment can be made similar to those described above, e.g., by assembling the sub-assembly of sealing disk 501, intumescent material 550, and spring 580, then dropping the sub-assembly into the downstream valve body 520 and attached the upstream valve body 540.

Figure 64:
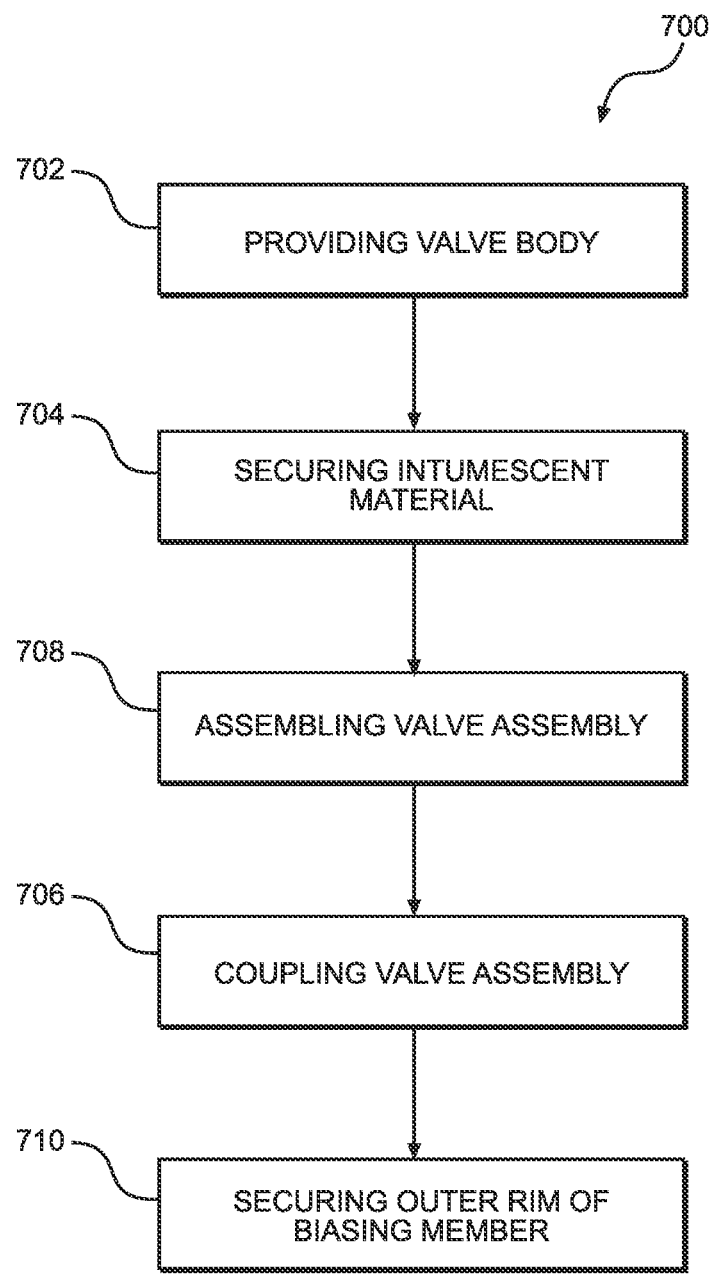
FIG. 64 is a flowchart illustrating a method of manufacturing an EFV and in accordance with principles of the present disclosure.

FIG. 64 is a flowchart illustrating a method 700 of manufacturing an EFV. In example, the EFV may be any of those EFV described above. The method 700 begins with providing a valve body at operation 702. The valve body may include an inlet housing and an outlet housing and may define one or more interior chambers for receiving components of the EFV as described herein. For example, a first chamber and a second chamber in flow communication are both formed within the valve body and can receive a flow of fluid, such as gas. Intumescent material is then secured within the first chamber at operation 704.

Additionally, a valve assembly is coupled at least partially within the second chamber at operation 706. The valve assembly may be any of those the same or similar to that described herein. By having an assembly that is separate from the valve body, the valve assembly can be assembled at a different time and/or place prior to assembly of the EFV for manufacturing efficiencies. In an aspect, the valve assembly may include a sealing disk/poppet and a biasing member, and in a biased position the sealing disk is eccentric within the valve body.

In some examples, the method 700 may further include assembling the valve assembly at operation 708. In examples, assembling the valve assembly can include forming the biasing member via a stamp process, laser cutting process, or the like. The sealing disk may be a molded component as required or desired. Additionally, the sealing disk may be coupled to the biasing member, via friction fit, a heat stake, press fit, or the like. In still other examples, the step of coupling the valve assembly to the valve body at operation 706 may includes securing the outer rim of the biasing member between the inlet housing and the outlet housing at operation 710. In an aspect, the outer rim of the biasing member may be pinched or sandwiched therebetween to secure the valve assembly to the valve body.

As mentioned above, the EFVs described herein may be incorporated into a system for delivering gas from a source to an appliance. Gas power sources include, for example, a gas cylinder, e.g., having internal volume of 0.44 to 108 L (at 70° F. and 1 atm) or a residential or commercial public utility gas line. Gas appliances for which the EFV may be used with include, for example, a stove, an oven, a home or business air heating unit, a clothes drier, a pneumatic tool, a patio heater, a blowtorch, a vehicle, construction equipment, lab or medical equipment.

The gas may be natural gas (methane), propane, butane, acetylene, air propane, helium, hydrogen, oxygen, nitrous oxide. The safety features of the EFV may have particular applicability to flammable or noxious gases. It is appreciated that the EFV may be used with other fluid sources, such as, but not limited to, liquids and other gas types as required or desired.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Furthermore, to the extent that the term "includes" is used in either the detailed description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. If not specified above, any properties or measurements mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. An excess flow valve comprising:
   a valve body having an inlet and an opposite outlet defining a flow path to receive a flow of gas, the inlet and the outlet also defining a central axis of the valve body, wherein the valve body defines a first chamber and a second chamber in flow communication, the first chamber upstream from the second chamber and the first chamber radially larger relative to the second chamber;
   intumescent material disposed within the first chamber, wherein the intumescent material is configured to radially expand to substantially restrict the flow of gas through the valve body upon reaching a threshold temperature; and
   a valve assembly disposed at least partially within the second chamber and downstream from the intumescent material, the valve assembly comprising:
   a biasing member comprising:
   an outer rim having an upstream surface; and a spiral arm disposed at least partially within the outer rim and extending therefrom; and a sealing disk coupled to a free end of the spiral arm and biased relative to the outer rim along the central axis via the spiral arm, the sealing disk having a downstream sealing surface, wherein the valve assembly is configured to move between at least two configurations based on the flow of gas, in a first configuration, the biasing member supports the sealing disk such that the downstream sealing surface is axially spaced from the upstream surface of the outer rim and the flow of gas is allowed to pass through the valve assembly, and in a second configuration, a biasing force of the biasing member is overcome such that the downstream sealing surface engages with the upstream surface to substantially restrict the flow of gas through the valve assembly.

2. The excess flow valve of claim 1, wherein the sealing disk includes a stem extending from the downstream sealing surface, the stem eccentric to the central axis of the valve body when the valve assembly is in the first configuration.

3. The excess flow valve of claim 2, wherein the stem is co-axial with the central axis of the valve body when the valve assembly is in the second configuration.

4. The excess flow valve of claim 1, wherein the valve body includes an inlet housing defining the inlet and an outlet housing defining the outlet, and wherein at least a portion of the biasing member is pinched between the inlet housing and the outlet housing to secure the valve assembly at least partially within the second chamber.

5. The excess flow valve of claim 4, wherein the outlet housing defines a third chamber downstream of the second chamber and in fluid communication with the second chamber, the third chamber having a frustoconical shape configured to at least partially receive the valve assembly in the second configuration, and wherein the valve assembly does not contact an interior surface of the third chamber when in the second configuration.

6. The excess flow valve of claim 1, wherein the outer rim has a width that is greater than a width of the spiral arm.

7. The excess flow valve of claim 1, wherein the free end of the spiral arm includes a disk support, the disk support eccentrically positioned within the outer rim when in the first configuration.

8. A method of manufacturing an excess flow valve, the method comprising:
providing a valve body having an inlet and an opposite outlet defining a flow path to receive a flow of gas, the inlet and the outlet also defining a central axis of the valve body, wherein the valve body defines a first chamber and a second chamber in flow communication, the first chamber upstream from the second chamber and the first chamber radially larger relative to the second chamber;
securing intumescent material within the first chamber; and
coupling a valve assembly at least partially within the second chamber and downstream from the intumescent material, wherein the valve assembly is positioned within the valve body such that a sealing disk is biasly positioned eccentric relative to the central axis, and the sealing disk is biased along the central axis by a biasing member having an outer rim and a spiral arm extending therefrom, a free end of the spiral arm is coupled to the sealing disk so that a downstream sealing surface of the sealing disk is configured to selectively engage with an upstream surface of the outer rim and substantially restrict the flow of gas through the valve assembly.

9. The method of claim 8, further comprising assembling the valve assembly including:
forming the biasing member, the spiral arm and the outer rim integral with one another at a single connection location;
molding the sealing disk, the sealing disk having a stem extending from the downstream sealing surface; and
coupling the stem to the free end of the arm prior to positioning within the valve assembly.

10. The method of claim 8, wherein the valve body includes an inlet housing defining the inlet and an outlet housing defining the outlet, and the step of coupling the valve assembly at least partially within the second chamber comprises securing the outer rim of the biasing member between the inlet housing and the outlet housing such that it is pinched therebetween.

11. An excess flow valve for operation with a gas flowing downstream, comprising:
a valve body with an axial channel;
a sealing disk retained within the valve body, the sealing disk coupled to a flexible member, and coupled to or including a sail facing upstream on a top side of the sealing disk that is substantially planar and a sealing plug facing downstream, wherein the flexible member is configured to axially move the sealing plug of the sealing disk into engagement with a sealing surface when downstream gas flow exceeds a threshold pressure, differential. wherein the sealing disk has an axially elongated portion with a bypass channel in a central area, and a plurality of gas flow passageways around an outer rim of the sealing disk; and an intumescent material retained in the valve body upstream of the sealing disk.

12. The excess flow valve of claim 11, wherein the intumescent material is configured to axially move the sealing plug of the sealing disk into engagement with the sealing surface when expanded, wherein the intumescent material, when expanded, does not fully expand into an entire inner diameter of the axial channel of the valve body, and wherein the intumescent material is coupled to the sail and includes channels for gas flow.

13. The excess flow valve of claim 11, wherein the flexible member comprises a spiral arm member, and a spiral arm of the spiral arm member is attached to a central downstream facing area of the sealing disk and an outer rim of the spiral arm member, wherein the spiral arm is attached at only one location to the outer rim of the spiral arm member, and wherein the sealing disk has a smaller diameter than the flexible member.

14. The excess flow valve of claim 13, wherein the spiral arm is substantially planar when the threshold pressure differential is not reached, and is tilted downstream when the threshold pressure differential is exceeded.

15. The excess flow valve of claim 13, wherein the spiral arm is substantially planar when the threshold pressure differential is exceeded, and is tilted downstream when the threshold pressure differential is not exceeded.

16. The excess flow valve of claim 11, wherein each component of the excess flow valve comprises metal.

17. The excess flow valve of claim 11, wherein the flexible member comprises an elastomeric material and the elastomeric material includes passageways for gas flow, wherein the flexible member has a rigid rim, wherein the rim of the flexible member is coupled to the intumescent material, and wherein a central area of the flexible member includes an axially extended insert, a bypass channel extending axially through the insert.

18. The excess flow valve of claim 17, wherein the valve body has a circumferential channel with an upstream-facing opening that is downstream of the passageways for gas flow, and wherein the sealing surface is on the valve body.

19. The excess flow valve of claim 11, wherein the flexible member is a spring and the sealing disk includes a plurality of legs with protrusions thereon, and wherein the excess flow valve further comprises a collar disposed in the axial channel; the collar including a central opening encircling the plurality of legs.

20. An excess flow valve for operation with a gas flowing downstream, comprising:
- a valve body with an axial channel;
- a sealing disk retained within the valve body, the sealing disk coupled to a flexible member, and coupled to or including a sail facing upstream and a sealing plug facing downstream, wherein the flexible member is configured to axially move the sealing plug of the sealing disk into engagement with a sealing surface when downstream gas flow exceeds a threshold pressure differential; and
- an intumescent material retained in the valve body upstream of the sealing disk;
- wherein the intumescent material is configured to axially move the sealing plug of the sealing disk into engagement with the sealing surface when expanded, wherein the intumescent material, when expanded, does not fully expand into an entire inner diameter of the axial channel of the valve body, and wherein the intumescent material is coupled to the sail and includes channels for gas flow.

21. An excess flow valve for operation with a gas flowing downstream, comprising:
- a valve body with an axial channel;
- a sealing disk retained within the valve body, the sealing disk coupled to a flexible member, and coupled to or including a sail facing upstream and a sealing plug facing downstream, wherein the flexible member is configured to axially move the sealing plug of the sealing disk into engagement with a sealing surface when downstream gas flow exceeds a threshold pressure differential; and
- an intumescent material retained in the valve body upstream of the sealing disk;
- wherein the flexible member comprises a spiral arm member, and a spiral arm of the spiral arm member is attached to a central downstream facing area of the sealing disk and an outer rim of the spiral arm member, wherein the spiral arm is attached at only one location to the outer rim of the spiral arm member, and wherein the sealing disk has a smaller diameter than the flexible member.

22. An excess flow valve for operation with a gas flowing downstream, comprising:
- a valve body with an axial channel;
- a sealing disk retained within the valve body, the sealing disk coupled to a flexible member, and coupled to or including a sail facing upstream and a sealing plug facing downstream, wherein the flexible member is configured to axially move the sealing plug of the sealing disk into engagement with a sealing surface when downstream gas flow exceeds a threshold pressure differential; and
- an intumescent material retained in the valve body upstream of the sealing disk;
- wherein the flexible member comprises an elastomeric material and the elastomeric material includes passageways for gas flow, wherein the flexible member has a rigid rim, wherein the rim of the flexible member is coupled to the intumescent material, and wherein a central area of the flexible member includes an axially extended insert, a bypass channel extending axially through the insert.

23. An excess flow valve for operation with a gas flowing downstream, comprising:
- a valve body with an axial channel;
- a sealing disk retained within the valve body, the sealing disk coupled to a flexible member, and coupled to or including a sail facing upstream and a sealing plug facing downstream, wherein the flexible member is configured to axially move the sealing plug of the sealing disk into engagement with a sealing surface when downstream gas flow exceeds a threshold pressure differential; and
- an intumescent material retained in the valve body upstream of the sealing disk;
- wherein the flexible member is a spring and the sealing disk includes a plurality of legs with protrusions thereon, and wherein the excess flow valve further comprises a collar disposed in the axial channel; the collar including a central opening encircling the plurality of legs.

24. An excess flow valve for operation with a gas flowing downstream, comprising:
- a valve body with an axial channel;
- a sealing disk retained within the valve body, the sealing disk coupled to a flexible member, and coupled to or including a sail facing upstream and a sealing plug facing downstream, wherein the flexible member is configured to axially move the sealing plug of the sealing disk into engagement with a sealing surface when downstream gas flow exceeds a threshold pressure differential; and
- an intumescent material retained in the valve body upstream of the sealing disk;
- wherein the sealing disk has an axially elongated portion with a bypass channel in a central area, and a plurality of gas flow passageways around an outer rim of the sealing disk.

* * * * *